(12) United States Patent
Briggs et al.

(10) Patent No.: US 8,510,304 B1
(45) Date of Patent: Aug. 13, 2013

(54) TRANSACTIONALLY CONSISTENT INDEXING FOR DATA BLOBS

(75) Inventors: Gregory J. Briggs, Seattle, WA (US); Vincent M. Rohr, Woodinville, WA (US)

(73) Assignee: Amazon Technologies, Inc., Reno, NV (US)

(*) Notice: Subject to any disclaimer, the term of this patent is extended or adjusted under 35 U.S.C. 154(b) by 122 days.

(21) Appl. No.: 12/870,587

(22) Filed: Aug. 27, 2010

(51) Int. Cl.
*G06F 7/00* (2006.01)
*G06F 17/30* (2006.01)

(52) U.S. Cl.
USPC ........... 707/736; 707/741; 707/742; 707/743; 707/744

(58) Field of Classification Search
USPC ................. 707/705, 736, 741, 742, 743, 744, 707/745, 746, 999.1, 999.101, 999.102
See application file for complete search history.

(56) References Cited

U.S. PATENT DOCUMENTS

| | | | |
|---|---|---|---|
| 5,313,629 A | 5/1994 | Abraham et al. | |
| 5,893,117 A | 4/1999 | Wang | |
| 6,615,219 B1 * | 9/2003 | Bruso et al. | 707/699 |
| 7,047,242 B1 | 5/2006 | Ponte | |
| 7,257,592 B2 * | 8/2007 | Dinh et al. | 704/8 |
| 7,734,539 B2 * | 6/2010 | Ghosh et al. | 705/38 |
| 2002/0073110 A1 | 6/2002 | Duvillier et al. | |
| 2003/0196147 A1 | 10/2003 | Hirata et al. | |
| 2004/0139097 A1 | 7/2004 | Farber et al. | |
| 2004/0267831 A1 | 12/2004 | Wong et al. | |
| 2005/0071349 A1 * | 3/2005 | Jordan et al. | 707/100 |
| 2005/0138375 A1 | 6/2005 | Sadjadi | |
| 2005/0138401 A1 | 6/2005 | Terao et al. | |
| 2005/0160481 A1 | 7/2005 | Todd et al. | |
| 2006/0047658 A1 | 3/2006 | Baird et al. | |
| 2006/0282457 A1 * | 12/2006 | Williams | 707/102 |
| 2007/0006209 A1 | 1/2007 | Nguyen et al. | |
| 2007/0198979 A1 | 8/2007 | Dice et al. | |
| 2007/0288490 A1 * | 12/2007 | Longshaw | 707/100 |
| 2008/0005151 A1 * | 1/2008 | Iwakura | 707/102 |
| 2009/0063465 A1 * | 3/2009 | Ferragina et al. | 707/5 |
| 2009/0094298 A1 | 4/2009 | Bondurant et al. | |
| 2010/0082553 A1 | 4/2010 | Beatty et al. | |
| 2010/0088676 A1 | 4/2010 | Yuan et al. | |
| 2010/0106734 A1 * | 4/2010 | Calder et al. | 707/758 |
| 2010/0114853 A1 | 5/2010 | Fisher et al. | |
| 2010/0185597 A1 * | 7/2010 | Dunn | 707/704 |
| 2010/0185621 A1 * | 7/2010 | Klein | 707/741 |
| 2012/0011178 A1 * | 1/2012 | Pfeifle et al. | 707/825 |

OTHER PUBLICATIONS

Final Office Action for U.S. Appl. 12/870,661, mailed on Oct. 22, 2012, Gregory J. Briggs et al., "Multi-blob Consistency for Atomic Data Transactions", 15 pages.

(Continued)

*Primary Examiner* — Hares Jami
(74) *Attorney, Agent, or Firm* — Lee & Hayes, PLLC

(57) ABSTRACT

A transactionally consistent indexer is a tiered middleware framework component that updates a transactional index for a data blob according to a data transaction requested by an application. The transactionally consistent indexer determines index entries to be added or removed from a transaction index based on the application request. The transactionally consistent indexer further inserts each index entry to be added into the transaction index. With respect to each index entry to be removed, the transactionally consistent indexer uses a time stamp or version number of the index entry for ensuring optimistic concurrency during deletion. The transactionally consistent indexer then updates a data blob that is associated with each index entry to be added or each index entry to be removed based on the application request.

30 Claims, 31 Drawing Sheets

(56) References Cited

OTHER PUBLICATIONS

Final Office Action for U.S. Appl. 12/870,531, mailed on Sep. 27, 2012, Gregory J. Briggs et al., "Optimistically Consistent Arbitrary Data Blob Transactions", 13 pages.

Non-Final Office Action for U.S. Appl. 12/888,731, mailed on Jan. 4, 2013, Gregory J Briggs, "Moving Data Between Data Stores", 7 pages.

Non-Final Office Action for U.S. Appl. 12/870,405, mailed on Jul. 26, 2012, Gregory J. Briggs et al., "Sub-containment Concurrency for Hierarchical Data Containers", 25 pages.

Non-Final Office Action for U.S. Appl. 12/870,531, mailed on Mar. 2, 2012, Gregory J. Briggs et al., "Optimistically Consistent Arbitrary Data Blob Transactions", 18 pages.

Non-Final Office Action for U.S. Appl. 12/870,661, mailed on Jun. 1, 2012, Gregory J. Briggs et al., "Multi-blob Consistency for Atomic Data Transactions", 27 pages.

Office action for U.S. Appl. No. 12/888,731, mailed on May 16, 2013, Briggs, "Moving Data Between Data Stores", 7 pages.

Office action for U.S. Appl. No. 12/870,405, mailed on Jun. 4, 2013, Briggs et al., "Sub-containment Concurrency for Hierarchical Data Containers", 27 pages.

* cited by examiner

TRANSACTIONALLY CONSISTENT INDEXING FOR DATA BLOBS

BACKGROUND

A binary large object (blob) is a collection of binary data that may be stored as a single entity in a database management system. Blobs may be stored in one or more database stores, such as data stores in a cloud. A cloud storage system may consist of storage servers that are accessible to an application via a network infrastructure, such as the Internet.

The storage of blobs in a cloud storage system may differ from the storage of data via the use of traditional database software that resides on a single computing device. For example, traditional database software is designed with internal mechanisms to ensure adherence to strict rules of atomicity, consistency, isolation, and durability, also known as the ACID rules. Atomicity refers to the criteria that either all tasks in a transaction should happen or none should happen. In other words, the transaction must be either completed or rolled back. Consistency refers to the criteria that every transaction should conform to the consistency rules of the database software. Thus, each of the transactions cannot leave the data in the database in a contradictory state. Isolation refers to the criteria that two simultaneous transactions cannot interfere with one another, and intermediate results within one transaction must remain invisible to the other transaction. Durability refers to the criteria that completed transactions cannot be aborted or their results discarded.

Thus, the design of traditional internally coded database software, such as database systems based on the relational database management system (RDBMS) model, may combine these ACID rules with performance considerations to achieve the desired operation characteristics. However, once the design of such traditional database software is implemented, the configuration of the database software cannot be easily changed. As a result, traditional database software may be inadequate to store certain types of data, large chunks of data, or large quantities of persistent data. On the other hand, a blob storage system may provide data storage capability that is inherently unlimited and scalable, as addition of data storage servers may be added to the cloud.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to a tiered middleware framework for building storage logic and database logic on top of one or more data stores, such as one or more binary large object (blob) data stores that are part of a cloud. The tiered middleware framework, as described herein, may be responsible for connecting an application layer to a data storage layer that includes the one or more data stores. The application layer may include one or more applications that desires to store and retrieve data, such as a web-based commerce application, an online banking application, an inventory tracking application, and/or any other type of application. The data storage layer may be responsible for storing the blob data for the applications in the application layer, as well as provide the blob data to the applications upon an application's request. In other words, the tiered middleware framework is responsible for transacting data between the application layer and the data storage layer. The tiered middleware framework may include a component stack of modular data transaction components that support the movement of blob data between the application layer and the data storage layer.

In various embodiments, the modular components may be assembled and rearranged based on the data storage needs of applications that reside in the application layer, as well as tradeoffs between criteria such as any two or more of latency, availability, consistency, durability, throughput, operation cost, and/or the like. In this way, the modular nature of the data transaction components provides the tiered middleware framework with flexibility to adapt to a variety of data usage cases and performance goals. Accordingly, the tiered middleware framework may be used to guarantee data persistence, enhance data access performance, as well as lower the operating cost associated with supporting blob data transactions.

In some embodiments, a tiered middleware framework for transacting blob data between an application layer and a data storage layer may include modular components. A transactionally consistent indexer may be a tiered middleware framework component that updates a transactional index for a data blob according to a data transaction requested by an application. The transactionally consistent indexer may determine index entries to be added or removed from a transaction index based on the application request. The transactionally consistent indexer may further insert each index entry to be added into the transaction index. With respect to each index entry to be removed, the transactionally consistent indexer may use a time stamp or version number of the index entry for ensuring optimistic concurrency during deletion. The transactionally consistent indexer may then updates a data blob that is associated with each index entry to be added or each index entry to be removed based on the application request.

Illustrative System Architecture

Figure 1:
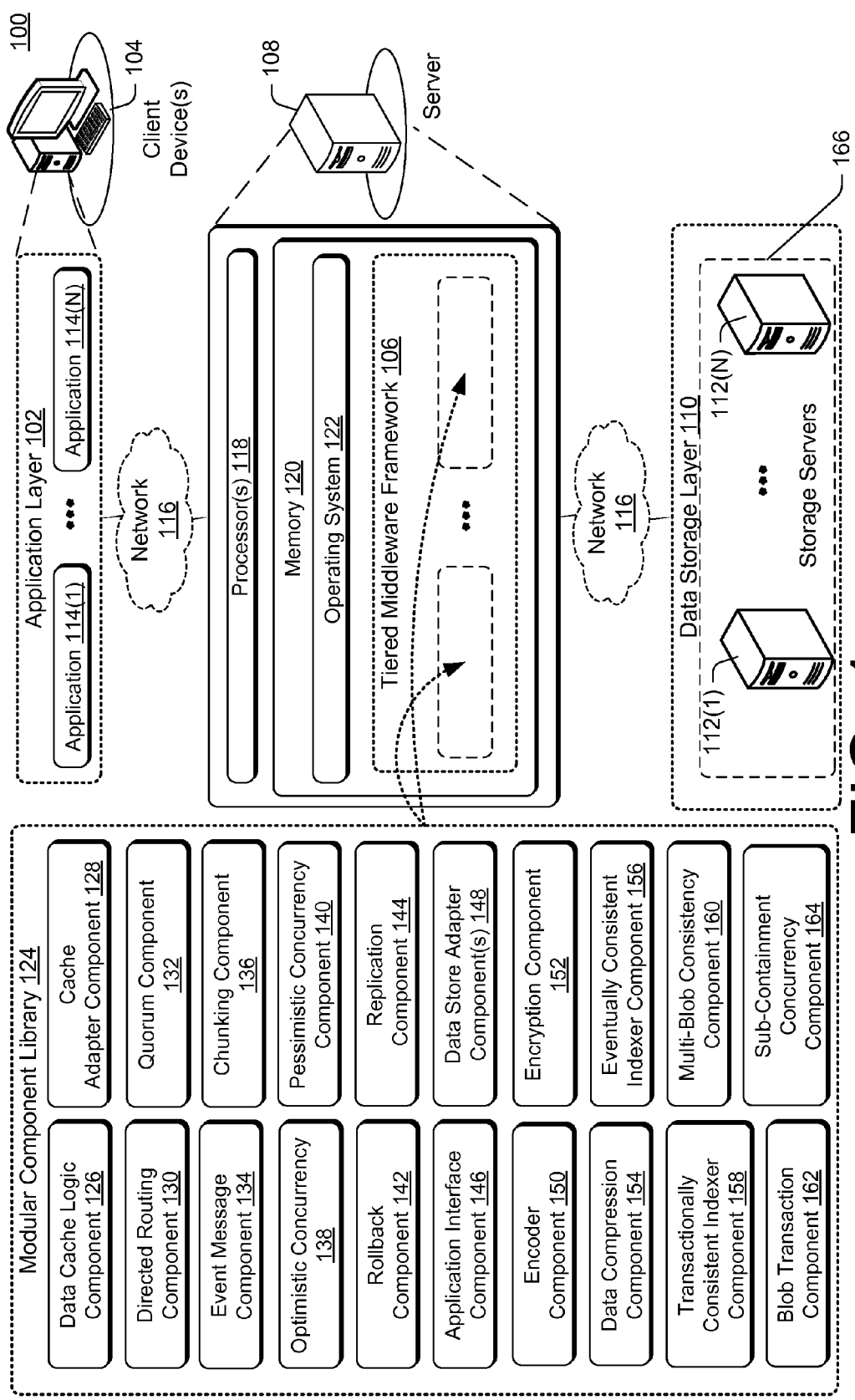
FIG. 1 shows an illustrative computing environment for a tiered middleware framework that includes various modular data transaction components.

FIG. 1 shows an illustrative data access environment 100 in which one or more embodiments of a tiered middleware framework may be implemented. The environment 100 may include an application layer 102 that may be implemented on one or more client devices 104, a tiered middleware framework 106 that may be implemented on one or more servers, such as a server 108, and a data storage layer 110 that provides a plurality of blob data stores that reside on one or more storage servers 112(1)-112(N).

Each of the client devices 104 may be an electronic device that is capable of receiving, processing and transmitting data to another device. In various embodiments, each of the client devices 104 may be a laptop computer, a desktop computer, a server, or another electronic device that is equipped with network communication components, data processing components, and/or at least one electronic display for displaying data. The application layer 102 may include one or more applications 114(1)-114(N) that store data to and retrieve data from the data storage layer 110. For example, the application 114(1)-114(N) may include a web transaction application that receives online purchase requests from users, an online banking application that provide users with web access to financial information, a corporate inventory application that keeps track of inventory in real time, and/or the like. In some embodiments, the application layer 102 may also be implemented on the server 108, rather than on the one or more client devices 104.

The storage servers 112(1)-112(N) that implement the data storage layer 110 may be located in a single data center, or across multiple data centers. Moreover, the data centers may be located at a single geographical location, or across multiple geographical locations around the globe. In various embodiments, the data stores may store and provide access to data blobs upon the request of the application layer 102. In such embodiments, each data container or blob may be coarse or fine grained, such as in the form of a binary blob or semi-structured blob. In some embodiments, at least some of the storage servers 112(1)-112(N) may be organized into a storage system, such as a storage system 166, that comprise one or more of the storage servers.

In some instances, the data storage layer 110 may have some usage constraints. For example, there may be a limit on the sizes of data blobs that are stored in the data stores of the storage servers 112(1)-112(N), so that a certain level of data access performance may be maintained. In another example, at least some of the data stores of the data storage layer 110 may use the principle of eventual consistency to store and retrieve data. Accordingly, data that have been recently stored into the data storage layer 110 may be unavailable for immediate retrieval as the data may need to proliferate to the different data stores in the storage servers 112(1)-112(n) to maintain eventual consistency.

The client devices 104, the server 108, and the storage servers 112(1)-112(N) may be communicatively connected by a network 116. The network 116 may be a local area network ("LAN"), a larger network such as a wide area network ("WAN"), or a collection of networks, such as the Internet. Protocols for network communication, such as TCP/IP, may be used to implement the network 116. Although embodiments are described herein as using a network such as the Internet, other distribution techniques may be implemented.

The server 108 may include one or more processors 118, a memory 120, and/or user controls that enable a user to interact with the device. User controls may include, but are not limited to, combinations of one or more of keypads, keyboards, mouse devices, touch screens, microphones, speech recognition packages, and any other suitable devices or other electronic/software selection methods. The operating system 122 may be stored in memory 120. The operating system 122 may include components that enable the server 108 to receive data via various inputs (e.g., user controls, network interfaces, and/or memory devices), and process the data using the one or more processors 118 to generate output. The operating system 122 may include one or more components that present the output (e.g., display an image on an electronic display, store data in memory, transmit data to another electronic device, etc.). Additionally, the operating system 122 may include other components that perform various other functions generally associated with an operating system.

The transaction of the data between the application layer 102 and the data storage layer 110 may be facilitated by the tiered middleware framework 106 that resides in the memory 120. For instance, the tiered middleware framework 106 may serve to transform a data store write request from the application layer 102 into multiple data writes to the multiple data stores in the data storage layer 110. Similarly, in another instances, the tiered middleware framework 106 may serve to transform a data retrieval request from the application layer 102 into multiple data reads from the multiple data stores in the tiered middleware framework 106. However, in both of these instances, the goal of the tiered middleware framework 106 is to handle the store requests and/or retrieval requests seamlessly for the application layer 102, regardless of the data store architecture of the data storage layer 110.

In various embodiments, the tiered middleware framework 106 may be built using a plurality of data transaction components selected from a module component library 124, and/or from additional custom modules. The module component library 124 may include various data transaction components that may be implemented as part of the tiered middleware framework 106. Each of the data transaction components from the library 124 may be implemented multiple times into the tiered middleware framework 106. As further described below, this component-based design of the tiered middleware framework 106 may enable flexibility in the trading off of at least two of latency, availability, durability, throughput, and/or operation cost to achieve the desired data transaction performance. In various embodiments, the data transaction components may include one or more of each of: a direct routing component 126, a cache adapter component 128, a directed routing component 130, a quorum component 132, an event message component 134, a chunking component 136, an optimistic concurrency component 138, a pessimistic concurrency component 140, a rollback component 142, a replication component 144, an application interface component 146, a data store adapter component 148, encoder component 150, an encryption component 152, a data compression component 154, an eventually consistent indexer component 156, a transactionally consistent indexer component 158, a multi-blob consistency component 160, a blob transaction component 162, and a sub-containment concurrency component 164. In some embodiments, the data transaction components may communicate using a logical stream-of-streams, that is, a stream of stream pointers/references that represents all the data within a particular transaction. Moreover, metadata with well-defined semantics may enable multiple data transaction components to cooperate together to provide various features.

The data cache logic component 126 may receive a data transaction request and direct the data transaction request to one or more other data transaction components. For example, the data cache logic component 126 may receive a data read request from an application layer 102. In turn, the data cache logic component 126 may redirect the data read request to another data transaction component, such as the cache adapter component 128.

The cache adapter component 128 may enable the tiered middleware framework 106 to cache data of a data transaction to a memory object caching system. The use of such a memory object caching system may reduce the number of reads to a data source table or indexer, thereby resulting in faster access to the data. For example, the memory object caching system may cache data and objects in a local memory, such as random access memory (RAM) of the server 108.

The directed routing component 130 may route data transactions to different data stores under the guidance of an application, such as the application 114(1). For instance, the directed routing component 130 may receive a write request from the application 114(1) to store data into a data store that is less durable but more available, thereby resulting in faster performance. Such an instance may occur when a user is merely putting items into a "shopping cart" of an online shopping application. Thus, because the user may care more about being able to quickly place the items in the shopping cart rather than the accuracy of the items in the shopping cart (which can be checked during final order review), the availability of the data store may be more important than the durability of the data store.

However, in another instance, the directed routing component 130 may receive a write request from the application 114(1) to store data into a data store that is less available but more durable. Such an instance may occur when the user is transferring funds between accounts using an online banking application. Thus, because the user may desire that the transfer to be performed accurately, and is willing to tolerate some system unavailability during the transfer, immediate availability of the data store may be less important than the durability of the data store. Thus, depending on the nature of the data transaction request, the directed routing component 130 may use its knowledge of the characteristics of each data store to direct the data transaction request to the appropriate data store.

In alternative embodiments, the directed routing component 130 may make its own determination regarding the routing of the data transactions. In such embodiments, the directed routing component 130 may include an analysis algorithm that monitors and analyzes the patterns of data transactions for the application 114(1). For example, the patterns may include a frequency of the data transactions, size of the data being transacted, duration of the data transactions, time passed since the previous read or write, and/or the like. Thus, the directed routing component 130 may determine a data store with the characteristics that best match the usage demand of each data transaction from the application 114(1), and route each data transaction to the appropriate data store.

The quorum component 132 may be implemented into the tiered middleware framework 106 to ensure transaction consistency. For example, a particular piece of data (e.g., a data blob) may have replicated copies stored in various data stores in the data storage layer 110. Accordingly, in order to ensure that no two copies of a piece of data are written by two data transactions concurrently, the quorum component 132 may obtain a read quorum or write quorum for the piece of data.

The event message component 134 may be implemented into the tiered middleware framework 106 to provide messaging functions. In some embodiments, an external data warehouse component outside of the data storage layer 110 may desire to be informed of each data write operation to the one or more data stores of the data storage layer 110. For example, an eventually consistent indexer component 156 may use the event message component 134 to provide notification that a write operation is completed or failed. In such an example, the event message component 134 may be configured to provide a guaranteed message only when the data write operation to the data stores is successful.

The chunking component 136 may break down a piece of data into smaller chucks for optimal storage in and retrieval from the data stores of the data storage layer 110. For example, certain data stores may have limits on the size of data chunks that may be stored. However, even in the absence of limitations, most data stores generally perform more efficiently with smaller data chunks, as the smaller data chunks may be transacted within the data stores in parallel. In various embodiments, the chunking component 136 may use a predetermined size limit to determine whether a piece of data is to be chunked. For example, the chunking component 136 may be configured to break any piece of data that is bigger than 256 KB into a plurality of smaller data chucks that are 256 KB or less in size. Thus, in such embodiments, the predetermined size limit may be based on a tradeoff between latency and throughput. For instance, the use of a larger predetermined size limit may result in greater throughput and more latency. In contrast, the use of a smaller predetermined size limit result in less latency and less throughput. Accordingly, the predetermined size limit may be designed to balance these performance considerations. In some scenarios, the tiered middleware framework 106 may make use of multiple chunking components 136, each with a different predetermined size limit, for data that are destined for different data stores in the data storage layer 110. In this way, data transactions of different data may be routed based on specific latency and throughput considerations.

In additional embodiments, the chunking component 136 may also break a piece of data accordingly to an application scheme. In other words, the chunking component 136 may be aware that a data blob is made up of discrete data chunks such that each data chunk has a particular significance to an application. Thus, the chunking component 136 may break the data blob into the discrete data chunks for storage into one or more data stores. In this way, when the application desires to retrieve a specific chunk of the data blob at later time, the application may retrieve the appropriate chunk of the data blob from a corresponding data store rather than the entire data blob. In such embodiments, the chunking component 136 may create name-value pairs for the attributes of the data chucks that are mapped together to ensure object persistence.

The optimistic concurrency component 138 may play a role in ensuring that concurrent data transactions to and from the data stores in the data storage layer 110 do not interfere with each other. In other words, the optimistic concurrency component 138 may assume that multiple data transactions can simultaneously affect the same piece of data. Therefore, before committing a data transaction, each data transaction may use the optimistic concurrency component 138 to verify that no other transaction has modified its data.

The pessimistic concurrency component 140 may also play role in ensure that in ensuring that concurrent data transactions to and from the data stores in the data storage layer 110 do not interfere with each other. In various embodiments, the pessimistic concurrency component 140 may enable an initial data transaction to block an interfering data transaction. In other words, the performance of an initial data transaction on a piece of data may use the pessimistic concurrency component 140 to block another data transaction from being executed on the same piece of data until the initial data transaction is completed.

The rollback component 142 may cause the data stores of the data storage layer 110 to retain previous versions of the data in the data stores of the data storage layer 110. In various embodiments, the rollback component 142 may enable the applications 114(1)-114(N) in the application layer 102 to obtain access to previous versions of stored data.

The replication component 144 may replicate data transacted to the data storage layer 110. The one or more duplicates of the original data may be stored in different data stores of the data storage layer 110. In this way, the inclusion of the replication component 144 in the tiered middleware framework 106 may provide the overall data access environment 100 with greater reliability, durability, and/or availability. For example, when a primary data store that stores the data manipulated by the data transaction fails, an application of the application layer 102, such as the of the application 114(1), may nevertheless obtain access to a duplicate copy of the data from another data store. The duplication of data onto multiple data stores by the replication component 144 may also decrease latency. For example, the application 114(1) in the application layer 102 may attempt to read the same data from multiple data stores, and make use of the copy of the data from the data store with the fastest response. The replication component 144 may be used in conjunction with a modular component that is able to guarantee data consistency, such as the multi-blob consistency component 160, as the replication component 144 lacks the ability to guarantee that the duplicate copies of the data will remain unchanged prior to a subsequent access.

The application interface component 146 may translate the data transaction requests from the application into a storage interface language used by the tiered middleware framework 106. Likewise, the data store adapter component 148 may translate data transaction requests from a storage interface language that is used by the modular components of the tiered middleware framework 106 into a specific database system interface language. Accordingly, different data store adapter components 148 may be tailored to translate data transaction request into different languages that are understood by the various database systems and blob storage system, such as Oracle®, Amazon S3®, DB2®, and/or the like. In this way, the inner workings of the tiered middleware framework 106 may be database system agnostic.

The encoder component 150 may convert data that is transferred between the application layer 102 and the data storage layer 110 from one format to another format, and vice versa. For example, data of a particular format from the application layer 102 may be converted by an instance of the encoder component 150 into a format that is used by various modular components of the tiered middleware framework 106, and vice versa. In another example, another instance of the encoder component 150 may convert the data in a format used by the tiered middleware framework 106 into a format that is understood by data storage layer 110, and vice versa.

The encryption component 152 may encrypt data as the data is transferred between the application layer 102 and the data storage layer 110 through the tiered middleware framework 106. In various embodiments, the encryption component 152 may use various cryptography techniques to encrypt the data. Likewise, the encryption component 152 may also decrypt any encrypted data that is to be retrieved from the data stores of the data storage layer 110. The encryption component 152 may also manage or store the encryption keys associated with the encryption and/or decryption (e.g., cryptographic keys).

The data compression component 154 may compress and decompress data in various data transaction. For example, the data compression component 154 may be integrated into the tiered middleware framework 106 to compress data from the application layer 102 that are to be written to the data stores in the data storage layer 110. Likewise, the data compression component 154 may also decompress data that are read from the data storage layer 110 as the data transits through the tiered middleware framework 106 to the application layer 102. In various embodiments, the data compression component 154 may, depending on the nature of the data and the desired use for the data, compress the data using lossless compression techniques or lossy compression techniques.

An indexer component, such as the transactionally consistent indexer component 158 or the eventually consistent indexer component 156, may send one or more attributes of the data in each data transaction to a data index. The data index may enable an application, such as the application 114(1), as well as other components of the tiered middleware framework 106, to find data in the data stores of the data storage layer 110 using the attributes of the data. In operation, an indexer component may intercept data transaction traffic so that certain attributes of the data in each data transaction may be sent to the data index.

The eventually consistent indexer component 156 may provide an index that eventually becomes consistent with the actual data transactions (e.g., data writes) that are implemented in the data stores of the data storage layer 110. However, the index of the eventually consistent indexer component 156 may experience a certain amount of consistency lag. In various embodiments, the eventually consistent indexer component 156 may monitor all the transaction traffic (e.g., data writes) that are initiated by the application layer 102 to the data stores of the data storage layer 110. The date writes may contain metadata that indicates that attributes of the data to be indexed by the eventually consistent indexer component 156. Alternatively, the eventually consistent indexer component 156 may be preconfigured to index certain attributes of the data transacted. Accordingly, with every data transaction request (e.g., data writes), the eventually consistent indexer component 156 may refrain from immediately performing the indexing operation. Instead, the eventually consistent indexer component 156 may place the attributes of the data being transacted in a queue. The queue may be a guaranteed message queue that becomes consistent in a relatively short duration of time (e.g., minutes) or a non-guaranteed message queue that may become consistent in a longer duration of time (e.g., days).

The transactionally consistent indexer component 158 may provide an index that is transactionally consistent. In other words, at any time an index provided by the transactionally consistent indexer is queried by an application 114(1), the data in the index accurately reflects the actual data transactions (e.g., data writes) that are implemented in the data stores of the data storage layer 110. The operations of the transactionally consistent indexer component 158 may be further described below in FIGS. 4-9.

Thus, the decision to implement an eventually consistent indexer component 156 versus a transactionally consistent indexer component 158 into the tiered middleware framework 106 may be driven by the nature of the data to be written to the data stores or the nature of applications that manipulate the data. For example, a data index that is accessed by an application 114(1) shortly after a write may be handled via a transactionally consistent indexer component 158. However, historical data that is infrequently written to may be indexed by the eventually consistent indexer component 156.

The multi-blob consistency component 160 may ensure that a data transaction that contains related multiple data pieces, such as data pieces from the chunking component 136, is implemented as a single transaction. In other words, if multiple data pieces are to be stored to the data storage layer 110, the multiple-blob consistency component may serve to ensure that all of the data pieces are successfully written to the data stores in the data storage layer 110 before any part of the write becomes visible to an application in the application layer 102. In this way, the multi-blob consistency component 160 may prevent data corruption. The operation of the multi-blob consistency component 160 may be further described below in FIGS. 10-14.

The blob transaction component 162 may facilitate data transactions across arbitrary data blobs in an optimistically consistent manner. The arbitrary data blobs may be stored in different data stores of the data storage layer 110. The arbitrary data blobs may have no pre-defined relationship between them. Accordingly, when compared to the multi-blob consistency component 160, the blob transaction component 162 may provide greater data transaction versatility, as the multi-blob consistency component 160 is intended to provide data transactions across data blobs that share a pre-established relationship. However, the blob transaction component 162 may be less efficient in implementing data transactions than the multi-blob consistency component 160, due to the fact that the blob transaction component 162 performs more data duplications to achieve a single data transaction across two data blobs than the multi-blob consistency component 160. Nevertheless, in some embodiments described below, the blob transaction component 162 may be used in conjunction with the multi-blob consistency component 160 to provide greater data transaction flexibility and/or enhance the efficiency of the blob transaction component 162. The operations of the blob transaction component 162 may be further described below in FIGS. 15-23.

The sub-containment concurrency component 164 may ensure optimistic concurrency for transactions on data that are organized according to a sub-containment hierarchical structure. The sub-containment hierarchical structure is a data organization structure in which a container that contains a piece of data is also said to contain sub-containers that contain additional pieces of data. Each of the sub-containers may further contain sub-containers of its own that contain additional pieces of data, and so on and so forth. Accordingly, when a container "A" (or a sub-container "A") contains another sub-container "B", the container "A" (or the sub-container "A") may be referred to as the "parent" of the sub-container "B", and the sub-container "B" may be referred to as the "child" of the container "A" (or sub-container "A"). In other words, the terms "parent" and "child" implies a direct container relationship between two containers without any intervening container. Thus, each container in the sub-containment hierarchical structure has exactly one "parent", except that the root container in the hierarchical structure has no parent. In contrast, when one or more intervening containers are present, a container "A" (or sub-container "A") that ultimately contains a sub-container "B" may be referred to as the "ancestor" of the sub-container "B". Conversely, in such a situation, sub-container "B" may be referred to as the "descendant" of the sub-container "A". However, "ancestor" may also be used synonymously with "parent", and "descendant" may also be used synonymously with "child". In various embodiments, each of the containers in the sub-containment hierarchical structure may be labeled with an identifier. Accordingly, the sub-container hierarchy may be established via the hierarchical linking of the containers.

The sub-containment concurrency component 164 may ensure optimistic concurrency for data in the sub-containment hierarchical structure by permitting concurrent writes to sub-containers so long as data read in preparation for the writes do not change before the writes. For example, if two application processes read and write separate, non-overlapping sub-containers, then both writes are permitted. However, if the scope of the read for one application process overlaps with the read or write of another application process, then the sub-containment concurrency component 164 may cause one of the writes to succeed while the write of the other application process to fail. In this way, the sub-containment concurrency component 164 may guarantee that no changes made by the various application processes are inadvertently overwritten and lost. The operation of the sub-containment concurrency component 164 is further illustrated below in FIGS. 24-30.

Figure 2:
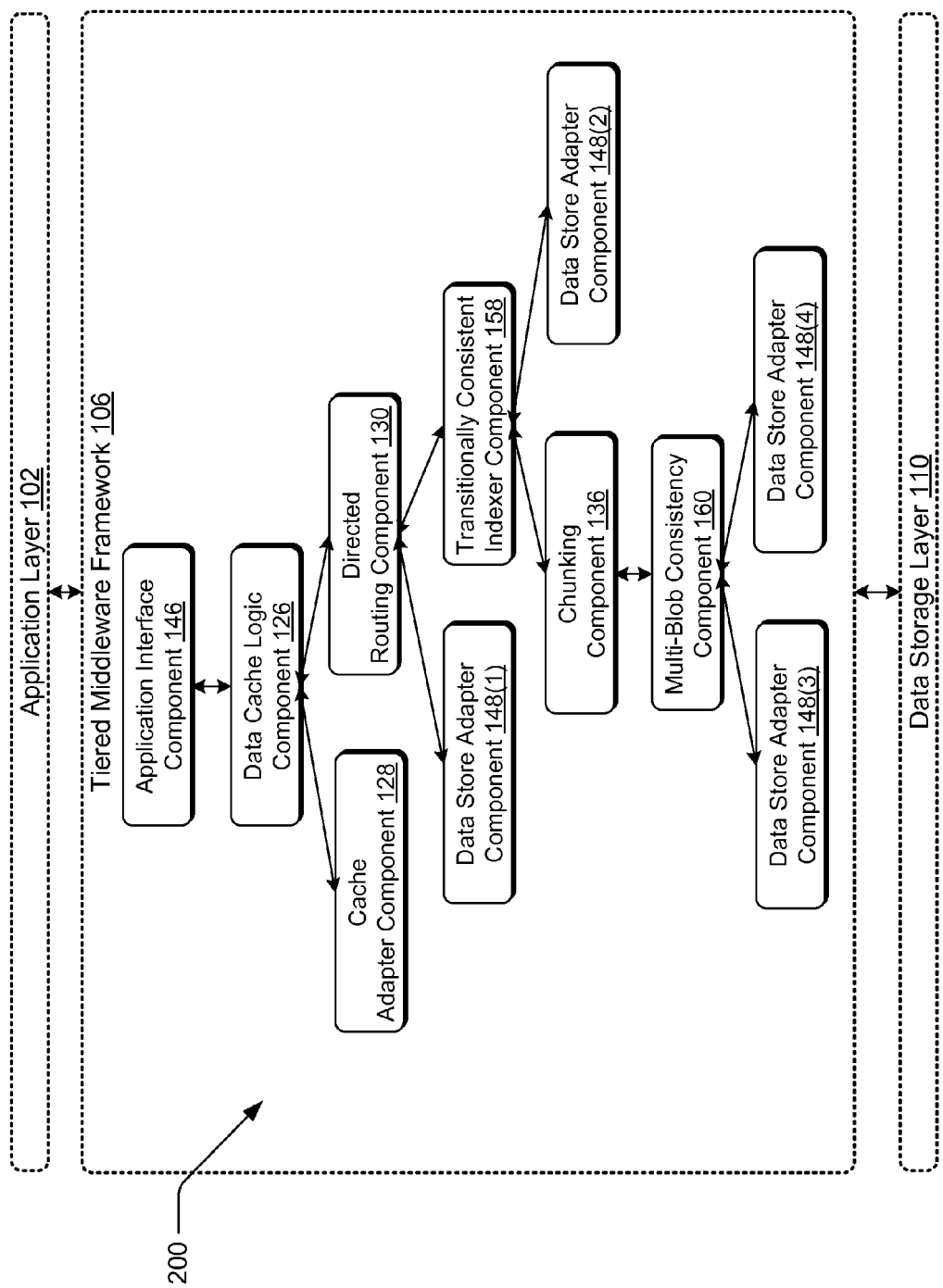
FIG. 2 shows an illustrative component stack of modular data transaction components in an example tiered middleware framework.

FIG. 2 shows an illustrative component stack 200 of modular data transaction components in an example tiered middleware framework 106. The component stack 200 of the tiered middleware framework 106 may be constructed using the modular components from the modular component library 124. The modular components shown in the illustrative component stack 200 are depicted as a stack of modular components interconnected with a series of arrows. The hierarchical arrangement of the modular component and the series of arrows in the example tiered middleware framework 106 indicates the flow of data through the various components as the data transit from the application layer 102 to the data storage layer 110, or vice versa. In various embodiments, the modular components of the component stack 200 may communicate using a stream-of-streams, that is, a stream of stream pointers/references that represent all the data within a transaction. Moreover, metadata with well-defined semantics may allow the modular components in the component stack 200 to cooperatively provide the various functions of the of the tiered middleware framework 106.

As shown in FIG. 2, the application interface component 146 of the example component stack 200 may receive data transactions, e.g., data reads and/or data writes, from an application, such as the application 114(1) of the application layer 102. In turn, the application interface component 146 may translate the data transactions from the application into a storage interface language used by the tiered middleware framework 106 before passing the data transactions to the data cache logic component 126.

The data cache logic component 126 may route the data transactions to additional modular components, such as the cache adapter component 128. In various embodiments, the cache adapter component 128 may enable the tiered middleware framework 106 to cache the data of the data transaction to a memory object caching system. Thus, subsequent access to the same data by the application 114(1) may result in the data being retrieved from the memory object caching system, rather than the data stores in the data storage layer 110. In this way, the speed of subsequent access to the data may be increased.

The data cache logic component 126 may also route the data transactions to the directed routing component 130. In turn, the directed routing component 130 may route data transactions to various data stores having different characteristics. As described above, the directed routing component 130 may route the data under the guidance of the application 114(1) or based on its own analysis of the data transactions.

As shown in FIG. 2, the directed routing component 130 may route some of the data transactions to a data store adapter component 148(1). In some embodiments, the data store adapter component 148(1) may facilitate the transfer of data to and from a data store that is more durable but less available. The directed routing component 130 may also route some of the data transactions to an indexer, such as the transactionally consistent indexer component 158.

In turn, the transactionally consistent indexer component 158 may extract and send one or more attributes of the data in each data transaction to a data index in stored in the data storage layer 110 via a data store adapter component 148(2). The transactionally consistent indexer component 158 may also simultaneously route the data in each data transaction to the chunking component 136.

At chunking component 136, the data in each data transaction may be broken down into smaller data chunks. As described above, the chucking component may break down data based on a predetermined size limitation or based on application schemas. Subsequently, the chunking component may route the data pieces to the multi-blob consistency component 160.

The multi-blob consistency component 160 may ensure that all of the data pieces are successfully written to the data stores in the data storage layer 110 to prevent data corruption (e.g., only half of the data pieces are successfully written). As describe above, the multi-blob consistency component 160 may make use of data in the form of a master record to manage the storage of the data pieces into the data stores. Such a master record is generally small in size, but it is essential that this master record is stored in a data store that offers a high degree of consistency and high degree of availability. Accordingly, the multi-blob consistency component 160 may use a data store adapter component 148(3) to route the master record to a data store in the data storage layer 110 that offers the requisite high degree of consistency and the requisite degree of availability. On the other hand, since the consistency of the actual data pieces to be stored in the data storage layer 110 is managed by the transactionally consistent indexer component 158, the multi-blob consistency component 160 may use a data store adapter 148(4) to route the data pieces to data stores that may be more plentiful but do not necessarily possess the same degree of consistency and/or availability characteristics. Thus, it will be appreciated that the data store adapters 148(1)-148(5) may be different versions of the data store adapter 148, each version being specifically tailored to communicate with a particular type of data store.

It will be appreciated that the illustrative component stack 200 is intended to illustrate only one possible arrangement of the modular components from the modular component library 124 to form the tiered middleware framework 106. Accordingly, the tiered middleware framework 106 may be formed via other arrangements of the modular components from the modular component library 124.

Figure 3:
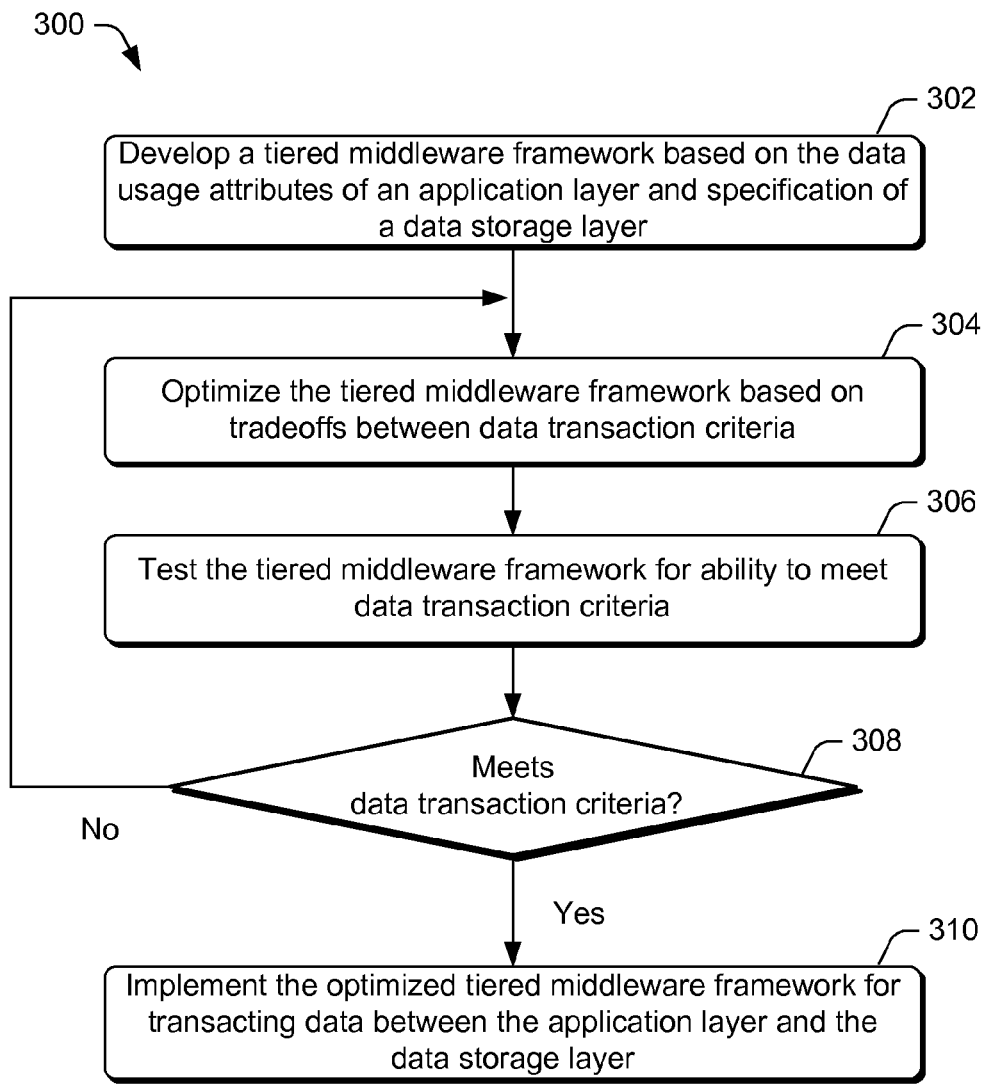
FIG. 3 is a flow diagram of an illustrative process for developing a tiered middleware framework of modular data transaction components for transacting data.

FIG. 3 is a flow diagram of an illustrative process 300 for developing a tiered middleware framework of modular data transaction components for transacting data. The process 300 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At block 302, a tiered middleware framework, such as the tiered middleware framework 106, may be developed based on the data usage attributes of the one or more application in an application layer 102 and the specification of the data storage layer 110. In various embodiments, the data usage attributes may include at least one of, but are not limited to, the type of data to be transacted, access frequency of the data being transacted, the data latency, data availability, and/or data throughput needed by one or more application in the application layer, size of the data chunks, and/or the like, that are demanded by the one or more applications. The specification of the data storage layer 110 may include any two or more of the latency, the availability, the durability, the throughput, the operation cost, the number of the data stores, the type of the data stores, and/or the like. In various embodiments, the specification of the data storage layer 110 may be at least partially dependent on the data storage software providing the data stores, the organization scheme of the data servers in the data storage layer 110, the processing and storage capabilities of the data servers, the speed and throughput of the network infrastructure that connects the data servers, and/or the like. The tiered middleware framework 106 may be developed by the arrangement of modular components from the modular component library 124 into a component stack that enables the transfer of data between the application layer 102 and the data storage layer 110. In various embodiments, each of the modular components from the modular component library 124 may be implemented any number of times during the development of the tiered middleware frame 106.

At block 304, the developed tiered middleware framework may be optimized based on tradeoffs between data transaction criteria. The data transaction criteria may include, but are not limited to, desired objectives for any two or more of latency, availability, consistency, durability, operation cost, or throughput of each data transactions, and/or the like. In some embodiments, such tradeoff may be considered independently of application type, in other words, regardless of whether the application is an online shopping application, online banking application, blog application, and/or the like.

Rather, the tiered middleware framework may be optimized strictly from the perspective improving the performance of the data transactions used via tradeoffs between the data transaction criteria. The optimization of the tiered middleware framework may involve reorganization of the modular components in the pre-existing framework, integration of one or more additional instances of a modular component that is already present in the pre-existing framework to the framework, and/or addition of one or more other modular components or different versions of the same modular component to the pre-existing framework. The optimization may further involve elimination of one or more modular components from the pre-existing framework, and/or replacement of at least one modular component in the pre-existing framework with another modular component or another version of the same modular component.

At block 306, the optimized tiered middleware framework 106 may be tested for ability to meet the data transaction criteria. In some embodiments, the optimized tiered middleware framework may be tested via the actual transfer of data between the application layer 102 and the data storage layer 110 during real life usage. In other embodiments, the optimized tiered middleware framework may be tested via transfer of data using simulated data transactions. The test results may be obtained using quantitative measurements (e.g., data read speed, data write speed, data error rate, data loss rate, and/or the like), and/or qualitative measurements (e.g., accuracy of the data that is retrieved, load handling ability, and/or the like).

At decision block 308, it may be determined whether the optimized tiered middleware framework 106 meets the data transaction criteria in transferring data between the application layer 102 and the data storage layer 110. Thus, if it is determined that the optimized tiered middleware framework meets or exceeds the data transaction criteria ("yes" at decision block 308), the process 300 may proceed to block 310. At block 310, the optimized tiered middleware framework 106 may be implemented for transacting data between the application layer and the data storage layer.

However, if it is determined that the optimized tiered middleware framework does not meet the data transaction criteria ("no" at decision block 308), the process 300 may loop back to block 304, at which time the tiered middleware framework 106 may be re-optimized. In other words, the existing modular component in the component stack of the tiered middleware framework may be further rearranged. The rearrangement of the tiered middleware framework may involve reorganization of the modular components in the pre-existing framework, integration of one or more additional instances of a modular component that is already present in the pre-existing framework to the framework, and/or addition of one or more other modular components or different versions of the same modular component to the pre-existing framework. The rearrangement may further involve elimination of one or more modular components from the pre-existing framework, and/or replacement of at least one modular component in the pre-existing framework with another modular component or another version of the same modular component.

Transactionally Consistent Indexer Component

A blob storage system, such as some embodiments of the data storage layer 110, normally stores and retrieves data blobs according to an identifier (e.g., primary key) of each object. Each primary key may enable an application, such as the application 114(1) of the application layer 102, to locate the corresponding data blob. However, in many instances, the application may desire to locate data blobs from the data storage layer 110 using a property or field value contained in the data blob rather than via the primary key. For example, the primary key of a data blob that is an online purchase order may be the order number. However, the application may desire to locate the online purchase order based on a customer name that is contained in the online purchase order rather than its order number.

The transactionally consistent indexer component 158 may use an index that tracks a data blob via properties or field values within the data blob, and also provides the location of the data blob in the data storage layer 110. Accordingly, when an application desires to a modify the data blob in some manner, the application may run an query on the index, the index may enable the application to locate the data blob via a property or field value of the data for modification, and then perform the desired data transaction on the data blob. Thus, in order for the index to adequate perform its function, it is desired that the index is transactionally consistent, that is, the index is updated every time a property or field value of a data blob being tracked is changed. In this way, the results of queries against the index are always consistent with the states of the data blobs stored in the data storage layer 110. The structure of the index that used by transactionally consistent indexer component 158 is illustrated below in FIG. 4.

Figure 4:
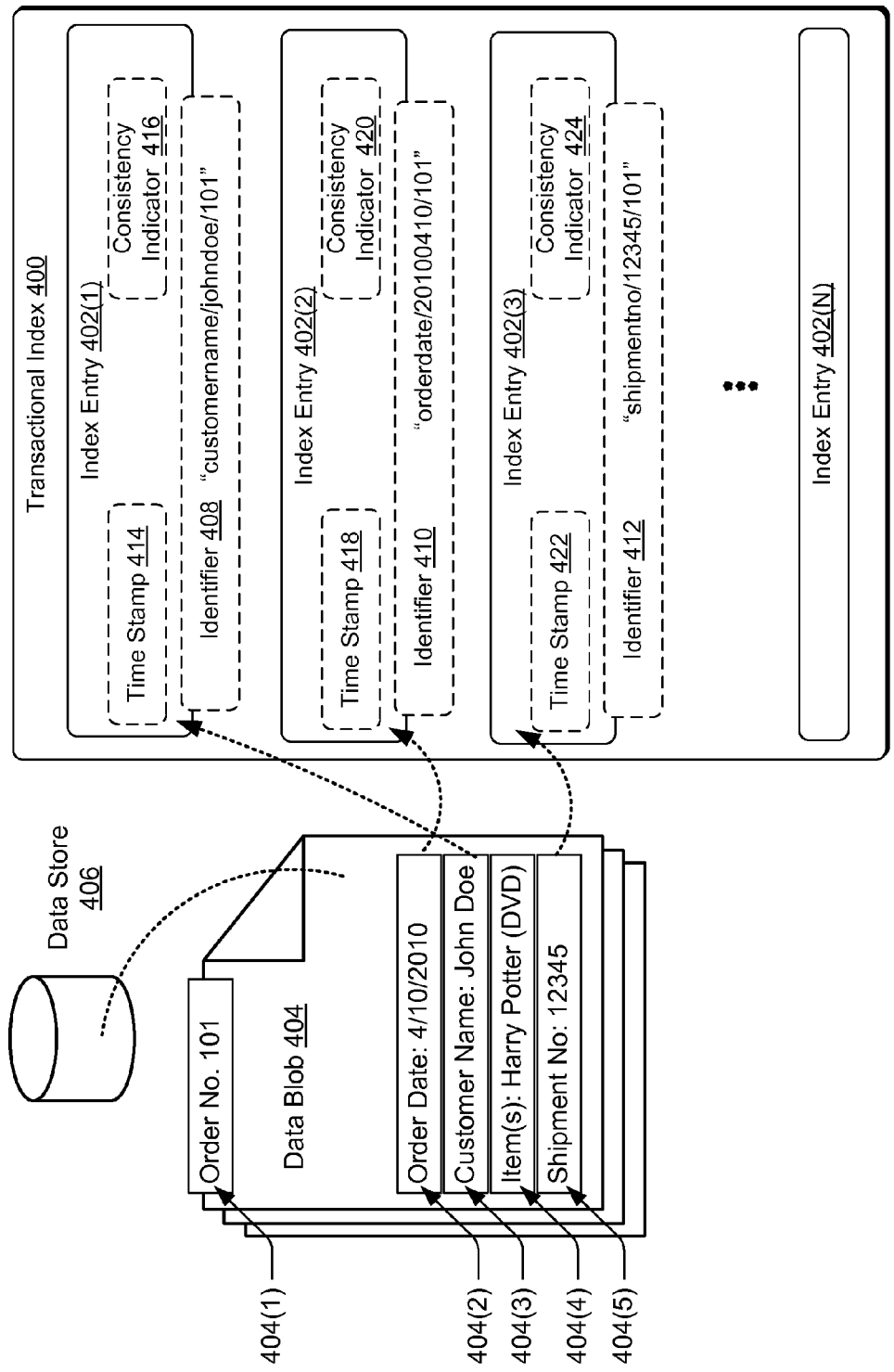
FIG. 4 shows an illustrative block diagram of a transactional index that is maintained by a transactionally consistent indexer component.

FIG. 4 shows an illustrative block diagram of a transactional index 400 that is maintained by the transactionally consistent indexer component 158. The transactional index 400 may be stored in a data store of a blob storage system, such as the data storage layer 110. The transactional index 400 may include a plurality of index entries, such as entries 402(1)-402(N). Each of the index entries may track a particular data blob in the data storage layer 110 by a particular property or field of the data blob. Moreover, a single data blob may be tracked by multiple index entries in the transactional index 400. In various embodiments, the identifier of an index entry may be a combination of a property or field name of the data blob that the index entry is designed to track, the value of the property or field, and the primary key of the data blob.

For example, as shown in FIG. 4, the data blob 404 may be an online purchase order placed by a particular customer. The data blob 404 may be stored in a data store 406 of the data storage layer 110. The data blob 404 may include an order number field 404(1) that stores the order number, which may also be the primary key for the data blob 404. The data blob 404 may further include an order date field 404(2) that stored a value in the form of the date of the order, a customer name field 404(3) that stores a value in the form of the name of the customer who placed the order, an item field 404(4) that stores a value in the form of one or more products purchased by the customer, and a shipment number field 404(5) that stores a value in the form of a shipment number.

In such an example, the data blob 404 may be tracked by a plurality of index entries in the transactional index 400, such as index entries 402(1)-402(3). The index entry 402(1) may be designed to track the data blob 404 via the data value in the customer name field 404(3). Accordingly, the index entry 402(1) may be labeled with an identifier 408 that is formed via a combination of the field name "customer name", the field value "John Doe", and the primary key "101". Thus, the identifier 408 of the index entry 402(1) may be written as "customername/johndoe/101", with exemplary "/" value separators. The identifier 408 may be field value that is stored in an identifier field of the index entry 402(1).

The identifier 408 may also act as a pointer to a specific location in the data storage layer 110 where the data blob that is tracked by index entry is stored, as it contains a primary key that leads to the data blob. For example, in order to obtain access to the data blob 404, the transactionally consistent indexer component 158 may strip out the primary key from the identifier 408. Specifically, the transactionally consistent indexer component 158 may obtain the primary key "101" from the identifier 408, which is "customername/johndoe/101", and use the primary key "101" to obtain access to the data blob.

Likewise, the index entry 402(2) may be designed to track the data blob 404 via the data value in the order data field 404(2). Accordingly, the index entry 402(2) may be labeled with an identifier 410 that is formed via a combination of the field name "order data", the field value "4/10/2010", and the primary key "101". Thus, the identifier 410 of the index entry 402(2) may be written as "orderdate/20100410/101", with exemplary "/" value separators. The identifier 410 may be a field value that is stored in an identifier field of the index entry 402(2).

In a similar manner, the index entry 402(3) may be designed to track the data blob 404 via the data value in the shipment number field 404(5). Accordingly, the index entry 402(3) may be labeled with an identifier 412 that is formed via a combination of the field name "shipment no.", the field value "12345", and the primary key "101". Thus, the identifier 410 of the index entry 402(3) may be written as "shipmentno/12345.101", with exemplary "/" value separators. The identifier 410 may be field value that is stored in an identifier field of the index entry 402(3).

The information included in each of the index entries 402 (1)-402(N) may further enable each index entry to be updated when the data blob is modified. As shown with respect to index entry 402(1) and the data blob 404, the information present may include a time stamp 414 (e.g., real time or Lamport time). The time stamp 414 may track the time that the corresponding data blob 404 is modified. However, the index entry 402(1) might not include the time stamp when the data storage layer 110 is capable of providing this information.

Each of the index entries 402(1)-402(N) may further include a consistency indicator. As shown, the index entry 402(1) may include a consistency indicator 416. The consistency indicator 416 may indicate the status of the tracked field value 404(3) of the corresponding data blob 404. To achieve this, the consistency indicator may show one of four different states: (1) agrees; (2) creating; (3) deleting; and (4) maybe. The "agrees" state may indicate that the field value 404(3) in the data blob 404 is being accurately tracked by the index entry 402(1). The "creating" state may indicate that the field value 404(3) tracked by the index entry 402(1) is being added to the data blob 404. The "deleting" state may indicate that the data blob 404 is losing the field value 404(3) tracked by the index entry 402(1). The "maybe" state may indicate that there is some uncertainty as to the disposition of the field value 404(3) of the data blob 404 being tracked by the index entry.

Each of the index entries 402(2)-402(3) may also include information that functions in a similar manner as the information included in the index entry 402(1). For example, the index entry 402(2) may include a time stamp 418 and a consistency indicator 420 that perform similar functions for the index entry 402(2). Likewise, the index entry 402(3) may include a time stamp 422 and a consistency indicator 428 that perform similar functions for the index entry 402(3). Each of the time stamps 414, 418 and 422 may act as a version number for the purpose of ensuring optimistic concurrency. Moreover, other values, such as globally unique identifiers (GUIDs), may be used instead in other embodiments as long as the values perform the same function as the time stamps.

Figure 5:
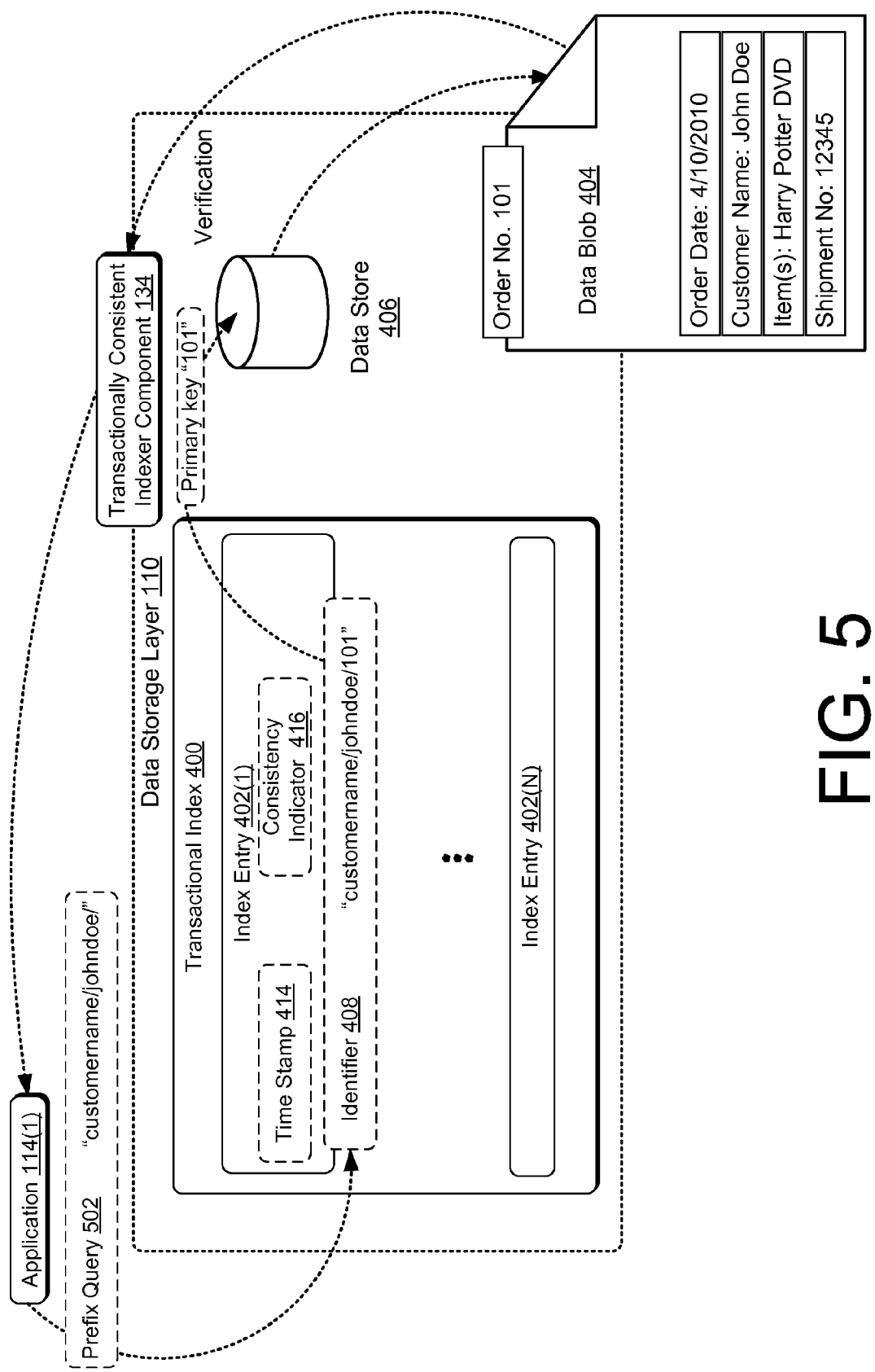
FIG. 5 shows an illustrative block diagram of querying for a data blob using a transactional index maintained by a transactionally consistent indexer component.

FIG. 5 shows an illustrative block diagram of querying for a data blob using a transactional index maintained by the transactionally consistent indexer component 158. As shown, the application 114(1) may be commanded by a user to retrieve one or more data blobs in the form of online purchase orders from the data storage layer 110 via a query. For example, the query by the application 114(1) may be for online purchase orders in which the name of the customer is "John Doe". In various embodiments, the data storage layer 110 may support "prefix querying" of each index entry in the transactional index 400. Prefix querying may enable the application 114(1) to search for a single value of a field, or a range of values of a field, via a prefix.

Thus, in the example above in which the application 114(1) is querying for online purchase orders in which the name of the customer is "John Doe", the data storage layer 110 may translate the original query into the prefix query 502, which may use a prefix query string "customername/johndoe/". Subsequently, the data storage layer 110 may compare the query against the identifiers of the index entries 402(1)-402(N) in the transactional index 400. During the comparison, the data storage layer 110 may determine that the prefix query string "customername/johndoe/" is a prefix match to the identifier 408 of the index entry 402(1), which is "customername/johndoe/101". Accordingly, the transactionally consistent indexer component 158 may use the primary key "101" in the identifier 408 of the index entry 402(1) to retrieve the data blob 404 from the data store 406. As further described below, the transactionally consistent indexer component 158 may verify that the integrity of the data in the data blob 404. The validated data is then return to the requesting application 114(1).

It will be appreciated that the depiction of prefix querying using the index entry 402(1) as described above is only intended as one illustrative example. In other instances, the prefix querying may find more than one matching data indexes. For example, if the customer "John Doe" has placed multiple online purchase orders, there may be index entries with identifiers such as "customername/johndoe/102", "customername/johndoe/103", and so on and so forth. As a result, by leveraging the nature of the prefix querying mechanism, the data storage layer 110 may match the prefix query string to all of such identifiers. This means that additional corresponding data blobs (e.g., online purchase orders or other pieces of data) may be retrieved, verified, and then returned to the application 114(1) in the same manner. Moreover, the above querying process illustrates that the number of different index entries used to track a single data blob may be a design choice. A corresponding index entry may be created and placed in the transactional index 400 for every property or field of the data blob that is to be made searchable.

FIGS. 6-9 show illustrative processes 600-900 that depicts the operations of the transactionally consistent indexer component 158. Each of the processes 600-900 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 6:
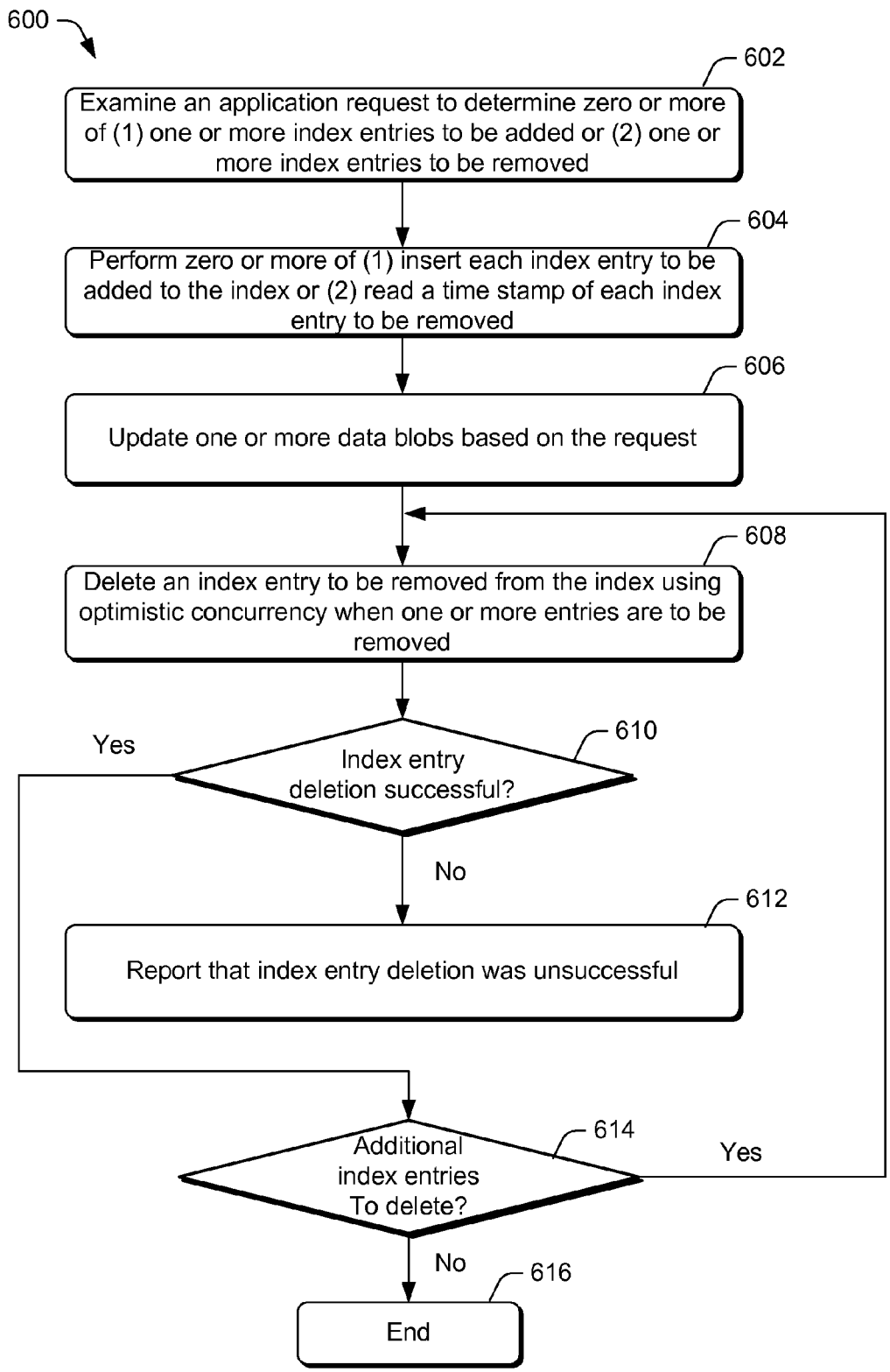
FIG. 6 is a flow diagram of an illustrative process for updating a transactional index maintained by a transactionally consistent indexer component, in which each of the index entries is in a "maybe" state.

FIG. 6 is a flow diagram of an illustrative process 600 for updating a transactional index maintained by the transactionally consistent indexer component 158, in which each of the index entries is in a "maybe" state. The update to the transaction index may include the deletions of one or more existing index entries and the additions of one or more new index entries. The deletions and additions of the index entries may reflect data modifications that are performed on corresponding data blobs, such as create, update, and/or delete operations.

At block 602, the transactionally consistent indexer component 158 may examine a data transaction request from an application, such as the application 114(1). Based on the examination, the transactionally consistent indexer component 158 may determine zero or more of (1) one or more index entries to be added or (2) one or more index entries to be removed from the transactional index 400. For instance, at least one new index entry may be created in the transactional index 400 when a new data blob is added to a data store in the data storage layer 110. However, an index entry may be deleted from the transactional index 400 when an existing data blob is deleted from a data store in the data storage layer 110. In other instances, an index entry may be added and a corresponding index entry deleted when a property or field value in a stored data blob is changed. For example, the customer name in a data blob that is an online purchase order may be changed from "John Doe" to "Jane Doe".

In various embodiments, the determination that an index entry is to be deleted from the transactional index 400 may be achieved based on information from several sources. In one instance, the application 114(1) may explicitly provide that a certain index entry is to be deleted. For example, the application 114(1) may indicate that the customer name in the online purchase order with the primary key (order number) "101" is to be changed from "John Doe" to "Jane Doe" per an authorized customer request. Accordingly, the transactionally consistent indexer component 158 may determine that the index entry 402(1) for the data blob 404 is to be deleted, and a new index entry with the identifier "customernamejanedoe101" is to be created to take its place.

In another instance, the transactionally consistent indexer component 158 may read a data blob in order to delete an index entry. For example, the application 114(1) may provide a request that states "replace the value in the customer field of the data blob with the primary key (order number) '101' with the value "Jane Doe'". In such an instance, the transactionally consistent indexer component 158 may need to locate the data blob 404, which has the primary key "101", and read the data blob 404 to discover that the current customer name in the data blob 404 is "John Doe". Subsequently, the transactionally consistent indexer component 158 may determine that the index entry 402 is to be removed as its identifier 408 is "customername/johndoe/101".

At block 702, the transactionally consistent indexer component 158 may examine a data transaction request from an application, such as the application 114(1). Based on the examination, the transactionally consistent indexer component 158 may determine zero or more of (1) one or more index entries to be added or (2) one or more index entries to be removed from as transaction index, such as the transactional index 400. For instance, at least one new index entry may be created in the transactional index 400 when a new data blob, such as the data blob 404, is added to a data store in the data storage layer 110. However, an index entry may be deleted from the transactional index 400 when an existing data blob is deleted from a data store in the data storage layer 110. In other instances, an index entry may be added and a corresponding index entry deleted when a property or field value in a stored data blob is changed. For example, the customer name in the data blob 404 that is an online purchase order may be changed from "John Doe" to "Jane Doe".

At block 604, if there are one or more index entries to be added, the transactionally consistent indexer component 158 may insert each index entry to be added to the transactional index 400. The consistency indicator in each inserted index entry is also set to the state of "maybe". Further, the insertion of each index entry may be performed with optimistic concurrency to prevent duplicate insertion. For example, a pre-existing entry may be "re-inserted" by being read by the transactionally consistent indexer component 158, and the time stamp in the preexisting entry updated to reflect the current time.

Additionally, if there are one or more index entries to be deleted, the transactionally consistent indexer component 158 may read each index entry and ascertain the time data in the time stamp of each index entry. For example, if the index entry 402(1) is to be deleted, the transactionally consistent indexer component 158 may read the time data in the time stamp 414. As further described below, the reading of the time data of each index entry is for the purpose of ensuring optimistic concurrency.

At block 606, the data storage layer 110 may perform one or more data modifications on the one or more data blobs based on the application request. The data modifications may include create, update, and/or delete operations. For example, a data modification may be the replacement of the value in the customer name field 404(3) of the data blob 404 from "John Doe" to "Jane Doe", as requested by the application 114(1) of the data storage layer 102.

At block 608, if there are one or more index entries to be deleted, the transactionally consistent indexer component 158 may asynchronously delete an index entry using optimistic concurrency. For example, recall that the index entry 402(1) for the data blob 404 is labeled with the identifier 408, which is "customername/johndoe/101". Thus, the index entry 402(1) is to be deleted when an application request changes the customer name for the online purchase order (data blob 404) from "John Doe" to "Jane Doe".

However, prior to the deletion of the index entry 402(1), a second application request (e.g., from another user) may change the customer name for the online purchase order (data blob 404) back from "Jane Doe" back to "John Doe". Thus, the transactionally consistent indexer component 158 may desire to create another index entry that is identical to the index entry 402(1). However, further recall from the description of block 604 that rather than creating a duplicate index entry, the transactionally consistent indexer component 158 may "re-insert" a preexisting entry by reading the time stamp in the preexisting entry and updating the time stamp to reflect the current time. In other words, the time stamp of index entry 402(1) may be updated as a result of the second application request. In this particular example, due to the timing in handling the requests, the transactionally consistent indexer component 158 may actually complete the time stamp update of the index entry 402(1) for the second application request prior to the deletion of the index entry 402(1).

Thus, in such an example, when the transactionally consistent indexer component 158 attempts to delete the index entry 402(1), the component 158 may again check the time stamp of the index entry 402(1) and discover that the time data in the time stamp no longer matches the time data it read at block 604 (due to the time stamp update caused by the second application request). Accordingly, the transactionally consistent indexer component 158 may determine that optimistic concurrency has failed, and may abort the attempt to delete the index entry 402(1). It will be appreciated that the above example is only one illustrative situation in which an optimistic concurrency failure will prevent index entry deletion, and that other situations may also benefit from the use of optimistic concurrency.

Thus, at decision block 610, if the transactionally consistent indexer component 158 is unable to delete an index entry due to an optimistic concurrency failure ("no" at decision block 610), the process 600 may proceed to block 612. At block 612, the transactionally consistent indexer component 158 may report back to the requesting application, such as the application 114(1), that the index entry deletion attempt was unsuccessful. In alternative embodiments, the transactionally consistent indexer component 158 may attempt a predetermined number of index entry deletion retries before reporting to the application 114(1) that the deletion attempt was unsuccessful. However, if the transactionally consistent indexer component 158 is able to successfully complete the deletion ("yes" at decision block 610), the process 600 may proceed to decision block 614.

At decision block 614, the transactionally consistent indexer component 158 may determine if there are additional index entries to delete. Thus, if the transactionally consistent indexer component 158 determines that there are additional index entries to delete ("yes" at decision block 614), the process 600 may loop back to block 608, at which point the transactionally consistent indexer component 158 may delete another index entry using optimistic concurrency. However, if the transactionally consistent indexer component 158 determines that there are no additional index entries to delete ("no" at decision block 614), the process 600 may terminate at block 616.

Figure 7:
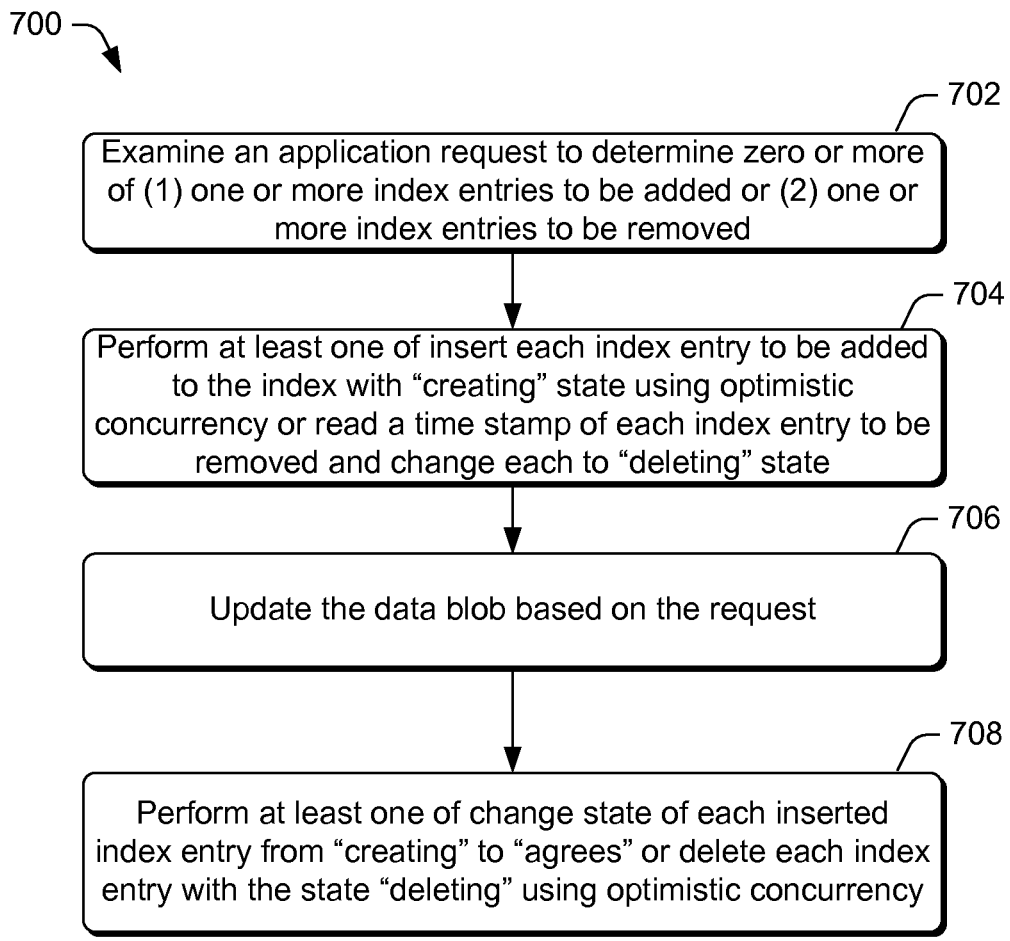
FIG. 7 is a flow diagram of an illustrative process for updating a transactional index maintained by a transactionally consistent indexer component, in which each of the index entries is in one of three possible states.

FIG. 7 is a flow diagram of an illustrative process 700 for updating a transactional index maintained by the transactionally consistent indexer component 158, in which each of the index entries is in one of three possible states. The three possible states are "agrees", "creating", and "deleting."

At block 702, the transactionally consistent indexer component 158 may examine a data transaction request from an application, such as the application 114(1). Based on the examination, the transactionally consistent indexer component 158 may determine zero or more of (1) one or more index entries to be added or (2) one or one index entries to be removed from as transaction index, such as the transactional index 400. For instance, at least one new index entry may be created in the transactional index 400 when a new data blob, such as the data blob 404, is added to a data store in the data storage layer 110. However, an index entry may be deleted from the transactional index 400 when an existing data blob is deleted from a data store in the data storage layer 110. In other instances, an index entry may be added and a corresponding index entry deleted when a property or field value in a stored data blob is changed. For example, the customer name in the data blob 404 that is an online purchase order may be changed from "John Doe" to "Jane Doe".

In various embodiments, as described above with respect to block 602 of process 600, the deletion of index entries from the transactional index 400 may be achieved based on information from one of several sources: (1) an application that made the data modification request; (2) data read from a data blob; or (3) a reverse index.

At block 704, if there are one or more index entries to be inserted, the transactionally consistent indexer component 158 may insert each index entry to be added to the transactional index 400. The consistency indicator in each inserted index entry is also set to the state of "creating". Further, the insertion of each index entry may be performed with optimistic concurrency to prevent duplicate insertion.

In some embodiments, the transactionally consistent indexer component 158 may discover that an index entry having an identical identifier in a state of "creating" or "agrees" already exists in a transactional index while attempting to insert a particular index entry to be added. The transactionally consistent indexer component 158 may interpret the existence of such an identical entry as indicating that a similar data update is being performed for another application request. Accordingly, the transactionally consistent indexer component 158 may examine the time stamp of the existing index entry having the identical identifier. If the time stamp indicates that the index entry having the identical identifier was last updated within a predetermined time period of the current time (e.g., within a second), then the transactionally consistent indexer component 158 may treat insertion attempt as having experienced an optimistic concurrency failure. In such a case, the insertion of the particular index entry into the transactional index 400 may be aborted.

However, if the time stamp indicates that the index entry having the identical identifier was not last updated within the predetermined time period, then the transactionally consistent indexer component 158 may update the time stamp of the index entry having the identical identifier to reflect the time of the latest index entry insertion attempt instead of inserting a new identical index entry. Nevertheless, in alternative instances, the transactionally consistent indexer component 158 may be configured to always update the time stamp of the existing index entry without regard to any time stamp information. The update of the time stamp in these two scenarios may use optimistic locking to enforce optimistic concurrency, in which the time stamp of the index entry may be reexamined just prior to the update to ensure there has not been yet another modification due to another application request.

In other embodiments, the transactionally consistent indexer component 158 may discover that an index entry having an identical identifier, and with a state of "deleting" already exists in the transactional index while attempting to insert a particular index entry to be added. The transactionally consistent indexer component 158 may interpret the existence of such an index entry as indicating that a corresponding property or field value has just been removed from a corresponding data blob, and the current index entry insertion is due to an attempt to put the property or field value back into the data blob. As such, the transactionally consistent indexer component 158 may be configured to simply update the time stamp of the existing index entry. The update of the time stamp may use optimistic locking, in which the time stamp index entry may be reexamined just prior to the update to ensure there has not been yet another modification due to another application request.

Additionally or alternatively, if there are one or more index entries to be deleted, the transactionally consistent indexer component 158 may read each index entry and ascertain the time data in the time stamp of each index entry. The transactionally consistent indexer component 158 may also change the state of each index entry to be deleted from "agrees" to "deleting".

At block 706, the data storage layer 110 may perform data modifications on one or more data blobs based on the application request. The data modifications may include as create, update, and/or delete operations. For example, a data modification may be the replacement of the value in the customer name field 404(3) of the data blob 404 from "John Doe" to "Jane Doe", as requested by the application 114(1) of the data storage layer 102.

At block 708, if one or more index entries were added at block 704, the transactionally consistent indexer component 158 may asynchronously change the state of each inserted index entry to "agrees". In various embodiments, the transactionally consistent indexer component 158 may use optimistic locking to avoid interference with a concurrent index entry state change by using the updated time stamp of each inserted index entry described in block 704. In other words, the time stamp of each index entry to be added may be reexamined once again at the time of the state change. Thus, if the time stamp of an index entry with the state of "creating" is ascertained to be unchanged at the time of this reexamination, then the transactionally consistent indexer component 158 may change the state of the index entry to "agrees". However, if the time stamp of the index entry with the state of "creating" is ascertained to be changed, then the transactionally consistent indexer component 158 may abort an attempt to change the state of the index entry to "agrees".

Additionally, if the states of one or more index entries were changed from "agrees" to "deleting" at block 704, the transactionally consistent indexer component 158 may delete each of those index entries. In various embodiments, the deletion of each index entry may be protected via optimistic locking to avoid interference with a concurrent index entry state change. In other words, the time stamp of each index entry with the state of "deleting" may be reexamined just prior to its deletion to ensure there has not been yet another modification due to another application request. The optimistic locking may be implemented by comparing the time data in a time stamp of each index entry at the reexamination to corresponding time data of the time stamp read at block 704. Thus, if the time stamp of an index entry with the state of "deleting" is ascertained to be unchanged at the time of the reexamination, then the transactionally consistent indexer component 158 may delete the index entry. However, if the time stamp of the index entry with the state of "deleting" is ascertained to be changed, then the transactionally consistent indexer component 158 may abort an attempt to delete the time entry.

Figure 8:
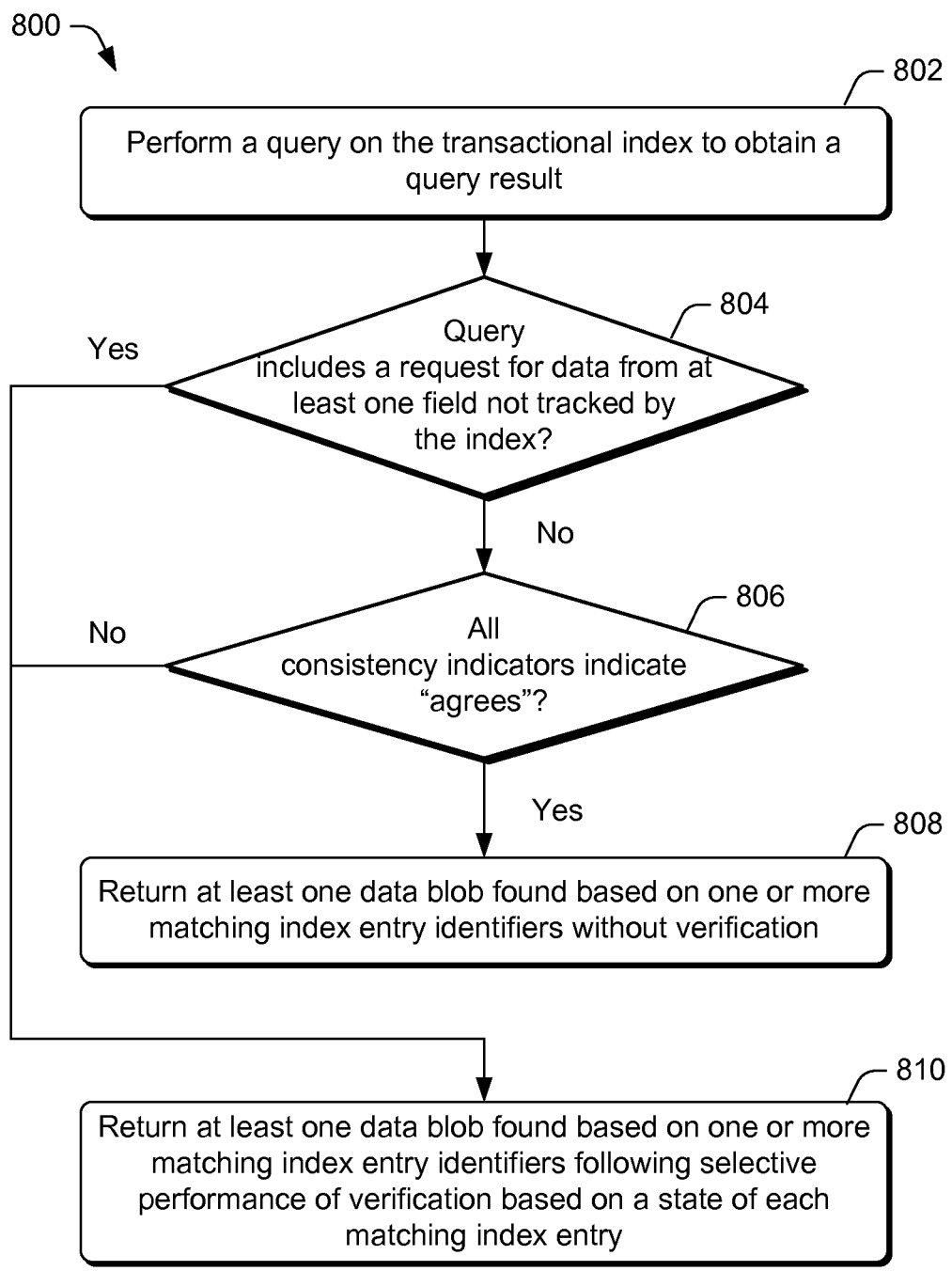
FIG. 8 is a flow diagram of an illustrative process for performing a query on a transactional index to return one or more data blobs followed by data verification.

FIG. 8 is a flow diagram of an illustrative process 800 for performing a query on a transactional index to return one or more data blobs followed by data verification. At block 802, the transactionally consistent indexer component 158 may perform a query on the transactional index 400 to obtain a query result. The query result may include one or more index entries that match the query. The query may be from an application, such as the application 114(1) of the application layer 102. In various embodiments, the query on the index may be for a single value of a field or a range of values. The transactionally consistent indexer component 158 may translate the query into a prefix or range query against the transactional index 400 to obtain both data that is tracked by the transactional index and data that is not tracked by the transactional index 400.

For instance, the data blobs in a data storage layer 110 may be online purchase orders, and the corresponding transactional index 400, rather than as described in FIG. 4, only includes index entries that track the customer name of each online purchase order. Accordingly, in such an instance, a query that states "find online purchase orders in which the customer name is John Doe" is an example of a query that includes a request for data from a field that is tracked by the transactional index 400. On the other hand, in the same instance, a query that states "find shipment numbers of all online purchase orders in which the customer name is John Doe" is an example of a query that includes a request for data from a field that is not tracked by the transactional index 400. The transactionally consistent indexer component 158 may obtain data in a data field that is not tracked by the transaction index 400 by using an associated data field that is tracked by transaction index 400. For example, even when shipment numbers of orders placed by John Doe are not tracked by the transactional index 400, the shipment numbers may nevertheless be obtained via a query because customer name is tracked by the transactional index 400. Thus, data blobs for John Doe that include ship numbers may be first obtained via a prefix query for orders placed by John Doe, and then the shipment number in each data blob may be read.

Subsequently, the transactionally consistent indexer component 158 may treat the query results differently based on whether the original query includes a request for data from at least one field of a data blob that is tracked or not tracked by the transactional index 400. Thus, at decision block 804, if the original query does not include a request for data from at least one field that is not tracked by the transaction index 400 ("no" at decision block 804), the process 800 may proceed to decision block 806.

At decision block 806, the transactionally consistent indexer component 158 may extract the state of the consistency indicator for each index entry. Further, the transactionally consistent indexer component 158 may determine whether the consistency indicator for each index entry indicates a state of "agrees". If all of the consistency indicators indicate "agrees" ("yes" at decision block 806), then the process 800 may proceed to block 808. At block 808, the transactionally consistent indexer component 158 may return that the data blob corresponding to each of the index entry as the query result without performing verification on the data blob.

Returning to decision block 804, if the original query did include a request for data from at least one field that is not tracked by the transaction index 400 ("yes" at decision block 804), the process 800 may proceed to block 810.

At block 810, the transactionally consistent indexer component 158 may selectively perform verification to determine whether the data obtained from using the query is to be returned to an application that made query. Thus, the data from at least one field in a data blob that is not tracked by the transactional index 400 may be verified by checking that the field holds a specific value that satisfies the query before the data in the field is returned as part of the query result to the application.

Additionally, if there is also data from at least one associated field that is tracked by the transactional index 400 to be return as part of the query result in conjunction with data from at least one untracked field, the transactionally consistent indexer component 158 may determine whether further verification for such data is to be performed. As such, if the consistency indicator of an index entry for a field whose data is in the query result indicates that the index entry has an "agrees" state, then the transactionally consistent indexer component 158 may determine that the data from a field corresponding to the index entry is to be returned in the query result. However, if the consistency indicator of an index entry indicates that the index entry has any other state, (i.e., creating, deleting, maybe), the transactionally consistent indexer component 158 may load the corresponding data blob so that the data in the field that correspond to such an index entry may be verified (e.g., having a certain type of value) before being returned as part of the query result to the application.

Returning to decision block 806, if all of the consistency indicators do not indicate "agrees" ("no" at decision block 806), then the process 800 may also proceed to block 810. Once again, at block 810, if the consistency indicator of an index entry whose data is in the query result indicates that the index entry has an "agrees" state, then the transactionally consistent indexer component 158 may determine that the data from a field corresponding to the index entry is to be returned in the query result. However, if the consistency indicator of an index entry indicates that the index entry has any other state, (i.e., creating, deleting, maybe), the transactionally consistent indexer component 158 may load the corresponding data blob so that the data in the field that correspond to such an index entry may be verified (e.g., having a certain type of value) before being returned as part of the query result to the application.

Figure 9:
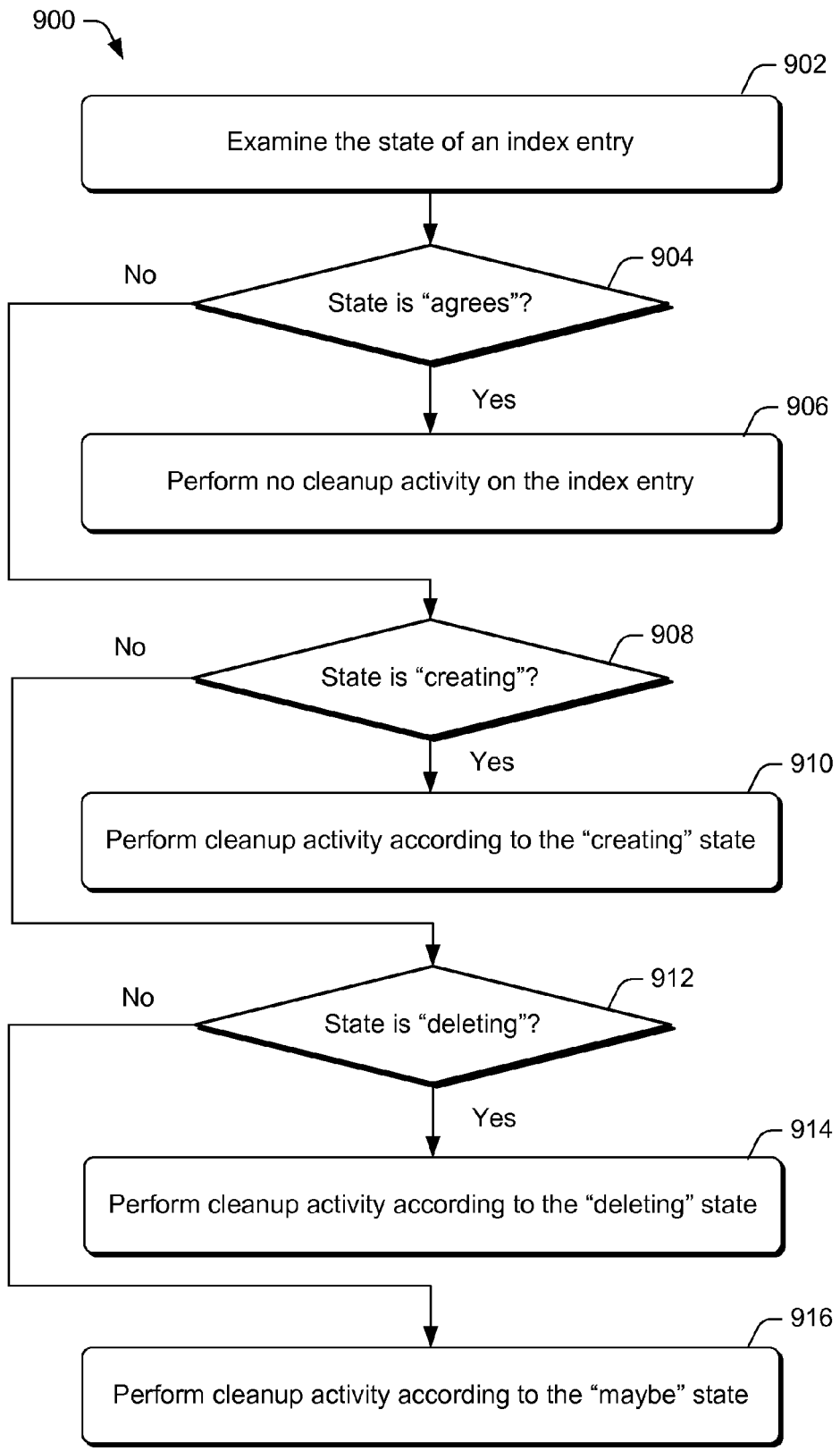
FIG. 9 is a flow diagram of an illustrative process for performing index maintenance on the transactional index maintained by a transactionally consistent indexer component.

FIG. 9 is a flow diagram of an illustrative process 900 for performing index maintenance on the transactional index maintained by a transactionally consistent indexer component. The transactional index 400 may accumulate one or more index entries that do not match data blobs due to normal operational and concurrency failures. In various embodiments, the transactionally consistent indexer component 158 may review each index entry in the transactional index 400 and remove such accumulated entries from the transactional index 400 on a periodic basis (e.g., monthly, weekly, daily). Thus, the transactionally consistent indexer component 158 may perform the process 900 for each index entry in the transactional index 400.

At block 902, the transactionally consistent indexer component 158 may examine the state of an index entry by reading the consistency indicator of the index entry. At decision block 904, if the transactionally consistent indexer component 158 determines that the state of the index entry is "agrees" ("yes" at decision block 904), then the process 900 may proceed to block 906. At block 906, the transactionally consistent indexer component 158 may perform no cleanup activity on the index entry.

However, if the transactionally consistent indexer component 158 determines that the state of the index entry is not "agrees", then the process 900 may proceed to block 908. At block 908, the transactionally consistent indexer component 158 may determine if the state of the index entry is "creating". If the status of the index entry is "creating" ("yes" at decision block 908), the process may proceed to block 910.

At block 910, the transactionally consistent indexer component 158 may perform cleanup activity according to the "creating" state. In various embodiments, the transactionally consistent indexer component 158 may check a field of a corresponding data blob that is related to the index entry. If the field contains a value that agrees with the index entry, then the transactionally consistent indexer component 158 may change the state of the index entry to "agrees." However, if the field does not contain a value that agrees with the index entry, then the transactionally consistent indexer component 158 may check for an in-progress transaction that corresponds to the index entry. If there is an in-progress transaction, then the transactionally consistent indexer component 158 may perform no cleanup activity on the index entry. However, if there is no in-progress transaction, then the transactionally consistent indexer component 158 may delete the index entry using optimistic concurrency.

In various embodiments, the existence of an in-progress transaction may be determined in various ways. In one way, the transactionally consistent indexer component 158 may establish a time limit for all data transactions (e.g., data writes) to data blobs in the data storage layer 110. In this way, the time stamp of each index entry can be used to determine if a data transaction to a corresponding data blob is currently in progress. For example, if the time stamp indicates that the index entry was last modified prior to a predetermined time threshold (e.g., more than half an hour ago), then the data transaction corresponding to the index entry is assumed to be not in progress.

In another way, in instances in which an application that is working on the data blob being tracked by the index entry is capable of implementing optimistic concurrency on the data blob, then the transactionally consistent indexer component 158 may force an ancillary update to the data blob during the index maintenance. The ancillary update may be a harmless data write that does not actually change any of the data of interest in the data blob (e.g., change a version number of the data blob). However, because of the implementation of optimistic concurrency by the application, this ancillary data write to the data blob will cause the application to abort any concurrent data transactions on the data blob. In this way, the transactionally consistent indexer component 158 may be assured that there are no in-progress data transactions, as the transactionally consistent indexer component 158 can essentially cause any in-progress data transactions on the data blob corresponding to the index entry to fail at will.

In a third way, if the data storage layer 110 is capable of momentarily stopping all data transactions between the application layer 102 and the data storage layer 110, then the transactionally consistent indexer component 158 may be provided with the ability to command the data storage layer 110 to do so. In this way, the transactionally consistent indexer component 158 may be assured that there are no in-progress data transactions to data blobs of the data storage layer 110 at that moment in time (e.g., one second), and the transactionally consistent indexer component 158 may use that moment to perform the index maintenance.

In a fourth way, the data storage layer 110 may include a supplemental index that tracks each of the data transactions on data blobs that are currently in progress, as well as the time stamps of such data transactions. In other words, information regarding each new data transaction is added to the supplemental index and information regarding each data transaction is removed from the index upon completion of the data transaction. Thus, the transactionally consistent indexer component 158 may determine that any index entry whose time stamp indicates that it is older than the oldest data transaction noted by the supplemental index corresponds to a data transaction that is currently not in-progress. In various embodiments, the selection of one of the ways for implementation may be based on the specifications and capabilities of the data storage layer 110.

Returning to block 908, if the status of the index entry is not "creating" ("no" at decision block 908), the process may proceed to decision block 912. At decision block 912, the transactionally consistent indexer component 158 may determine if the state of the index entry is "deleting". If the status of the index entry is "deleting" ("yes" at decision block 908), the process may proceed to block 914.

At block 914, the transactionally consistent indexer component 158 may perform cleanup activity according to the "deleting" state. In various embodiments, the transactionally consistent indexer component 158 may check a field in a corresponding data blob that relates to the index entry. If the field does not contain a value that agrees with the index entry, then the transactionally consistent indexer component 158 may delete the index entry. However, if the field does contain a value that agrees with the index entry, then the transactionally consistent indexer component 158 may check for an in-progress transaction that corresponds to the index entry. If there is an in-progress transaction, then the transactionally consistent indexer component 158 may perform no cleanup activity on the index entry. However, if there is no in-progress transaction, then the transactionally consistent indexer component 158 may change the state of the index entry to "agrees" using optimistic concurrency.

However, returning to block 912, if the status of the index entry is not "deleting" ("no" at decision block 912), the process may proceed to block 916, as the index entry has a state of "maybe". At block 916, the transactionally consistent indexer component 158 may perform cleanup activity according to the "maybe" state. In various embodiments, the transactionally consistent indexer component 158 may check a field of a corresponding data blob that relates to the index entry. If the field does not contain a value that agrees with the index entry, then the transactionally consistent indexer component 158 may delete the index entry. However, if the field does contain a value that agrees with the index entry, then the transactionally consistent indexer component 158 may check for an in-progress transaction that corresponds to the index entry. If there is an in-progress transaction, then the transactionally consistent indexer component 158 may perform no cleanup activity on the index entry. However, if there is no in-progress transaction, then the transactionally consistent indexer component 158 may delete the index entry using optimistic concurrency.

In summary, in some instances, an application may desire to locate data blobs from the data storage layer of a blob storage system using a property or field value contained in a data blob rather than via a primary key of the data blob. Thus, by using a transactional index that tracks the various data fields of the data blob via corresponding index entries, the transactionally consistent indexer component may enable an application to perform queries on the index entries to locate data from the data blob.

Multi-Blob Consistency Component

A blob storage system, such as the data storage layer 110, typically does not offer a mechanism to update, insert, and/or delete more than one data blob at a time in an atomic manner without the risk of other application processes reading only some of the data changes, which are known as "partial" or "inconsistent" reads.

However, the multi-blob consistency component 160 may implement the desired "atomic" modification of a set of data blobs, as discussed in detail below. In various embodiments, the multi-blob consistency component 160 may achieve such "atomic" modification with the use of an additional type of blob referred to herein as a "master blob." As further described below, the use of a "master blob" for a set of data blobs may provide the data set with optimistic concurrency as the data set is being operated on by the overall data storage layer 110.

Figure 10:
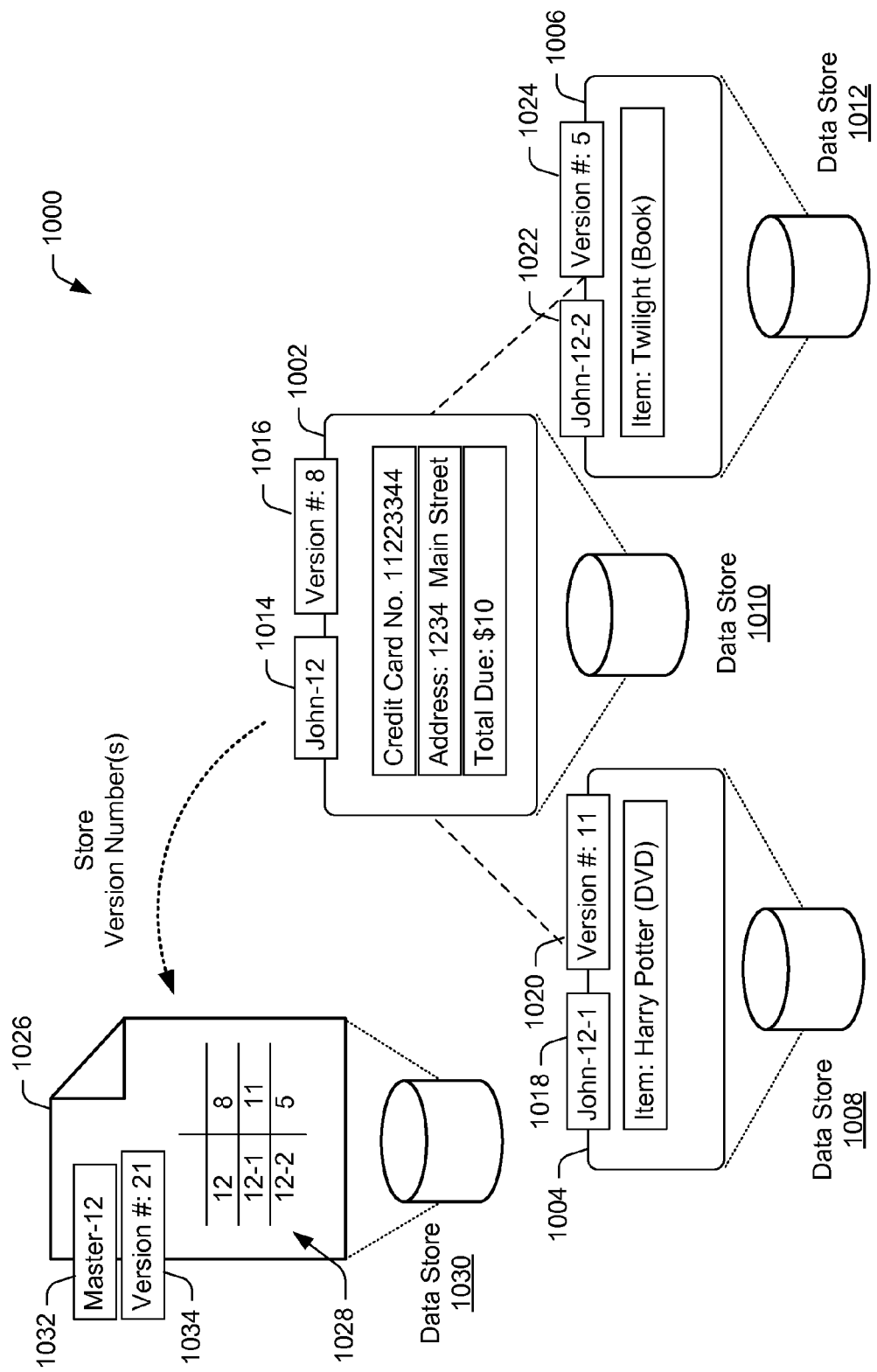
FIG. 10 shows an illustrative block diagram of a data blob set that uses a master blob to ensure atomicity when one or more data blobs in the data set is modified, as implemented by a multi-blob consistency component.

FIG. 10 shows an illustrative block diagram of an example data blob set that uses a master blob to ensure atomicity when one or more data blobs in the data set is modified. The example data blob set 1000 may include a data blob 1002, a data blob 1004, and a data blob 1006. In some embodiments, the data blobs 1002-1006 may be stored in different data stores, such as each of the data stores 1008-1012, respectively, of the data storage layer 110. However, in other embodiments, any two or more of the data blobs 1002-1006 may be stored in the same data store. Collectively, the data blobs 1002-1006 may constitute the data blob set 1000 because the information contained in each data blob is related and capable of being grouped together for storage.

As shown, the example data blob 1000 set may be an online purchase order. The data blob 1002 of the data blob set may be labeled with an identifier 1014. For example, the identifier 1014 may be "12", thereby indicating that the data blob 1002 is an online purchase order no. 12. The data blob 1002 may also include a version number 1016. In various embodiments, the version number 1016 may be a randomly generated globally unique identifier (GUID). As further described below, the version number 1016 of the data blob 1002 may change each time the data in the data blob 1002 is modified. The data blob 1002 may be created by the multi-blob consistency component 160 when a customer decides to place the online purchase order. Accordingly, the data blob 1002 may include information such as a credit card number of the customer, an address of the customer, a total amount due from the customer for the online purchase, and/or the like.

It will be appreciated that while the identifier 1014 and the version number 1016 of the data blob 1002 are illustrated as two separate entities in FIG. 10 for the sake of clarity, the identifier 1014 and the version number 1016 may be actually stored as a single continuous string label, that is, a versioned identifier. For example, the multi-blob consistency component 160 may store the identifier 1014 and the version number 1016 as a versioned identifier "12/8", in which the "/" functions as a value separator.

The data blob 1004 of the data blob set 1000 may be related to the data blob 1002. The data blob 1004 may include its own identifier 1018 and its own version number 1020. The identifier 1018 may be configured to denote an association between the data blob 1004 and the data blob 1002. For example, the identifier 1018 may be "John-12-1", indicating that the data blob 1004 holds information regarding the first purchased item of the online purchase order no. 12 (e.g., Harry Potter DVD). In various embodiments, the version number 1020 may also be a GUID that changes each time the data in the data blob 1004 is modified.

Once again, it will be appreciated that while the identifier 1018 and the version number 1020 of the data blob 1004 are illustrated as two separate entities in FIG. 10 for the sake of clarity, the identifier 1014 and the version number 1016 may be actually stored as a single continuous string label, that is, a versioned identifier. For example, the multi-blob consistency component 160 may store the identifier 1018 and the version number 1020 as a versioned identifier "John-12-1/11", in which the "/" functions as a value separator.

Likewise, the data blob 1006 of the data blob set may be related to the data blob 1002. The data blob 1006 may also include its own identifier 1022 and its own version number 1024. The identifier 1022 may be configured to denote an association between the data blob 1006 and the data blob 1002. For example, the identifier 1022 may be "John-12-2", indicating that the data blob 1006 holds information regarding the second purchased item of the online purchase order no. 12 (e.g., Twilight book). In various embodiments, the version number 1024 may also be a GUID, and the version number 1024 may change each time the data in the data blob 1006 is modified.

Yet again, it will be appreciated that while the identifier 1022 and the version number 1024 of the data blob 1006 are illustrated as two separate entities in FIG. 10 for the sake of clarity, the identifier 1014 and the version number 1016 may be actually stored as a single continuous string label, that is, a versioned identifier. For example, the multi-blob consistency component 160 may store the identifier 1022 and the version number 1024 as a versioned identifier "John-12-2/5", in which the "/" functions as a value separator.

It will be further appreciated that the data blob set 1000 may include additional data blobs in other embodiments. For example, each time a customer orders an additional item, a corresponding data blob may be created in the data blob set 1000. Thus, depending on the number of items ordered by the customer, additional blobs with identifiers such as "John-12-3", "John-12-4", "John-12-5", and so on and so forth, may exist in the data blob set 1000.

Moreover, as further shown in FIG. 10, the identifier and version number of each of the data blobs in the data blob set 1000 may be stored in a master blob 1026. For example, the master blob 1026 may store a table 1028 that associates the identifier of each data blob in the data blob set 1000 with its current version number. For example, the table 1028 may include an entry "12|8" for the data blob 1002, an entry "12-1|11" for the data blob 1004, and an entry "12-2|5" for the data blob 1006. In some embodiments, the master blob 1026 may be stored in a data store 1030 of the data storage layer 110 that has different characteristics than the data stores 1008-1012. For example, as described above, the data store 1030 may offer higher degrees of consistency and reliability than the data stores 1008-1012. Nevertheless, in other embodiments, the data store 1030 may have the same characteristics as the data stores 1008-1012. In further embodiments, the master blob 1026 may also be stored in one of the data stores 1008-1012.

The master blob 1026 may include an identifier 1032 that unique identifies the master blob 1026. For example, the identifier 1032 may be "Master-12". In this way, the multi-blob consistency component 160 is able to locate the master blob 1026 when the component 160 is explicitly given the identifier 1032 by an application, such as the application 114(1) of the application layer 102.

In other embodiments, the naming convention for assigning an identifier to each master blob means that the identifier 1032 may be ascertained by the multi-blob consistency component 160 based on other information, such as the identifiers of the data blobs that are tracked by the master blob 1026. For example, given the data blob 1004 with the identifier 1018 of "12-1", the multi-blob consistency component 160 may know that the identifier 1032 may be obtained by combining the prefix "12" extracted from the identifier 1018, and adding a standard master blob prefix "Master-" to form the identifier "Master-12". Subsequently, the multi-blob consistency component 160 may use the ascertained identifier 1032 to locate the master blob 1026.

The master blob 1026 may further include a version number 1034. In various embodiments, the version number 1034 may also be a GUID that changes each time the data in the data blob 1004 is modified. For example, as shown in FIG. 10, the version number 1034 of the master blob 1026 may be "21". As further described below, the version number 1034 of the master blob 1026 may provide the data blobs in the data blob set 1000, such as the data blobs 1002-1006, with optimistic concurrency. It will be appreciated that while the identifier 1032 and the version number 1034 of the master blob 1026 are illustrated as two separate entities in FIG. 10 for the sake of clarity, the identifier 1032 and the version number 1034 may be actually stored as a single continuous string label, that is, as a versioned identifier. For example, the multi-blob consistency component 160 may store the identifier 1032 and the version number 1034 as a versioned identifier "Master-12/21", in which the "/" functions as a value separator. The use of the master blob 1026 to provide optimistic concurrency is illustrated in FIG. 11.

Figure 11:
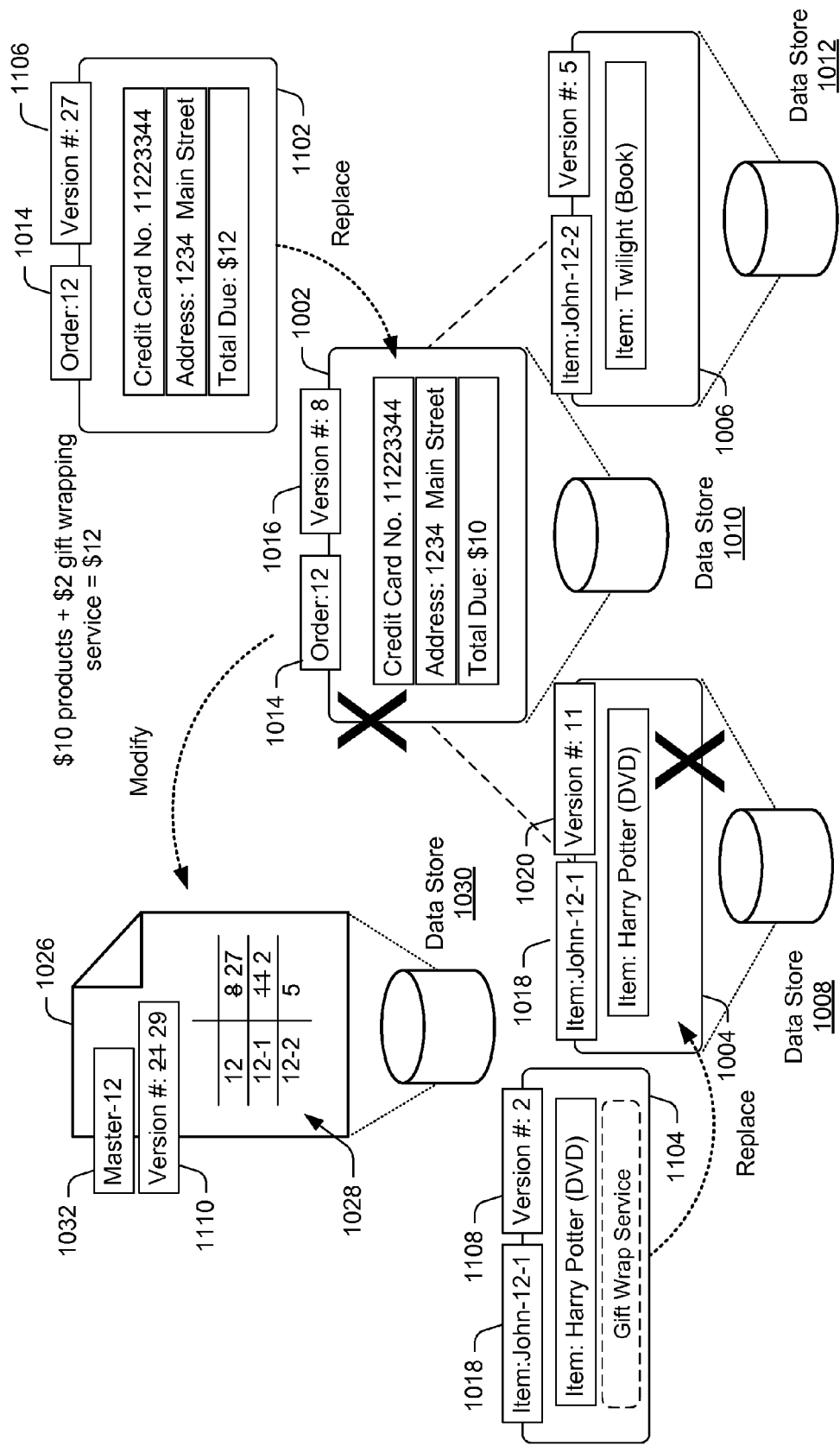
FIG. 11 shows an illustrative block diagram of a data blob set that is atomically modified via the use of the master blob, as implemented by a multi-blob consistency component.

FIG. 11 is an illustrative block diagram of a data blob set that is atomically modified via the use of the master blob. The scenario in FIG. 11 is that a customer decides to add gift wrap service, which may include a charge of $2.00, to the Harry Potter DVD of the online purchase order no. 12 shown in FIG. 10. Thus, the multi-blob consistency component 160 may independently determine, or be informed by the application 114(1), that the data blob 1002 and the data blob 1004 are to be modified. The data blob 1004 is to be modified because data regarding the gift wrap service needs to be added to the data blob 1004. Similarly, the data blob 1002 is to be modified because the cost of the gift wrap service is $2.00, thereby altering the total amount due kept in the data blob 1002 from $10.00 to $12.00.

In various embodiments, the multi-blob consistency component 160 may replace each of the existing data blob 1002 and the existing data blob 1004 with a new version of each blob that includes the updated information, such as updated data blobs 1102 and 1104, respectively. Accordingly, the data blob 1002 may be replaced with the updated data blob 1102. The updated data blob 1102 may indicate that the new total amount due is $12.00. The updated data blob 1102 may have the same identifier 1014 as the data blob 1002. However, the data blob 1102 may include a different version number 1106, such as "27".

Likewise, the data blob 1004 may be replaced with the updated data blob 1104. The updated data blob 1104 may indicate that the Harry Potter DVD is provided with gift wrap service. The updated data blob 1104 may have the same identifier 1018 as the data blob 1002. However, the data blob 1102 may include a different version number 1108, such as "2".

Moreover, the table 1028 in the master blob 1026 may be updated to reflect that the data blobs 1002 and 1004 are replaced by updated versions, such as by the data blobs 1102 and 1104, respectively. As shown in FIG. 11, the entry "12|18" in the table 1028 may be replaced by the entry "12|27", and the entry "12-1|11" may be replaced by the entry "12-1|2". Additionally, since the data in the master blob 1026 has been modified, the multi-blob consistency component 160 may replace the version number 1034 of the master blob 1026 with a new version number 1110, such as "29".

Thus, the master blob 1026 provides optimistic concurrency to any transaction that operates on any of the data blobs in the data blob set 1000 via its version number. As shown in FIG. 11, any transaction on any of the data blobs in the data blob set 1000 will result in a modification of version number of the master blob 1026. Thus, the multi-blob consistency component 160 may read the version number of the master blob 1026 prior to implementing the data modifications described in FIG. 11. However, as further described below in FIG. 12, the multi-blob consistency component 160 may read the version number of the master blob 1026 a second time prior to committing the data transaction. The multi-blob consistency component 160 may only commit the data modifications if these version numbers from the two different reads match. Otherwise, the fact that these version numbers from the two different reads do not match may indicate that the master blob 1026, and by inference, the one or more data blobs in the data blob set 1000, have been modified as result of a different application process. This optimistic concurrency failure may cause the multi-blob consistency component 160 to abort rather than commit any pending data transactions, such as aborting the replacement of the data blob 1002 with data blob 1102, and aborting the replacement of the data blob 1004 with 1104.

Figure 12:
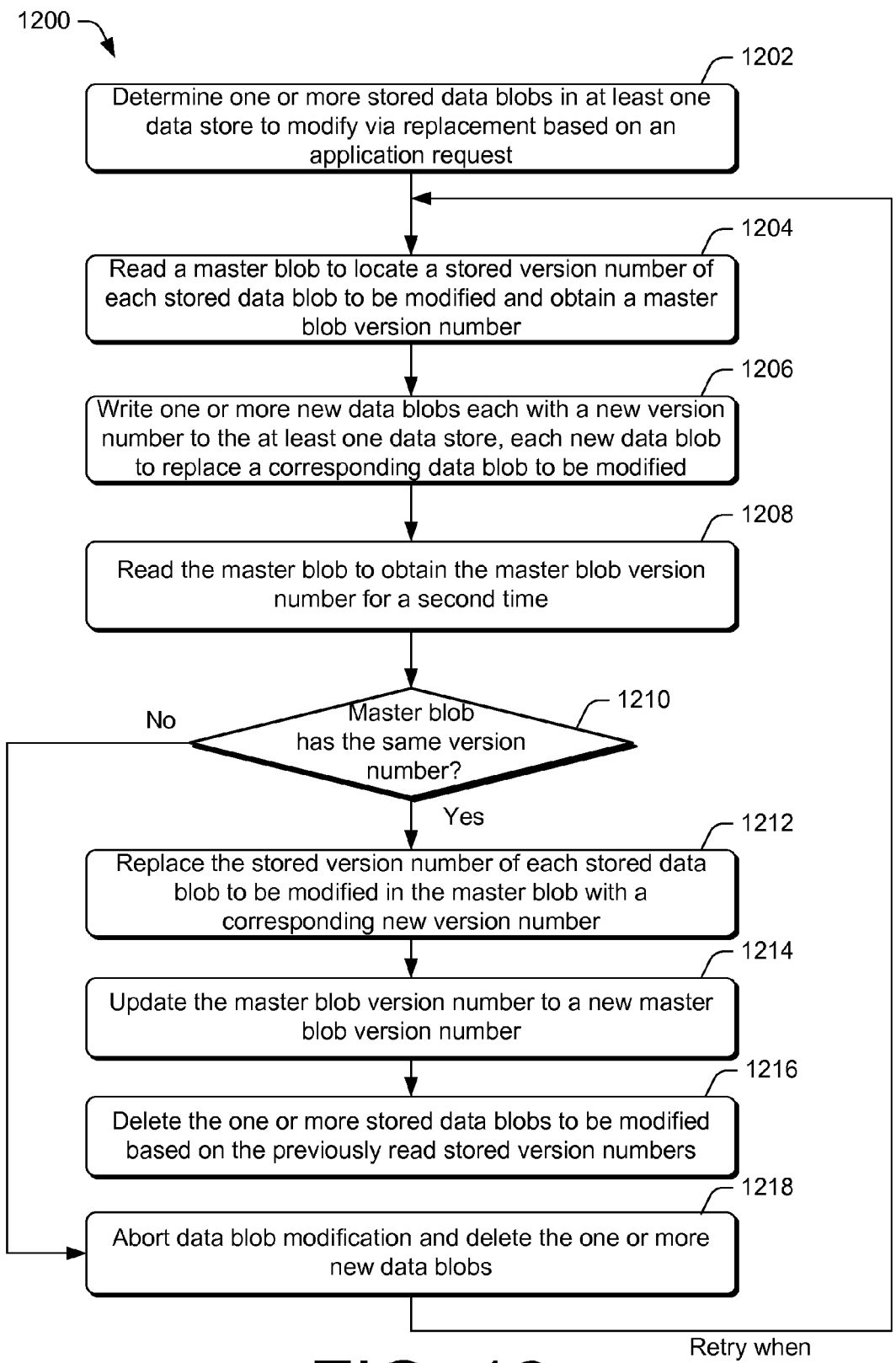
FIG. 12 is a flow diagram of an illustrative process for atomically writing data to one or more data blobs of a blob data set using the master blob when data blob are to be modified, as implemented by a multi-blob consistency component.
Figure 13:
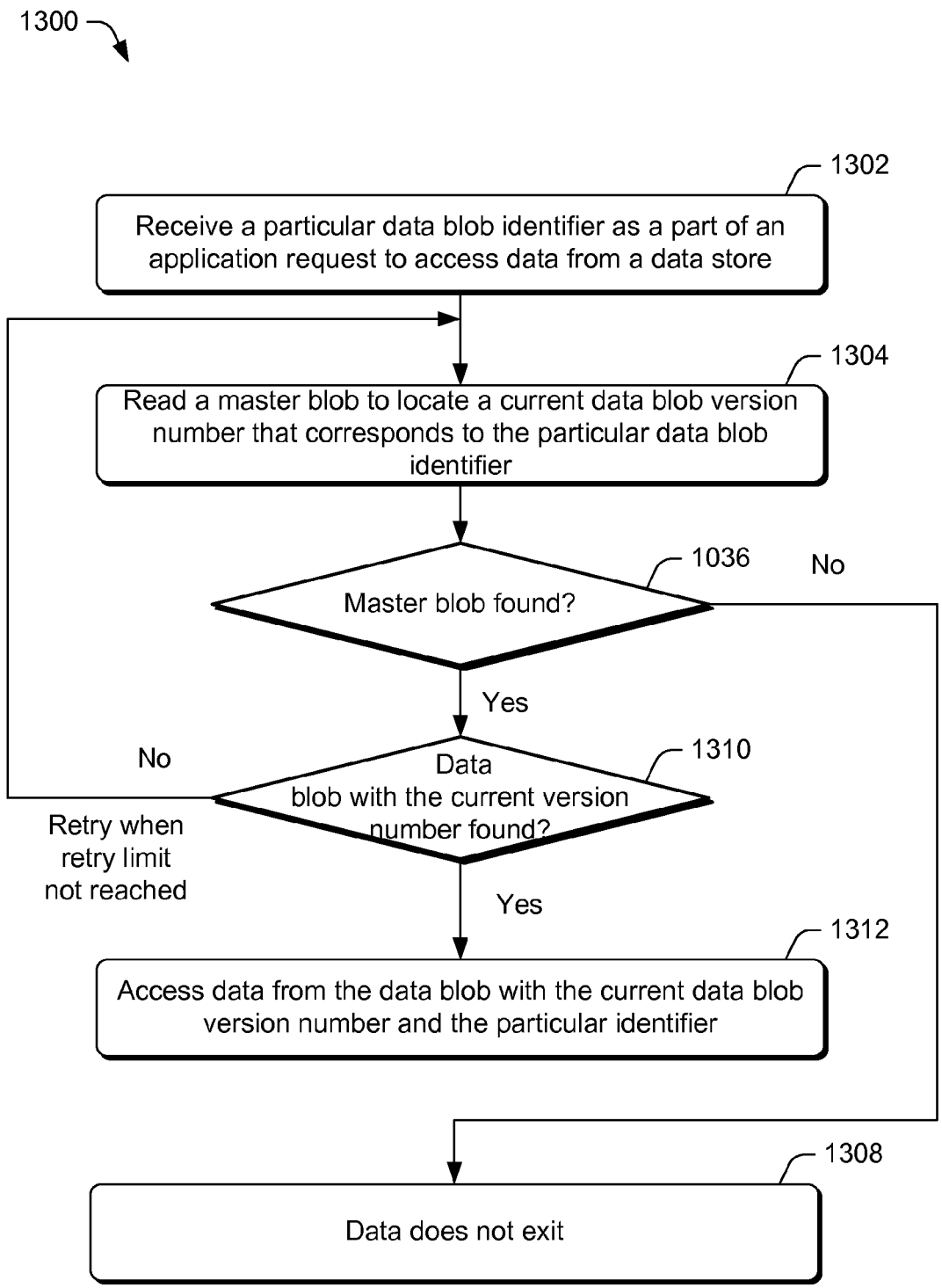
FIG. 13 is a flow diagram of an illustrative "master first" process for reading data from one or more data blobs of a data set using the master blob, as implemented by a multi-blob consistency component.
Figure 14:
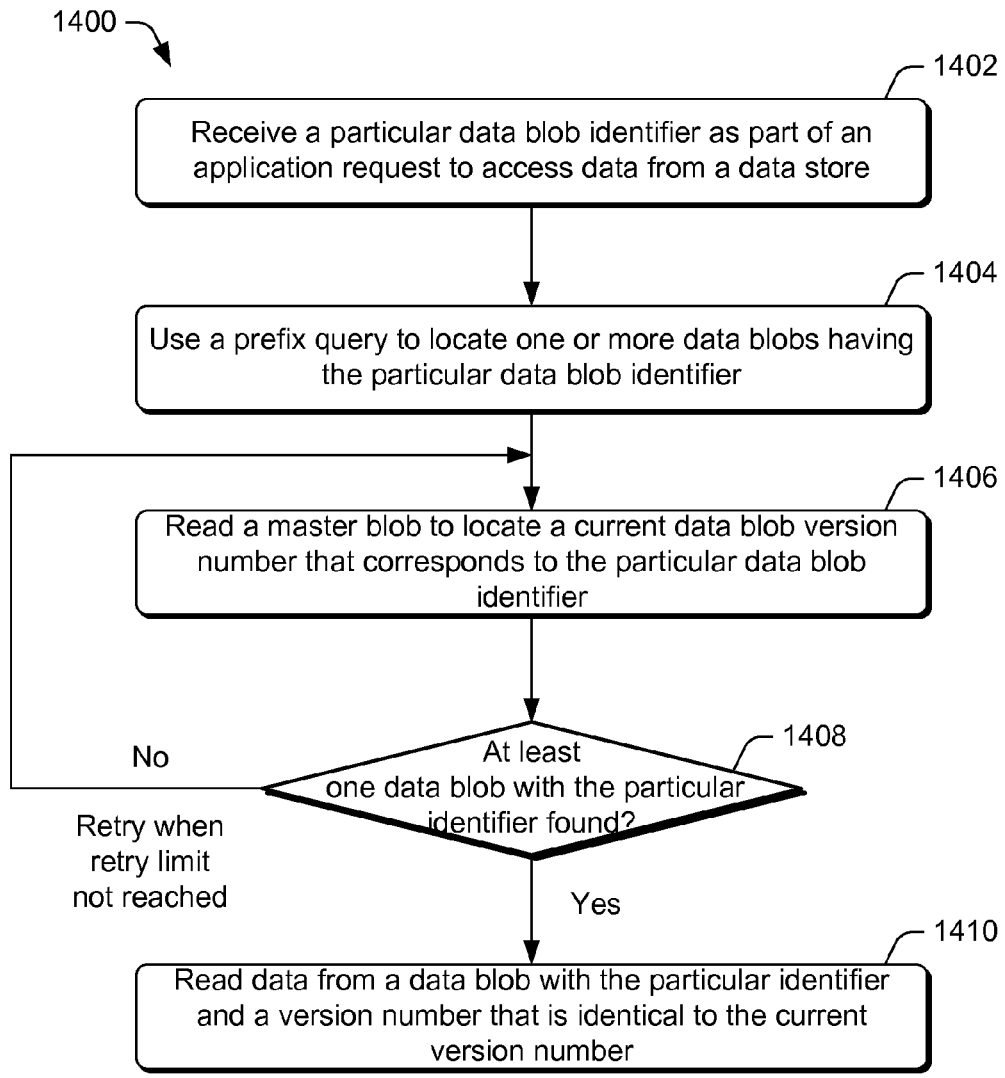
FIG. 14 is a flow diagram of an illustrative "validate" process for reading data from one or more data blobs of a data set using the master blob, as implemented by a multi-blob consistency component.

FIGS. 12-14 show illustrative processes 1200-1400 that depicts the operations of the multi-blob consistency component 160. Each of the processes 1200-1400 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 12 is a flow diagram of an illustrative process 1200 for atomically writing data to one or more data blobs of a blob data set using the master blob when data blob are to be modified. At block 1202, the multi-blob consistency component 160 may determine one or more stored data blobs of a data blob set, such as data blob 1002 and data blob 1004, to modify based on an application request, such as a request from the application 114(1) of the application layer 102. For example, the application 114(1) may be an online commerce application, and the request may be to modify an existing online purchase order. The one or more data blobs may be stored in one or more data stores, such as data stores 1008-1012 of the data storage layer 110. Each of the one or more data blobs may be identified by a unique identifier.

At block 1204, the multi-blob consistency component 160 may read a master blob, such as the master blob 1026, to locate a current stored version number of each stored data blob to be modified. Additionally, the multi-blob consistency component 160 may also obtain a current version number of the master blob, such as the version number 1034.

At block 1206, the multi-blob consistency component 160 may write one or more new data blobs, such as data blob 1102 and data blob 1104, to the at least one data stores. Each of the one or more new data blobs may be a replacement for a corresponding stored data blob. Although each of the new data blobs is provided with the same identifier as a corresponding stored data blob, each of the new data blobs may be provided with a new version number as well.

At block 1208, the multi-blob consistency component 160 may read the master blob to obtain the master blob version number for a second time. Subsequently, at decision block 1210, the multi-blob consistency component 160 may determine whether the master blob has the same version number. In other words, whether the master blob version number read the first time matches the master blob version number read at the second time. In various embodiments, a master blob version number that remains the same indicates that the optimistic concurrency for the one or more data blobs of the data blob set has not been violated. Conversely, a master blob version number that did not stay the same between the two reads may indicate optimistic concurrency failure for the data blob set.

Thus, at decision block 1210, if the multi-blob consistency component 160 determines that the master blob has the same version number ("yes" at decision block 1210), the process 1200 may proceed to block 1212. At block 1212, the multi-blob consistency component 160 may replace the current stored version number of each data blob to be modified in the master blob with a corresponding new version number. For example, as previously shown in FIG. 11, the multi-blob consistency component 160 may replace version number 1016 stored in the table 1028 of the master blob 1026 with the corresponding version number 1106.

At block 1214, the multi-blob consistency component 160 may update the master blob version number to a new master blob version number. For example, as previously shown in FIG. 11, the version number 1110 of the master blob 1026 may be updated from "21" to "29". In various embodiments, the blocks 1208-1214 may be performed as a single atomic transaction.

At block 1216, the multi-blob consistency component 160 may delete the one or more stored data blobs to be modified using the stored version numbers that were previously read at block 1204. If there are more than one stored data blobs to be deleted, the multi-blob consistency component 160 may implement the deletions asynchronously.

However, returning to decision block 1210, if the multi-blob consistency component 160 determines that the master blob does not have the same version number ("no" at decision block 1210), the process 1200 may proceed to block 1218. At block 1218, the multi-blob consistency component 160 may abort the data blob modification and delete the one or more new data blobs that were added at block 1206. In some embodiments, the process 1200 may loop back to block 1204 following the abort so that another attempt to atomically write data to the one or more data blobs may be performed. In these embodiments, the multi-blob consistency component 160 may perform such retry attempts for a predetermined number of times prior to aborting the process 1200.

It will be appreciated that while the process 1200 is described above with respect to the modification of one or more data blobs, such as the data blob 1002, the process 1200 is adaptable for when a data blob is created for storage in a data store of the data storage layer 110 for the first time or when a data blob is deleted. For example, the application 114(1) may request to create one or more new data blobs for storage in a data store or delete one or more stored data blobs from a data store.

Thus, when one or more new data blobs are to be created for storage in the data store, the block 1202 may be skipped by the multi-blob consistency component 160. Instead, for each new data blob to be created for storage, the multi-blob consistency component 160 may attempt to find and read a master blob that corresponds to the new data blob at the block 1204. However, even if a corresponding master record exists for a new data blob to be created, the multi-blob consistency component 160 would be unable to locate a stored version number for such a new data blob, as such a stored version number would not exist. Alternatively, the multi-blob consistency component 160 may create a new master blob with a new version number for the new data blob to be created, in the event that the new data blob is unrelated to any existing data blob set so that no corresponding master blob exists. Nevertheless, in either instance, the multi-blob consistency component 160 may obtain the version number of the master blob that corresponds to the new data blob to be created at the block 1204.

Subsequently, the multi-blob consistency component 160 may store each new data blob that is created (which does not replace a corresponding data blob to be modified) at the block 1206. Further, after the multi-blob consistency component 160 also performs the actions in the block 1208 and also ascertains that the master blob has the same version number at the block 1210, the multi-blob consistency component 160 may simply store the version number of the new data blob in the master blob at the block 1212. This version number storage is done in lieu of the replacement of any existing stored version number as such an existing stored version number does not exist for the new data blob to be created. Subsequently, the multi-blob consistency component 160 may perform the actions in the block 1214. However, since in this scenario a new data blob is created for storage in a data store for the first time, the actions in the block 1216 may be skipped by the multi-blob consistency component 160. Returning to the block 1210, when the master blob does not have the same version number, the multi-blob consistency component 160 may only delete each the new data blob at the block 1218 as the abort of the data blob modification is not applicable. In some embodiments, the multi-blob consistency component 160 may also perform retry attempts of each new data blob creation and storage for a predetermined number of times when the master blob does not have the same version number at the block 1210.

Alternatively, when one or more stored data blobs are to be deleted from the at least one data store rather than being modified, multi-blob consistency component 160 may read the master blob to locate a stored version number of each stored data blob to be deleted (rather than modified) and obtain the master blob version number at block 1204. At the block 1206, rather than writing one or more new data blobs, the multi-blob consistency component 160 may instead determine that no new data blob is to be written to the at least one data store. Subsequently, when the multi-blob consistency component 160 performs the actions at the block 1208 and also determines that the master blob has the same version number at the block 1210, the multi-blob consistency component 160 may simply delete the stored version number of each data blob to be deleted at the block 1212 rather than replace each stored version number with a corresponding new version number.

After performing the action in the block 1214, the multi-blob consistency component 160 may delete each data blob that is to be deleted rather than modified at the block 1216. In a scenario in which all of the version numbers stored in a master blob are deleted, the multi-blob consistency component 160 may also delete the master blob. Returning to the block 1210, when the master blob does not have the same version number at the block 1210, the multi-blob consistency component 160 may simply abort the deletion of the one or more data blobs at the block 1218. In some embodiments, the multi-blob consistency component 160 may also perform retry attempts of each data blob deletion for a predetermined number of times when the master blob does not have the same version number at the block 1210.

FIG. 13 is a flow diagram of an illustrative "master first" process 1300 for reading data from one or more data blobs of a data set using the master blob, such as the master blob 1026. At block 1302, the multi-blob consistency component 160 may receive a particular data blob identifier (e.g., identifier 1014) as part of an application request to access data from a data store. The request may be from an application of the application layer 102, such as the application 114(1). The request may also be one of a multitude of read requests from the application.

At block 1304, the multi-blob consistency component 160 may attempt to read a master blob to ascertain a current data blob version number (e.g., version number 1106) that corresponds to the particular data blob identifier. In some embodiments, the multi-blob consistency component 160 may locate the master blob that correspond to the data blob to be read based on specific master blob identifier information provided by the application 114(1). However, in other embodiments, the multi-blob consistency component 160 may locate the master blob by ascertaining the identifier of the master blob from the particular identifier and knowledge of master blob naming conventions.

At decision block 1306, the multi-blob consistency component 160 may determine whether the master blob is found. If the master blob is not found ("no" at decision block 1036), the process 1300 may proceed to block 1308. At block 1308, the multi-blob consistency component 160 may determine that the data to be read does not exist. However, if the master is found ("yes" at decision block 1036), the process 1300 may proceed to decision block 1310.

At decision block 1310, the multi-blob consistency component 160 may attempt to locate the data blob with the current data blob version number found in the master blob. If the multi-blob consistency component 160 is able to locate a data blob ("yes" at decision block 1306), the process 1300 may proceed to block 1312.

At block 1312, the multi-blob consistency component 160 may access data from the data blob with the current data blob version number and the particular identifier. For example, the multi-blob consistency component 160 may locate the data blob in the data store 1010. Subsequently, the multi-blob consistency component 160 may pass the accessed data back to the application 114(1).

However, if at decision block 1310 the multi-blob consistency component 160 is unable to locate the data blob ("no" at decision block 1306), the process 1300 may loop back to block 1304 so that another attempt to read the data from the data blob may be performed. In various embodiments, the multi-blob consistency component 160 may perform such retry attempts for a predetermined number of times before aborting the process 1300, at which point the attempt to read the data is deemed as a failure. Furthermore, it will be appreciated that in instances in which there are multiple read requests, each of the read requests may be implemented in parallel via the blocks 1304-1312.

FIG. 14 is a flow diagram of an illustrative "validate" process 1400 for reading data from one or more data blobs of a data set using the master blob, such as the master blob 1026. At block 1402, the multi-blob consistency component 160 may receive a particular data blob identifier (e.g., identifier 1014) as part of an application request to access data from a data store. The request may be from an application of the application layer 102, such as the application 114(1). The request may also be one of a multitude of read requests from the application.

At block 1404, the multi-blob consistency component 160 may use a prefix-query to locate one or more data blobs having the particular data blob identifier. In other words, the prefix-query may be used to locate multiple data blobs that are different versions of each other. Recall as described above, the identifier and the version number of a data blob may actually be written as a single versioned identifier (e.g., 12-1/11). Thus, for example, if there are actually multiple versions of a data blob being stored in a data store (e.g., a data blob with the versioned identifier 12-1/11 and a data blob with the versioned identifier 12-1/2), a prefix query for "12-1" may locate both data blobs.

At block 1406, the multi-blob consistency component 160 may read a master blob to ascertain a current data blob version number that corresponds to the particular data blob identifier. In some embodiments, the multi-blob consistency component 160 may locate the master blob that corresponds to the data blob to be read based on specific master blob identifier information provided by the application 114(1). However, in other embodiments, the multi-blob consistency component 160 may locate the master blob by ascertaining the identifier of the master blob from the particular data blob identifier and knowledge of master blob naming conventions.

In various embodiments, the multi-blob consistency component 160 may perform the operations in the blocks 1404 and 1406 simultaneously. Such simultaneous performance may enhance the efficiency of the data retrieval by the multi-blob consistency component 160.

At decision block 1408, the multi-blob consistency component 160 may determine whether at least one data blob with the particular identifier is located in the one or more data stores. Thus, if the multi-blob consistency component 160 determines that at least one data blob with the particular data blob identifier is found ("yes" at decision block 1408), the process 1400 may proceed to block 1410.

At block 1410, the multi-blob consistency component 160 may read data from a data blob with the particular data blob identifier and a version number that is identical to the current data blob version number. Conversely, any data blob with the particular data blob identifier whose version number does not match the current data blob version number ascertained at block 1404 may be ignored. Subsequently, the multi-blob consistency component 160 may pass the accessed data may back to the application 114(1).

However, if at decision block 1408 the multi-blob consistency component 160 is unable to locate any data blobs ("no" at decision block 1408), the process 1400 may loop back to block 1406 so that another attempt to read the data from the data blob may be performed. In various embodiments, the multi-blob consistency component 160 may perform such retry attempts for a predetermined number of times before aborting the process 1400. Furthermore, it will be appreciated that in instances in which there are multiple read requests, each of the read requests may be implemented in parallel via the blocks 1404-1410.

It will be appreciated that the "master first" process 1300 and the "validate" process 1400 may be implemented alternatively by the multi-blob consistency component 160. The use of the "master first" process 1300 may be more suitable over the "validate" process 1400 under several circumstances. These circumstances include when the reading of the master blob is a low latency operation, either because the data blob is relatively small in size or stored in a low-latency data store. Another circumstance may be when the ratio of writes to reads is relatively high. Accordingly, the high number of writes may increase the chance that multiple versions of a particular data blob may exist. Thus, the use of the "validate" process 1400 may result in the unnecessary retrieval of data blob versions and additional validation efforts to eliminate the undesired data blob versions. A third circumstance may be when consistent performance is more important than average performance. The time needed to complete the "validate" process 1400 may fluctuate more due to the number of writes, and thus, the number of multiple versions of a particular data blob retrieved via a prefix query may also be unpredictable. In contrast, the "master first" process 1300 is consistently due to the reading of a single data blob version for each data blob. Furthermore, in circumstances in which the data stores of the data storage layer 110 do not support prefix query, the "master first" process 1300 may be a viable data access option.

Figure 15:
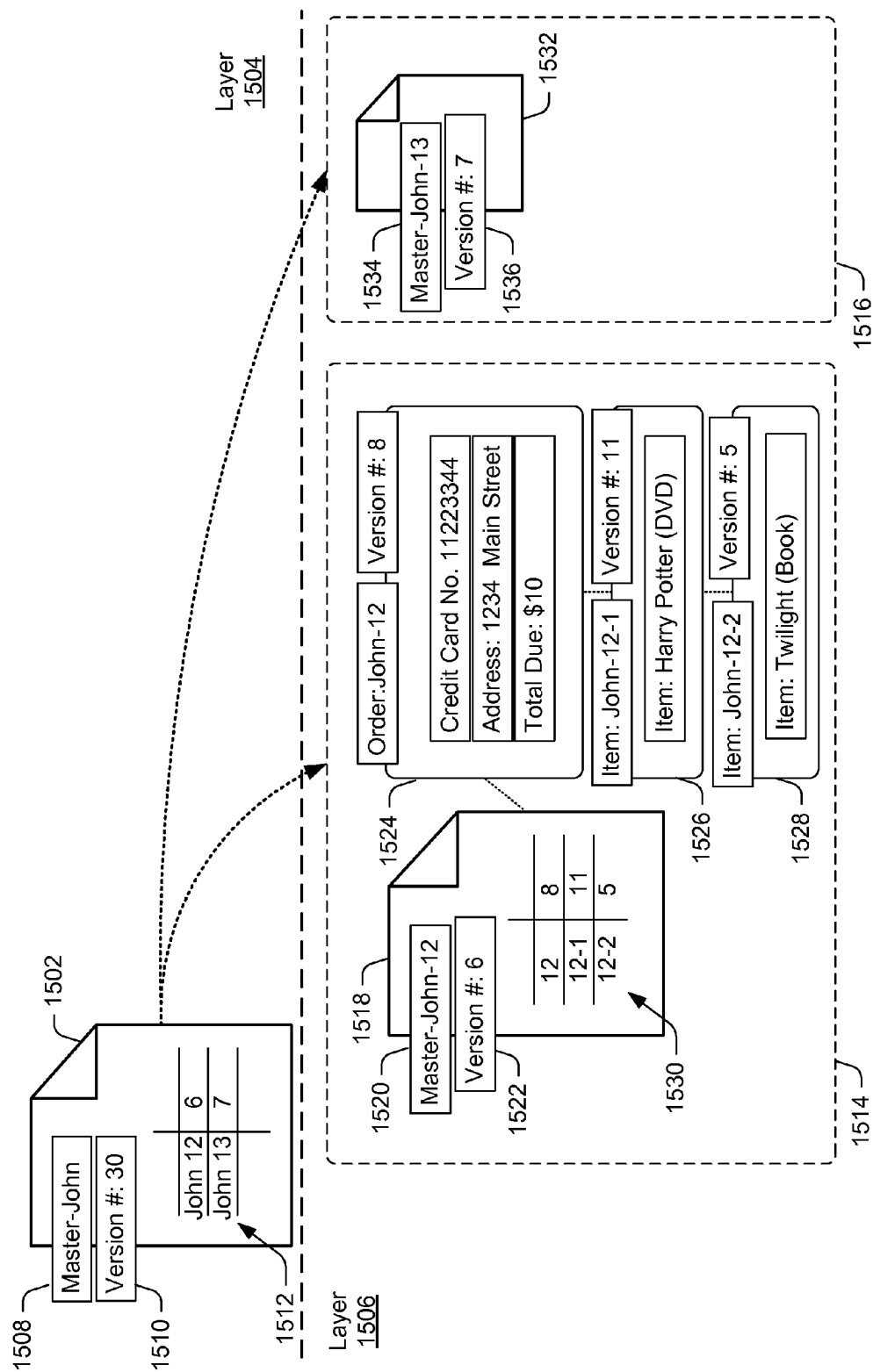
FIG. 15 is an illustrative block diagram for implementing a master blob tree for ensuring atomicity for a large quantity of data blobs, as implemented by a multi-blob consistency component.

FIG. 15 is an illustrative block diagram for implementing a master blob tree for ensuring atomicity for a large quantity of data blobs. The master blob tree may be implemented when the size of a master blob because significantly large (e.g., containing entries for more than 100 data blobs in a single blob set). In such an implementation, instead of a single blob, there may be a tree of multiple master blob layers. Each layer of the master blob tree that is closer to the application layer 102 may take a larger group of data blobs to be within the scope of the master blob in that layer. Moreover, the master blob in each layer may also treat the entire group of data blobs below itself as a single data blob, in which the version number of the master blob in each layer is retained in the identifier of master blob within the lower layer.

As shown in FIG. 15, a master blob 1502 may reside in a layer 1504 that is closer to the application layer 102 than the data in the layer 1506. The master blob 1502 may include an identifier 1508, a version number 1510 that is modified when data in the master blob 1502 is modified, and a table 1512 for tracking the data in the layer 1506.

For example, the master blob 1502 may be a master blob that keeps tracks of different online purchase orders placed by the customer "John Doe". In such an example, the identifier 1508 may be "Master-John", named according to the naming convention described above. The table 1512 may include identifier and version number information for what the master blob 1502 considers "data blobs" 1514 and 1516. As shown, the table 1512 of the master blob 1502 may include an entry "John 12|6". The "John 12" portion of this entry may lead to a master blob 1518 of the "data blob" 1514, as the identifier 1520 of the master blob 1518 is "Master-John-12". The "6" portion of this entry may indicate the version number 1522 of the master blob 1518.

Moreover, continuing with the example of the "John Doe" online purchase orders described above, the "data blob" 1514 may further includes data blobs 1524-1528 that are stored in the data stores of the data storage layer 110. Each of the data blobs 1524-1528 may store some data related to an online purchase order "John 12". Further, each of the data blobs 1524-1528 may include a unique identifier and a unique version number that is tracked by the master blob 1518 via a table 1530.

Likewise, the table 1512 of the master blob 1502 may further include an entry "John 13|7". The "John 13" portion of this entry may lead to a master blob 1532 of the "data blob" 1516, as the identifier 1534 of the master blob 1532 is "Master-John-13". The "7" portion of this entry may indicate the version number 1536 of the master blob 1532. It will be appreciated that the "data blob" 1516 may further include data blobs that store data related to an online purchase order "John 13" that is made by John Doe. Such data blobs may be tracked by the master blob 1532 via a table in the same manner that table 1530 tracks data blobs 1524-1528. However, for the sake of clarity, these data blobs and the table of master blob 1532 are not shown.

Thus, as illustrated by the example above, a tree of master blob may be created, in which each "child" master blob include a versioned identifier that is tracked by a "parent" master blob. Moreover, while the example only illustrates a master blob tree having two layers, the master blob tree may include any plurality of layers, provided that each "child" master blob of a "child" layer include a versioned identifier that is tracked by a "parent" master blob of an immediate "parent" layer that is one layer closer to the application layer 102 than the "child" layer.

As a result, when the data in a particular data blob is updated, the versions numbers of the master blob tracking the data blob, as well as all the ancestor master blobs (e.g., "parent" master blob and the "parent master" blob of the "parent" master blob, and so on and so forth) are also updated up the master blob tree, all the way to a "root" master blob that is closest to the application layer 102. Accordingly, it will be appreciated that since the "root" master blob gets updated as part of any update anywhere in the lower data blobs, there may be a tradeoff between the size of each data blob and the maximum transaction rate that may be supported by a master blob tree.

In summary, a blob storage system, such as the data storage layer 110, normally does not offer a mechanism to update, insert, and/or delete more than one data blob at a time in an atomic manner. However, the multi-blob consistency component 160 may implement the desired "atomic" modification of a set of data blobs with the use of a master blob. The modification may include the insertion, the update, and/or the modification of the set of data blobs.

Blob Transaction Component

The blob transaction component 162 may facilitate data transactions across arbitrary data blobs that are stored in different data stores in an optimistically consistent manner. In order to achieve such optimistic concurrency for the data transactions across multiple data blobs, the blob transaction component 162 may leverage the ability of the data storage layer 110 to implement a data transaction to a single data blob in an optimistic manner and update a single data blob atomically.

Figure 16:
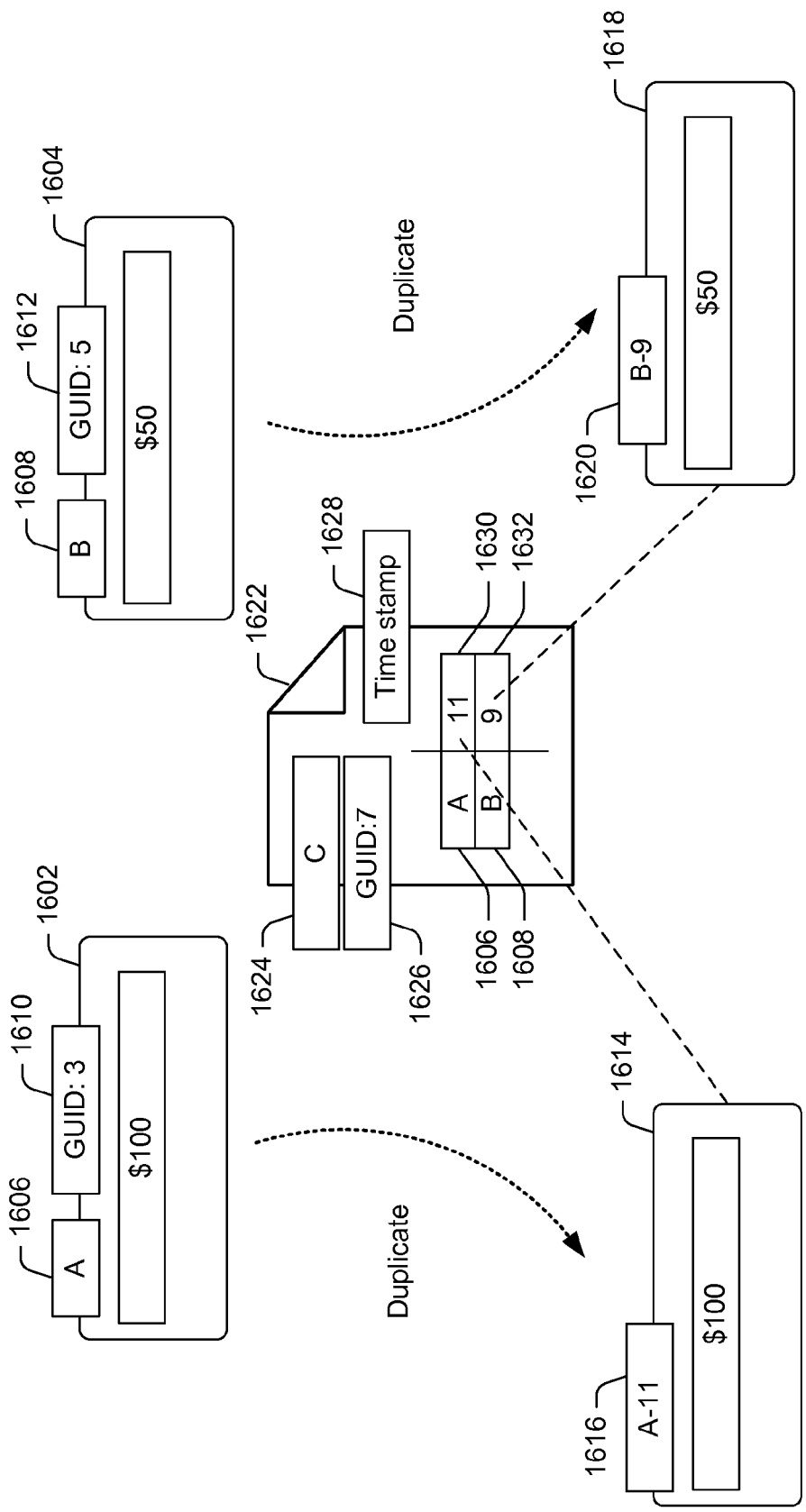
FIG. 16 shows an illustrative block diagram showing the initiation of a delegation operation for a blob transaction that transacts data across an arbitrary pair of data blobs, as implemented by a blob transaction component.

FIG. 16 shows an illustrative block diagram showing the initiation of a delegation operation for a blob transaction that transacts data across an arbitrary pair of data blobs as implemented by the blob transaction component 162. The delegation operation is the first step in the blob transaction.

In various embodiments, the blob transaction component 162 may perform a blob transaction between arbitrary blobs, such as data blob 1602 and data blob 1604 based on requests from an application, such as the 114(1) of the application layer 102. In some embodiments, the data blob 1602 and the data blob 1604 may be stored in different data stores of the data storage layer 110. The data blob 1602 may be labeled with an identifier 1606, such as "A", and the data blob 1604 may be labeled with an identifier 1608, such as "B". Moreover, each of the data blobs 1602 and 1604 may include a GUID that may change each time the data stored inside the data blob 1602 is modified. For example, the data blob 1602 may include a GUID 1610 that has an initial value of "3". Likewise, the data blob 1604 may include a GUID 1612 that has an initial value of "5".

In one scenario, the data blob 1602 may store the bank account balance data for a first bank account, and the data blob 1604 may store the bank balance data for a second bank account. For example, the data blob 1602 may hold data that indicates a balance amount of $100, and the data blob 1604 may hold data that indicates a balance amount of $50. In such a scenario, the blob transaction component 162 may perform a blob transaction that moves a monetary amount between the two accounts. For example, the application 114(1), such as an accounting application, may request that an amount of $20 be transferred from the first account to the second account, that is, from data blob 1602 to the data blob 1604.

During the delegation operation, the blob transaction component 162 may initiate the data transaction between the data blobs 1602 and 1604 by duplicating each data blob. As shown, the blob transaction component 162 may create a duplicate data blob 1614 that holds the same data (e.g., $100) as the data blob 1602, in which the data blob 1614 may be stored in a data store of the data storage layer 110. The blob transaction component 162 may label the data blob 1614 with an identifier 1616. Likewise, the blob transaction component 162 may create a duplicate data blob 1618 that holds the same data (e.g., $50) as the data blob 1604, in which the data blob 1618 may be stored in a data store of the data storage layer 110. The blob transaction component 162 may label the data blob 1614 with an identifier 1620.

Additionally, a record blob 1622 may be created by the blob transaction component 162. The record blob 1622 may store pointers to the duplicate data blobs. The record blob 1622 may be labeled with an identifier 1624. It will be appreciated that since the identifier 1624 is not intended to be inferable from the identifiers 1606 and 1608, the identifier 1624 may be made up of any text or value. As an example, the identifier 1624 of the record blob 1622 may be "C". The record blob 1622 may further include a GUID 1626 that may change each time the data stored inside the record blob 1622 is modified. In some embodiments, the record blob 1622 also includes a time stamp 1628 that indicates the time that the record blob 1622 was last modified.

In the scenario shown in FIG. 16, the record blob 1622 may include a pointer 1630 that associates the identifier 1606 of the data blob 1602 with the duplicate data blob 1614 by storing the identifier 1616. For example, the pointer 1630 may store the value of the identifier 1616, which is "A-11" in the exemplary format "A|11". Likewise, the record blob 1622 may further include a pointer 1632 that associates the identifier 1608 of the data blob 1604 with the duplicate data blob 1618 by storing the identifier 1620. For example, the pointer 1632 may store the value of the identifier 1620, in the exemplary format "B|9". In this way, the record blob 1622 may provide access to each of the data blobs 1614 and 1618. The completion of the delegation operation by the blob transaction component 162 is further illustrated in FIG. 17.

Figure 17:
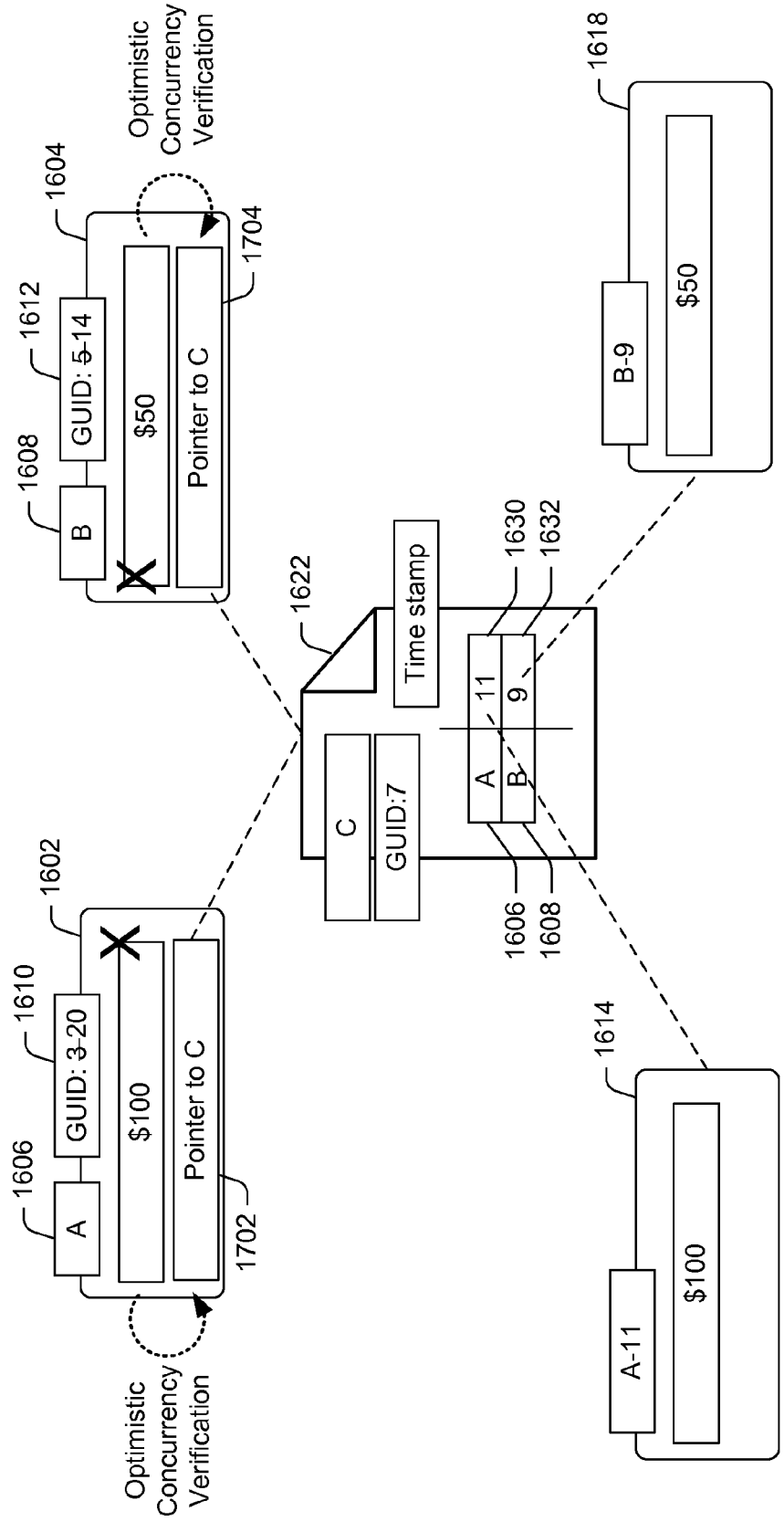
FIG. 17 shows an illustrative block diagram depicting the completion of a delegation operation for a blob transaction that transacts data across an arbitrary pair of data blobs, as implemented by a blob transaction component.

FIG. 17 shows an illustrative block diagram depicting the completion of a delegation operation for a blob transaction that transacts data across an arbitrary pair of data blobs. Following the creation of the record blob 1622, the blob transaction component 162 may replace the data in the data blob 1602 (e.g. $100) with a pointer 1702 that points to the record blob 1622 using optimistic locking. In various embodiments, the blob transaction component 162 may perform the optimistic locking by reading the value in the GUID 1610 prior to the creation of the duplicate data blob 1614, and only updating the data in the data blob 1602 to the pointer 1702 when a second reading just prior to the update indicates that the GUID 1610 contains the same value. Following a successful update of the data in the data blob 1602, the blob transaction component 162 may update the GUID 1610. For example, the value of the GUID 1610 may be changed from "3" to "20". At this point, when an application 114(1) requests data from the data blob 1602, the blob transaction component 162 may use the pointer 1702 to access the record blob 1622. In turn, the record blob 1622 may guide the blob transaction component 162 via the pointer 1630 to the data in the data blob 1614 (e.g., $100).

Likewise, the blob transaction component 162 may replace the data in the data blob 1604 (e.g., $50) with a pointer 1704 that also points to the record blob 1622 using optimistic locking. In various embodiments, the blob transaction component 162 may perform the optimistic locking by reading the value in the GUID 1612 prior to the creation of the duplicate data blob 1618, and only updating the data in the data blob 1604 to the pointer 1704 when a second reading just prior to the update indicates that the GUID 1612 contains the same value. Following a successful update of the data in the data blob 1604, the blob transaction component 162 may update the GUID 1612. For example, the value of the GUID 1612 may be changed from "5" to "14". At this point, when an application 114(1) requests data from the data blob 1604, the blob transaction component 162 may use the pointer 1704 to access the record blob 1622. In turn, the record blob 1622 may guide the blob transaction component 162 via the pointer 1632 to the data in the data blob 1618 (e.g., $50). Thus, at the completion of the delegation operation, any application request to obtain data from the data blob 1602 or the data blob 1604 may result in the data being read from a corresponding duplicate data blob.

Figure 18:
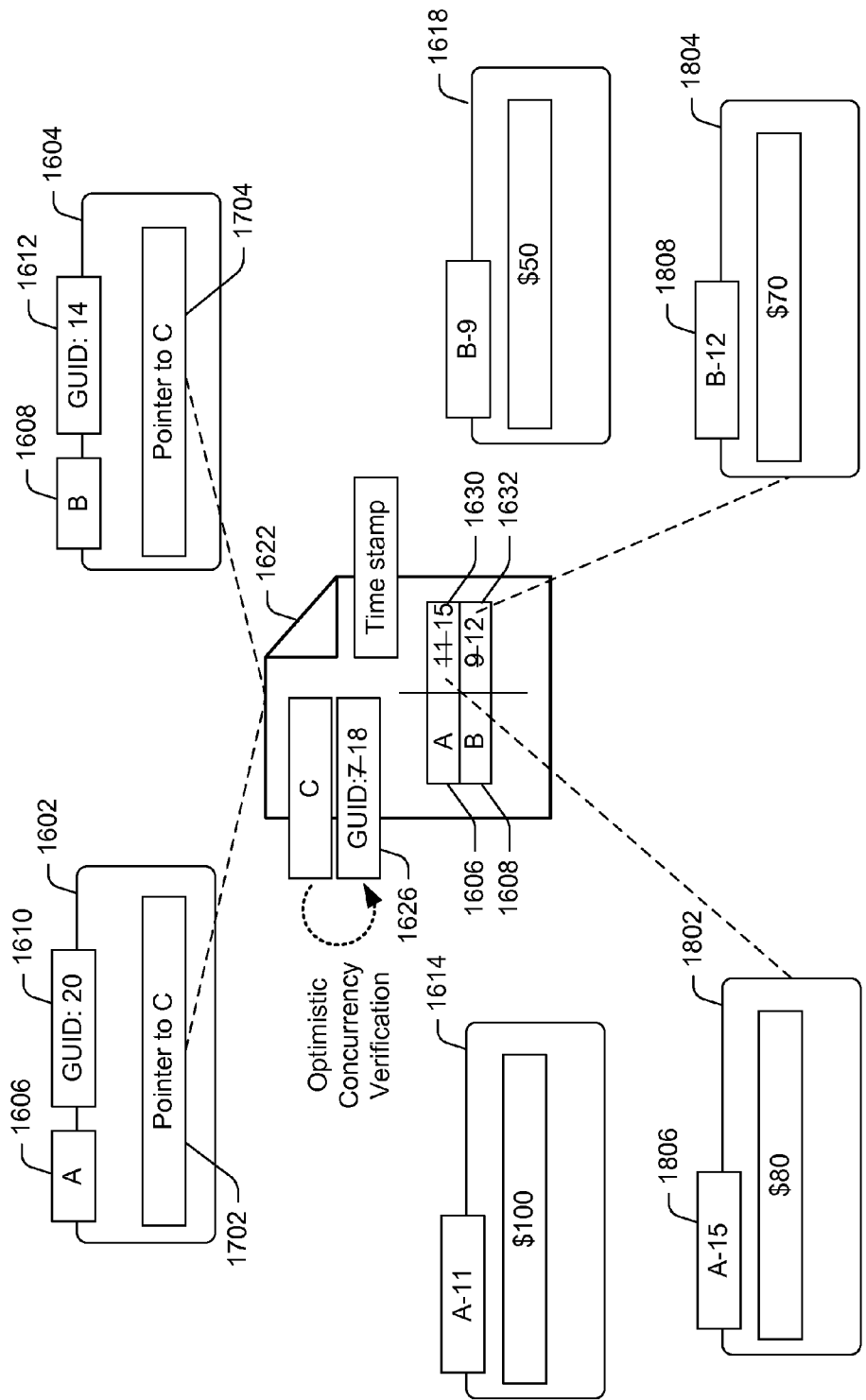
FIG. 18 shows an illustrative block diagram of a transaction operation of a blob transaction that transacts data across an arbitrary pair of data blobs, as implemented by a blob transaction component.

FIG. 18 shows an illustrative block diagram of a transaction operation of a blob transaction that transacts data across an arbitrary pair of data blobs as implemented by the blob transaction component. In various embodiments, the transaction operation may at least partially overlap with the delegation operation described in FIG. 17. During the transaction operation, the blob transaction component 162 may write a new data blob 1802 that is intended to replace the original data blob 1602, as well as a new data blob 1804 that is intended to replace the original data blob 1604. The new data blobs 1802 and 1804 may be stored in one or more data stores of the data storage layer 110. The data blob 1802 may be labeled with an identifier 1806, and the data blob 1804 may be labeled with an identifier 1808. In the scenario described above in which the balance amount of $20 is to be transferred from a first account to a second account, the blob transaction component 162 may write the new data blobs 1802 and 1804 under the direction of the accounting application. Accordingly, the new data blob 1802 may hold data that indicates the remaining balance of the first account (e.g., $80). Likewise, the new data blob 1804 may hold data that indicates the new balance of the second account (e.g., $70).

Once the new data blobs 1802 and 1804 are created, the blob transaction component 162 may commit the data transaction by updating the pointers in the record blob 1622. In various embodiments, the blob transaction component 162 may update the pointer 1630 of the record blob 1622 to point to the identifier 1806 of the data blob 1802, as shown by the update of "A|11" to "A|15". Likewise, the blob transaction component 162 may update the pointer 1632 of the record blob 1622 to point to the identifier 1808 of the data blob 1804, a shown by the update of "B|9" to "B|12". The update of the record blob 1622 may be performed using optimistic locking to achieve optimistic concurrency. For example, the blob transaction component 162 may read the value of the GUID 1626 prior to the creation of the new data blobs 1802 and 1804. Accordingly, the blob transaction component 162 may update the values in the pointers 1624 and 1626 when a second reading just prior to the update indicates that the GUID 1626 contains the same value. Following the update of the pointers 1624 and 1626 to point to the new data blobs 1802 and 1804, respectively, the blob transaction component 162 may further update the value of the GUID 1626. As shown in FIG. 18, the value of the GUID 1626 may be changed from "7" to "18". At this point, any application request to obtain data from the data blob 1602 or the data blob 1604 may result in the data being read from a corresponding new data blob.

Figure 19:
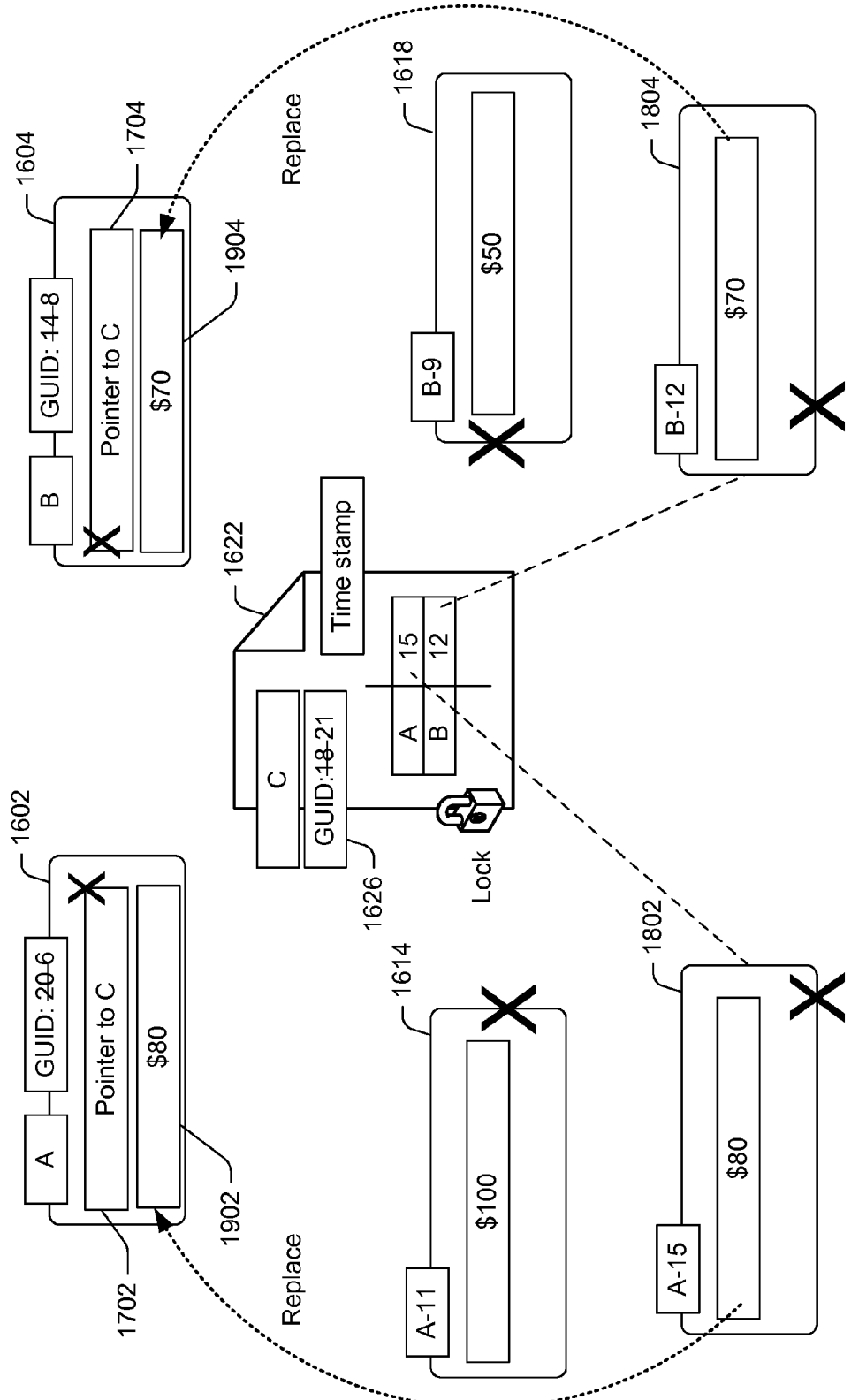
FIG. 19 shows an illustrative block diagram of a delegation removal operation of a blob transaction that transacts data across an arbitrary pair of data blobs, as implemented by a blob transaction component.

FIG. 19 shows an illustrative block diagram of a delegation removal operation of a blob transaction that transacts data across an arbitrary pair of data blobs as implemented by the blob transaction component 162. Following the completion of the transaction operation described in FIG. 18, the blob transaction component 162 may "lock" the record blob 1622 for delegation removal. In various embodiments, the locking of the record blob 1622 may be completed via the insertion of a special lock value into the record blob 1622. Upon the insertion of the special lock value, the blob transaction component 162 may update the value of the GUID 1626 of the record blob 1622 to a new value. For example, as shown in FIG. 19, the value of the GUID 1626 may be changed from "18" to "21". The locking of the record blob 1622 may still permit applications in the application layer 102 to request data from the data blobs and 1804. However, the locking of the record blob 1622 may cause the blob transaction component 162 to abort any attempt to further modify the record blob 1622 and/or insert additional new data blobs.

At this point, the blob transaction component 162 may be free to modify the data in the data blob 1602 to conform to the data in the data blob 1802, as well as modify the data in the data blob 1604 to conform to the data in the data blob 1804. In some embodiments, the blob transaction component 162 may insert data 1902 into the data blob 1602 to replace the pointer 1702, in which the data 1902 is duplicative of the data in the data blob 1802. For example, as shown, the blob transaction component 162 may insert the balance amount $80 into the data blob 1602. Likewise, the blob transaction component 162 may insert data 1904 into the data blob 1604 to replace the pointer 1704, in which the data 1902 is duplicative of the data in the data blob 1804. For example, as shown, the blob transaction component 162 may insert the balance amount $70 into the data blob 1602. Subsequently, the blob transaction component 162 may complete the delegation removal process by deleting the record blob 1622, the data blob 1614, the data blob 1618, as well as the data blobs 1802-1804 from one or more data stores of the data storage layer 110. The deletion of the data blob 1614 and the data blob 1618 may occur in a first step, and the deletion of the data blobs 1802-1804 may occur in a second step that is discrete from the first step, when implemented by the blob transaction component 162.

In the embodiments described above, each of the blobs 1602 and 1604 may include an indicator that shows whether the data blob includes substantive data or "pointer" data. In instances in which the data storage layer 110 supports custom headers, a data blob may be associated with a special header (e.g., flag) to indicate whether or not the data blob contains a "pointer" to another data blob or substantive data. In other instances in which the data storage layer 110 does not support custom headers, the data content of a data blob may be prefixed or suffixed with a fixed length indicator value. The fixed length indicator value, such as a first byte of data or a last byte of data in a data blob, may indicate whether the remaining data is substantive data or pointer data. Accordingly, based on the indicator, the blob transaction component 162 may either directly read the data in the data blob, or use the pointer data in the data blob to locate the corresponding data blob.

It will appreciated that in additional embodiments in which a data transaction may affect three or more data blobs, the operations described above in FIGS. 16-19 may also be applied to such a data transaction in a similar manner. For example, in these embodiments, the blob transaction component 162 may also create a duplicate data blob and a new data blob for each original data blob during the data transaction. The blob transaction component 162 may also create a record blob that includes the appropriate number of pointers that point to different blobs during the data transaction. Likewise, the blob transaction component 162 may provide each data blob with a GUID to ensure optimistic concurrency when the data in the various data blobs are updated during the data transaction.

Figure 20:
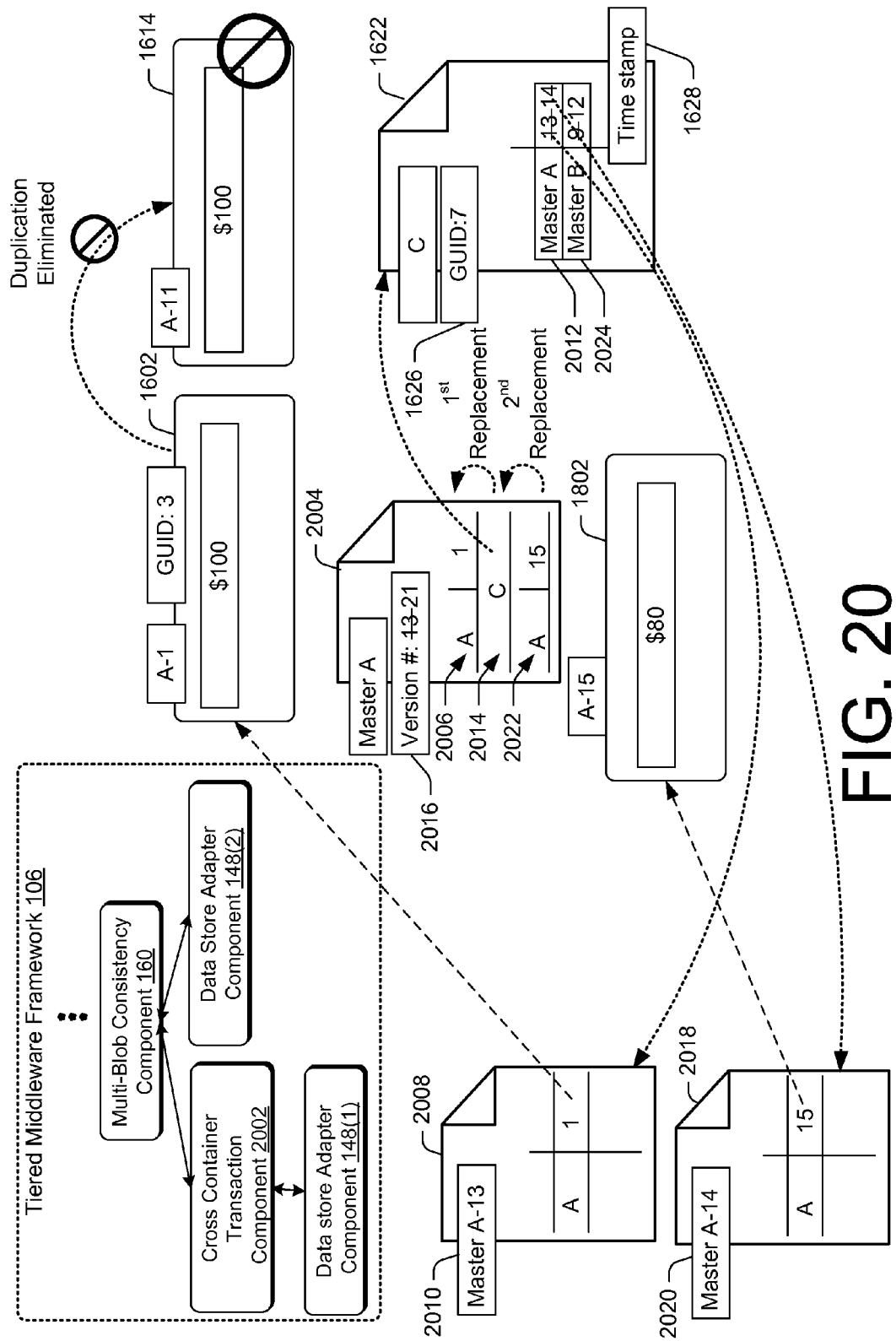
FIG. 20 shows an illustrative block diagram of cooperation between a multi-blob consistency component and a blob transaction component to enhance the efficiency of a data transaction that transacts data across an arbitrary pair of data blobs.

FIG. 20 shows an illustrative block diagram of cooperation between a multi-blob consistency component and a blob transaction component to enhance the efficiency of a data transaction that transacts data across data blobs. In such alternative embodiments, the multi-blob consistency component 160 that includes a cross-container transaction component 2002 may be integrated as part of a tiered middleware framework 106 so that the blob transaction component 162 resides between the multi-blob consistency component 160 and a data storage adapter component 148(1). The cross-container transaction component 2002 may be a special form of the blob transaction component 162 that is configured to work across multiple data containers. In this way, the multi-blob consistency component 160 may leverage the functionalities of the cross-container transaction component 2002 to transact data across arbitrary data blobs that are stored in different data stores in an optimistically consistent manner.

In turn, the integrated arrangement may also enable the cross-container transaction component 2002 to benefit from the functionalities of the multi-blob consistency component 160. For example, recall that blob transaction component 162 performs the following data copies related to the data blob 1602 during a data transaction: (1) create a duplicate data blob 1614 from data blob 1602 during the delegation step; and (2) copy the data from the data blob 1802 back into data blob 1602 during the delegation removal step. However, by leveraging the functionalities of the multi-blob consistency component 160, the cross-container transaction component 2002 may use a primary master blob 2004 to replace such data duplication operations.

For example, the primary master blob 2004 may serve as a substitute for the data blob 1602 during the delegation step, while the data blob 1602 may be stored separately in a data store. The primary master blob 2004 may initially contain an entry 2006 that stores the identifier of the data blob 1602 (e.g., "A-1"). Accordingly, when an application 114(1) requests to read the data in the data blob 1602, the blob transaction component 162 may use the cross-container transaction component 2002 to access the data blob 1602 via the identifier of the data blob 1602 that is stored in the primary master blob 2004. In turn, the blob transaction component 162 may return the data from the data blob 1602 to the application 114(1).

During the delegation step, rather than creating the duplicate data blob 1614, the blob transaction component 162 may leverage the cross-container transaction component 2002 to create an ancillary master blob 2008, which may have the identifier 2010 (e.g., "Master A-13"). The ancillary master blob 2008 may store the identifier of the data blob 1602 (e.g., "A-1"), which may act as a pointer to the data blob 1602. Subsequently, the blob transaction component 162 may create the record blob 1622. However, rather than being created to store a pointer 1630 to the duplicate data blob 1614 as described in FIG. 16, the record blob 1622 may instead initially store a pointer to the ancillary master blob 2008 (e.g., "Master A-13") in an entry 2012. Subsequently, the blob transaction component 162 may use the cross-container transaction component 2002 to replace the entry 2006 in the primary master blob 2004 with an entry 2014. The entry 2014 may be a pointer to the record blob 1622.

The replacement of the entry 2006 in the primary master blob 2004 with the entry 2014 may be performed using optimistic locking. In various embodiments, the cross-container transaction component 2002 may perform the optimistic locking by reading the version number 2016 of the master record 2004 at the time the identifier of the data blob 1602 is stored into the master record 2004, and only replacing the entry 2006 with the entry 2014 when a second reading of the version number just prior to the replacement indicates that the version number remained the same. Following a successful replacement of the entry 2006 with the entry 2014, the cross-container transaction component 2002 may update the version number 2016. For example, the version number 2016 may be changed from "13" to "21".

At this point, when an application 114(1) requests to read data from the data blob 1602, the blob transaction component 162 may access the primary master blob 2004. In turn, the entry 2014 in the primary master blob 2004 may lead the blob transaction component 162 to the entry 2012 in the record blob 1622. The entry 2012, in turn, may lead the blob transaction component 162 to the ancillary master blob 2008. Since the ancillary master blob 2008 stores the identifier of the data blob 1602, the blob transaction component 162 may be guided to the data blob 1602 so that the data (e.g., $100) may be accessed by the blob transaction component 162 and returned to the application 114(1). In this way, the creation of the duplicate data blob 1614 to duplicate data blob 1602 may be eliminated.

Following the replacement, the blob transaction component 162 may write the new data blob 1802 to a data store of the data storage layer during the transaction. The blob transaction component 162 may also use the cross-container transaction component 2002 to create an ancillary master blob 2018 that corresponds to the new data blob 1802, which may have the identifier 2020 (e.g., "Master A-14"). The ancillary master blob 2018 may store the identifier of the new data blob 1802 (e.g., "A-15"), which may act as a pointer to the new data blob 1802.

Subsequently, instead of modifying a pointer 1630 of the record blob 1622 to point to the new data blob 1802 as described in FIG. 18, the blob transaction component 162 may instead modify the entry 2012 in the record blob 1622 so that the entry 2012 contains a pointer to the ancillary master blob 2018. For example, the entry 2012 may be modified from containing the identifier "Master A-13", which points to ancillary master blob 2008, to containing the identifier "Master A-14", which points to the ancillary master blob 2018. The modification of the entry 2012 may be performed using optimistic locking via the GUID 1626. For example, the blob transaction component 162 may read the value of the GUID 1626 prior to the creation of the new data blob 1802. Accordingly, the blob transaction component 162 may update the entry 2014 when a second reading just prior to the update indicates that the GUID 1626 contains the same value. Following the update of the entry 2014, the blob transaction component 162 may further update the value of the GUID 1626.

At this point, when an application 114(1) requests to read data from the data blob 1602, the primary master blob 2004 and the record blob 1622 may eventually guide the blob transaction component 162 to the new data blob 1802, so that the data in the new data blob 1082 may be accessed by the blob transaction 162 and returned to the application 114(1). It will be appreciated that the modification of the entry 2012 may be accomplished via optimistic locking as described in FIG. 18.

Further, during the delegation removal operation, rather than copying the data from the data blob 1802 back into the data blob 1602, the blob transaction component 162 may use the cross-container transaction component 2002 to update the primary master blob 2004 so that the primary master blob 2004 leads to the data blob 1802. For example, the entry 2014 in the primary master blob 2004 may be replaced with an entry 2022 that stores the identifier of the data blob 1802 (e.g., "A-15"). The record blob 1622 may also be locked by the blob transaction component 162 as described above in FIG. 19 during the replacement of the entry 2014 with the entry 2022. The entry 2022 in the primary master blob 2004 may enable the blob transaction component 162 to use the cross-container transaction component 2002 to access the data that is in the new data blob 1802. Subsequently, the blob transaction component 162 may complete the delegation removal by deleting the data blob 1602 and the record blob 1622, and use the cross-container transaction component 2002 to delete the ancillary master blob 2008 and the ancillary master blob 2018. Thus, at the end of the delegation and removal process, only the new data blob 1802 and the primary master blob 2004 remain.

At this point, when an application 114(1) requests to read the data in the new data blob 1802, the blob transaction component 162 may use the cross-container transaction component 2002 to access the new data blob 1802 via the identifier of the new data blob 1802 that is stored in the primary master blob 2004. In turn, the blob transaction component 162 may return the data from the new data blob 1802 to the application 114(1).

While the above steps in FIG. 20 are described with respect to the data blob 1602 and the new data blob 1802, similar steps may be performed for the data blob 1604 and the new data blob 1084 shown in FIGS. 16 and 18 during the data transaction. As such, master blobs that are analogous to each of the master blobs 2004, 2008, and 2018 may be used by the blob transaction component 162 and the cross-container transaction component 2002 for the data blob 1604. Further, the record blob 1622 may also contain an entry 2024 that points to the master blobs created for the data blob 1604. For example, the entry 2024 may contain a pointer to a master blob "Master B-9" (not shown) that is analogous to the ancillary master blob 2008, which is in turn replaced by a pointer to a master blob "Master B-12" (not shown) that is analogous to the ancillary master blob 2018. Moreover, any attempt to read the data from the data blob 1602 or 1802 may also be subject to a predetermined retry limit, that is, any read attempt may be retried for a limited number of times before the read attempt is aborted.

Thus, the integrated arrangement in the alternative embodiments may improve the efficiency of the data transaction implemented by the blob transaction component 162 by substituting each of the more resource-intensive data duplications described above with a less resource-intensive modification of a small amount of data in a master blob. As a result, the speed and efficiency of the data transactions may be increased. The benefit of such substitutions may be especially apparent when the data blob 1602 and/or the data blob 1604 contain large amounts of data.

Figure 21:
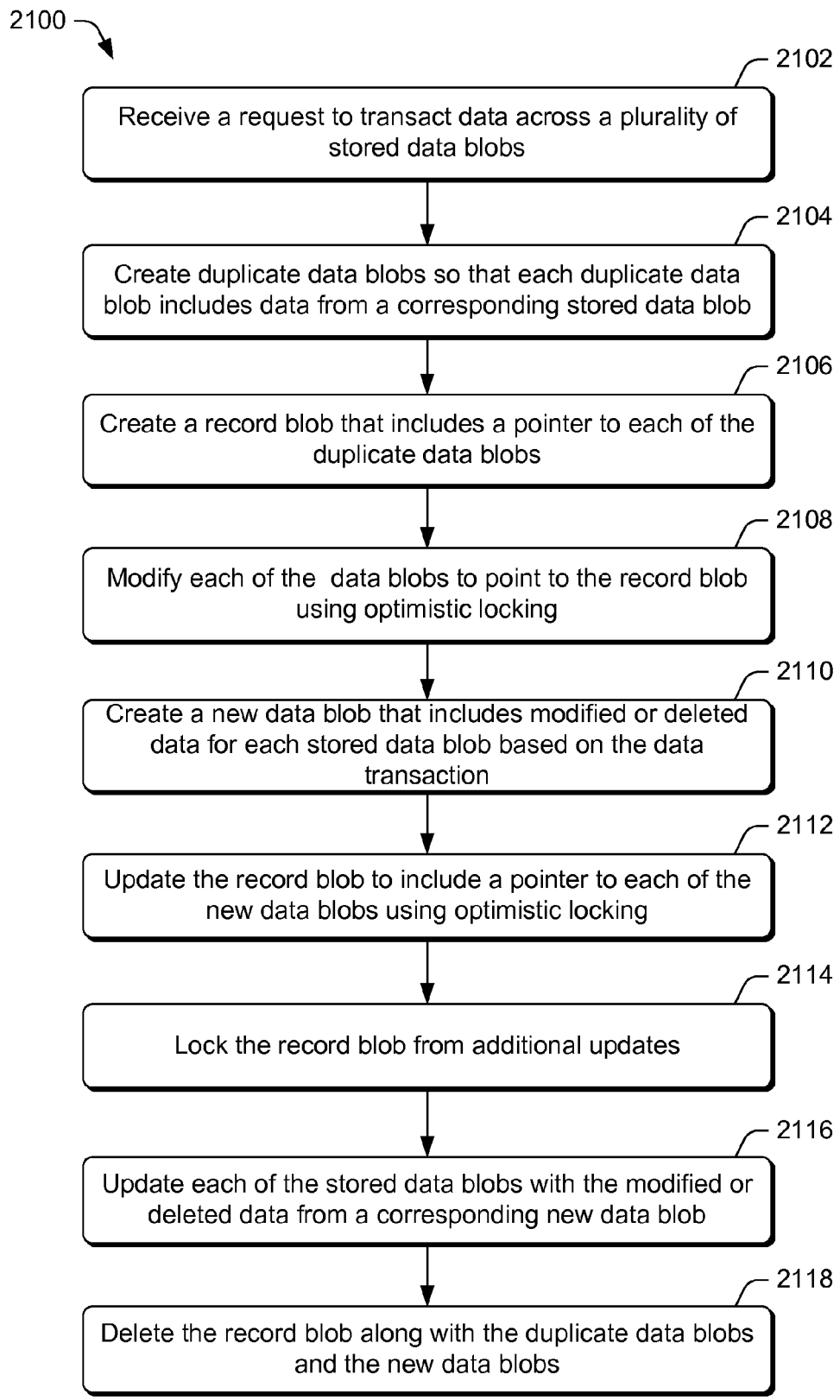
FIG. 21 is a flow diagram of an illustrative process for transacting data across arbitrary data blobs in an optimistically consistent manner.
Figure 22:
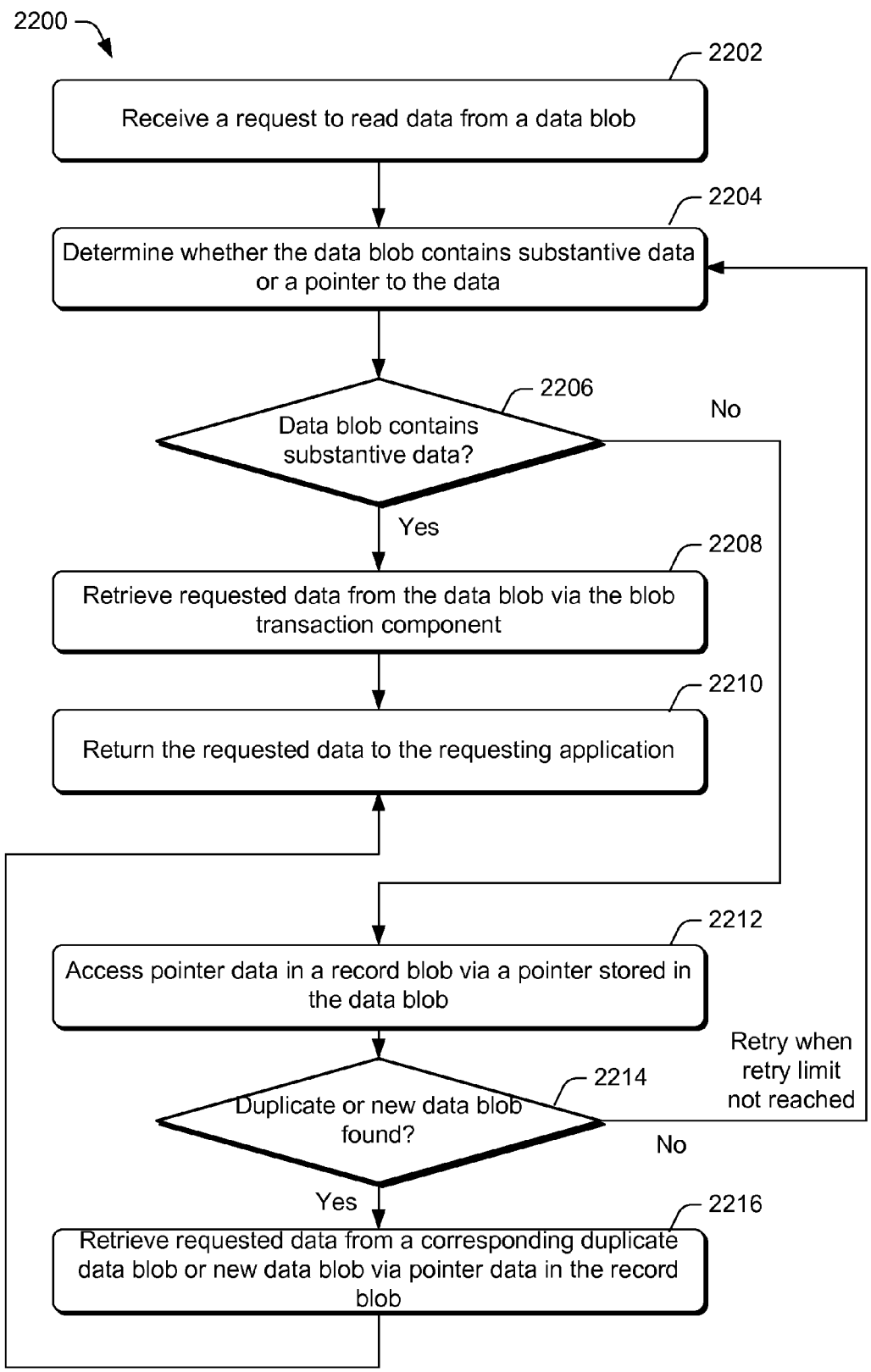
FIG. 22 is a flow diagram of an illustrative process for reading data from data blobs that are managed by the blob transaction component.
Figure 23:
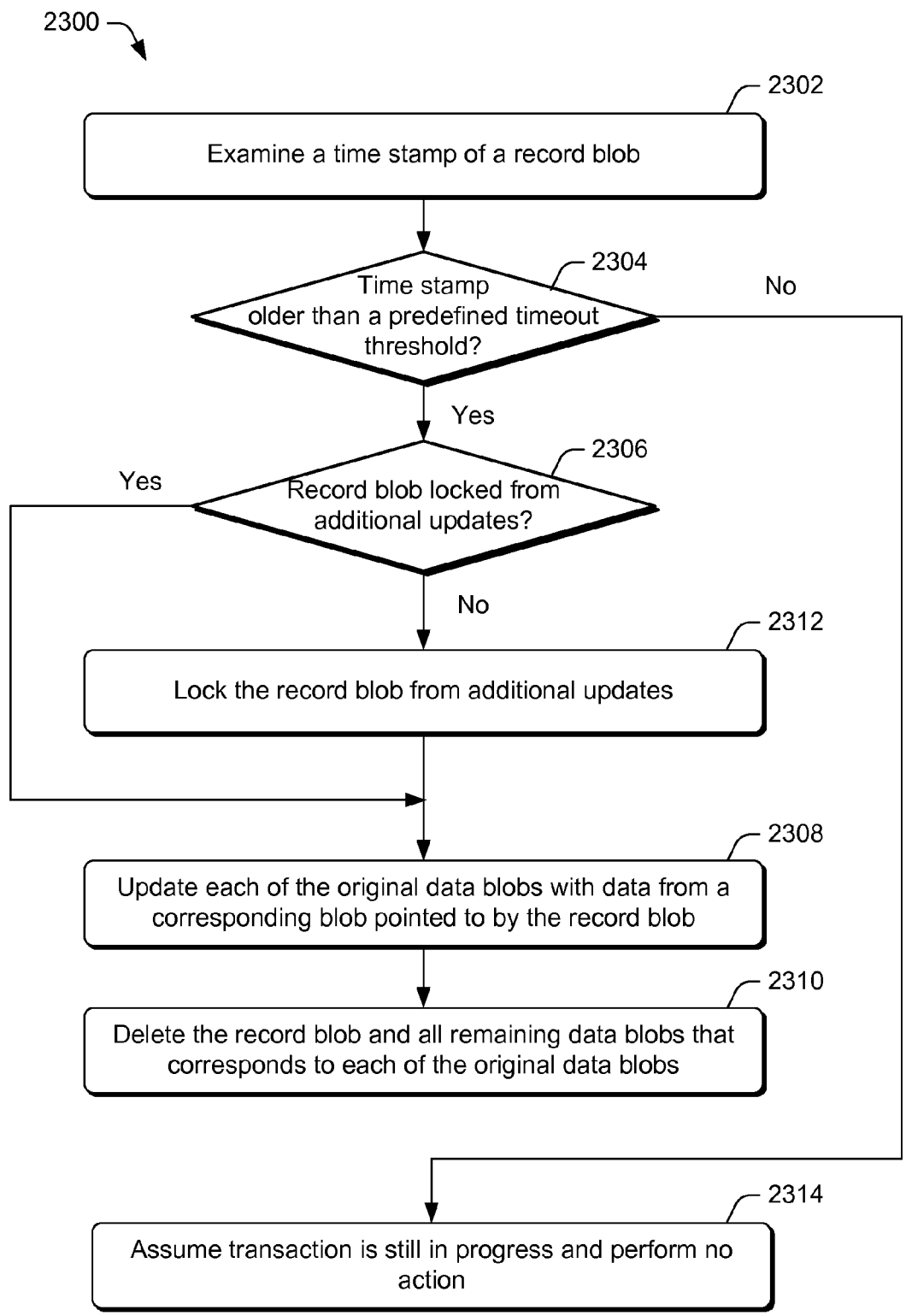
FIG. 23 is a flow diagram of an illustrative process for performing error recovery as data is transacted across arbitrary data blobs with the use of a transaction coordinator blob by the blob transaction component.

FIGS. 21-23 show illustrative processes 2100-2300 that depicts the operations of the blob transaction component 162. Each of the processes 2100-2300 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 21 is a flow diagram of an illustrative process 2100 for transacting data across arbitrary data blobs in an optimistically consistent manner. At block 2102, the blob transaction component 162 may receive a request to transact data across a plurality of stored data blobs, such as the data blobs 1602 and 1604. For example, the request may be for the transfer of a monetary amount between two bank accounts. In various embodiments, the stored data blobs may be stored in the one or more data stores of the data storage layer 110. Further, the request may be from an application 114(1) that resides in the application layer 102(1).

At block 2104, the blob transaction component 162 may create a plurality of duplicate data blobs so that each duplicate data blob includes data from a corresponding stored data blob, such as the duplicate data blobs 1614 and 1618. In other words, the data in each of the stored blobs is copied to a corresponding duplicate data blob.

At block 2106, the blob transaction component 162 may create a record blob, such as the record blob 1622, that includes a pointer to each of the duplicate data blobs. At block 2108, the blob transaction component 162 may modify each of the stored data blobs to point to the record blob. The modification of the stored data blobs may be protected by optimistic locking. Following such modification, any request for data from each of the data blob 1602 and 1604 may be routed by the blob transaction component 162 to the corresponding duplicate data blob.

At block 2110, the blob transaction component 162 may create a new data blob for each stored data blob based on the data transaction. For example, the new data blob 1802 may be created from the stored data blob 1602. Each of the new data blobs may include modified or deleted data. In one instance, the modified data in each new data blob may be a new balance after the transfer of a monetary amount.

At block 2112, the blob transaction component 162 may update the record blob to include a pointer to each of the new data blobs using optimistic locking. This update of the record blob commits the data transaction. Following such an update, any request for data from each of the data blob 1602 and 1604 may be routed by the blob transaction component 162 to the corresponding new data blob.

At block 2114, the blob transaction component 162 may lock the record blob from additional updates. In various embodiments, the locking may be achieved via the insertion of a special lock value into the record blob. The locking of the record blob may permit the reading of data from the new data blobs, but prevent other modification via the insertion additional new blobs.

At block 2116, the blob transaction component 162 may update each of the stored data blobs with the modified or deleted data from a corresponding new data blob. For example, the stored data blob 1602 may be updated with the data from the new data blob 1802.

At block 2118, the blob transaction component 162 may delete the record blob along with the duplicate data blobs and the new data blobs to complete the data transactions. It will be appreciated that in at least some embodiments, the blob transaction component 162 may implement the blocks 2102-2106 in parallel or substantially in parallel. Moreover, the blob transaction component 162 may also implement block 2110 in parallel or substantially in parallel with the implementation of the blocks 2102-2108.

In embodiments in which multi-blob consistency component 160 and the blob transaction component 162 are integrated, block 2104 may be eliminated with the use of master blobs (e.g., master blob 2004) that take place of the stored data blobs. Thus, at block 2106, the blob transaction component 162 may create a record blob that includes a pointer to each master blob. Further, rather than updating each of the stored data blobs with the modified or deleted data at block 2116, the blob transaction component 162 may instead update each of the master blobs with a pointer to the new data blob (e.g., GUID of the new data blob). Subsequently, rather than delete the duplicate data blobs and the new data blobs at block 2118, the blob transaction component 162 may delete the stored data blobs.

FIG. 22 is a flow diagram of an illustrative process for reading data from data blobs that are managed by the blob transaction component. At block 2202, the blob transaction component 162 may receive a request to read data from the data blob. The data blob may be stored in a data store of the data storage layer 110. In various embodiments, the request may be from an application 114(1) that resides in the application layer 102(1).

At block 2204, the blob transaction component 162 may determine whether the data blob contains substantive data or a pointer to the substantive data. In some embodiments, the blob transaction component 162 may make this determination based on a special indicator in the customer header of the data blob. In other embodiments, the blob transaction component 162 may make such a determination based on a special indicator that resides within the prefix or suffix portion of the data in the data blob. Accordingly, if at decision block 2206 the blob transaction component 162 determines that the data blob does contain substantive data ("yes" at decision block 2206), the blob transaction component 162 may proceed to block 2208. At block 2208, the blob transaction component 162 may retrieve the requested data from the data blob. At block 2210, the blob transaction component 162 may return the requested data to the requesting application, such as the application 114(1).

However, returning to decision block 2206, if the blob transaction component 162 determines that the data blob contains a special indicator ("no" at decision block 2206), the process 2200 may proceed to block 2212. At block 2212, the blob transaction component 162 may access the pointer data in a record blob via a pointer stored in the data blob. In various embodiments, the pointer data may point to a duplicate data blob, such as the data blob 1614, or a new data blob, such as the data blob 1802.

At decision block 2214, the blob transaction component 162 may determine whether the duplicate data blob or the new data blob was found via the pointer. If the duplicate data blob or the new data blob was not found ("no" at decision block 2214), the process 2200 may loop back to block 2204 so that another attempt to read the data from the data blob may be performed. In various embodiments, the blob transaction component 162 may perform such retry attempts for a predetermined number of times before aborting the process 2200. However, if the duplicate data blob or the new data blob was found ("yes" at decision block 2214), the process 2200 may proceed to block 2216.

Thus, at block 2216, the blob transaction component 162 may retrieve the requested data from a corresponding duplicate data blob or a corresponding new data blob based on the pointer data in the record blob. Subsequently, the process 2200 may loop back to the block 2210, so that the blob transaction component 162 may return the requested data to the requesting application, such as the application 114(1).

FIG. 23 is a flow diagram of an illustrative process 2300 for performing error cleanup as data is transacted across arbitrary data blobs with the use of a transaction coordinator blob, such as the record blob 1622, by the blob transaction component 1602. The error cleanup may remedy any failure that results in an extraneous record, one or more extraneous duplicate data blobs, or one or more extraneous new data blobs. The process 2300 may be implemented during a read, write, or an attempt to start another data transaction.

At block 2302, the blob transaction component 162 may examine the time stamp of a record blob, such as the time stamp 1628, that indicates the time of the last record blob modification. In various embodiments, the time stamp may be based on actual time or Lamport time.

At block 2304, the blob transaction component 162 may determine whether the time stamp is older than a predefined timeout threshold (e.g., one minute). In various embodiments, the predefined timeout threshold may be set based on the one or more characteristics of the data (e.g., average size) that is being transacted between data blobs. As further described below, the determination that the time stamp is older than the predefined timeout threshold may trigger error clean up. Accordingly, if the blob transaction component 162 determines that the time stamp of the record blob is older than the predefined timeout threshold ("yes" at decision block 2304), the process 2300 may proceed to decision block 2306.

At decision block 2306, the blob transaction component 162 may determine whether the record blob is locked from additional updates. If the blob transaction component 162 determines that the record blob is already locked ("yes" at decision block 2306), the process 2300 may proceed to block 2308.

At block 2308, the blob transaction component 162 may update each of the original data blob with data from a corresponding blob pointed to by the record blob. In various embodiments, the corresponding blob may be a corresponding duplicate data blob or a corresponding new blob. For example, in certain instances, the original data blob 1602 may be updated with data from the data blob 1614 or the data 1802.

At block 2310, the blob transaction component 162 may delete the record blob and all remaining data blobs (e.g., the duplicate data blob and/or the new data blob) that correspond to each of the original data blobs. In other words, the blob transaction component 162 may, at this point, perform the delegation removal operation described above in FIG. 19. For example, in certain instances, the blob transaction component 162 may delete the record blob 1622, the data blob 1614 and/or the data 1802.

However, if the blob transaction component 162 determines that the record blob is not locked ("no" at decision block 2306), the process 2300 may proceed to block 2312. At block 2312, the blob transaction component 162 may lock the record from the additional updates. In various embodiments, the locking may be achieved via the insertion of a special lock value into the record blob. Subsequently, the process 2300 may continue to block 2308 so that the original data blob may be updated and a corresponding delegation removal operation carried out.

However, returning to block 2304, if the blob transaction component 162 determines that the time stamp of the record blob is not older than the predefined timeout threshold ("no" at decision block 2304), the process 2300 may proceed to block 2314. At block 2314, the blob transaction component 162 may assume that a data transaction is still in progress and performs no action.

In various embodiments in which the delegation operation and the transaction operations are implemented in parallel or substantially in parallel, the blob transaction component 162 may delay the creation of a the record blob, such as the record blob 1622, until the new data blobs, such as the data blobs 1802 and 1804, are completed when a short predefined timeout threshold is used. As a result, the time between the creation of the record blob and the update of the record blob with pointers to the new data blobs for the purpose of committing the data transaction may be kept to a minimum. In this way, the undesired performance of error cleanup by the blob transaction component 162 may be reduced or eliminated.

Figure 24:
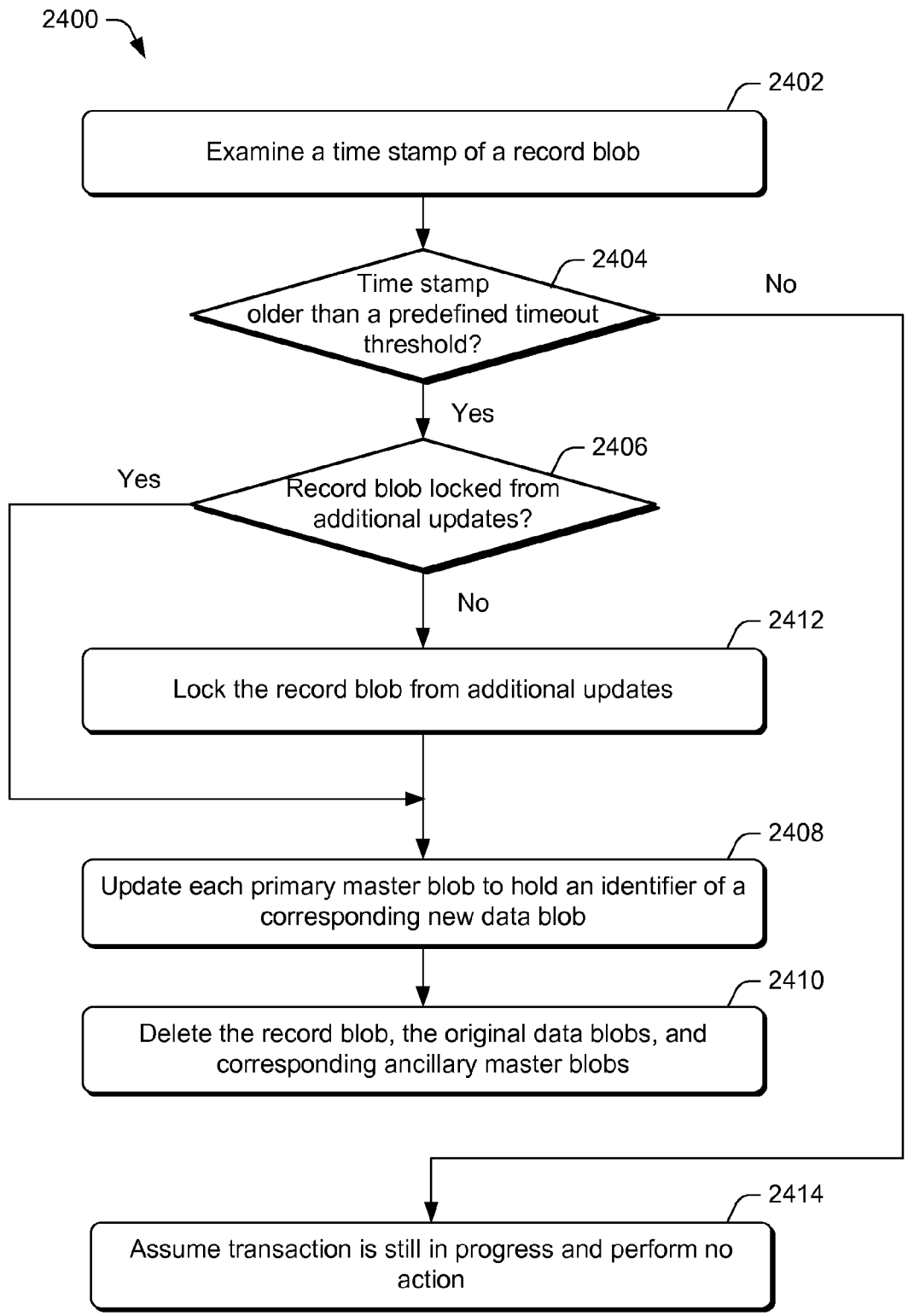
FIG. 24 is a flow diagram of an illustrative process for performing error recovery as data is transacted across arbitrary data blobs by the blob transaction component and the cross-container transaction component.

FIG. 24 is a flow diagram of an illustrative process 2400 for performing error cleanup as data is transacted across arbitrary data blobs by the blob transaction component 162 and the cross-container transaction component 2002. The error cleanup may remedy any failure that results in an extraneous record, one or more extraneous duplicate data blobs, or one or more extraneous new data blobs. The process 2400 may be implemented during a read, write, or an attempt to start another data transaction.

At block 2402, the blob transaction component 162 may examine the time stamp of a record blob, such as the time stamp 1628, that indicates the time of the last record blob modification. In various embodiments, the time stamp may be based on actual time or Lamport time.

At block 2404, the blob transaction component 162 may determine whether the time stamp is older than a predefined timeout threshold (e.g., one minute). In various embodiments, the predefined timeout threshold may be set based on the one or more characteristics of the data (e.g., average size) that is being transacted between data blobs. As further described below, the determination that the time stamp is older than the predefined timeout threshold may trigger error clean up. Accordingly, if the blob transaction component 162 determines that the time stamp of the record blob is older than the predefined timeout threshold ("yes" at decision block 2404), the process 2400 may proceed to decision block 2406.

At decision block 2406, the blob transaction component 162 may determine whether the record blob is locked from additional updates. If the blob transaction component 162 determines that the record blob is already locked ("yes" at decision block 2406), the process 2400 may proceed to block 2408.

At block 2408, the blob transaction component 162 may update each primary master blob to hold an identifier of a corresponding new data blob. In various embodiments, the identifier of the corresponding new data blob may replace any pointer data that is in each primary master blob. For example, in certain instances, the entry 2014 in the primary master blob 2004 may be replaced with entry 2022.

At block 2410, the blob transaction component 162 may delete the record blob and all original data blobs, as well as any remaining ancillary master blobs that correspond to each of the original data blobs. Thus, only the new data blobs and the primary master blobs that correspond to each of the new data blobs are left behind. In other words, the blob transaction component 162 may, at this point, perform the delegation removal operation described above in FIG. 20. For example, in certain instances, the blob transaction component 162 may delete, with respect to the new data blob 1802, the record blob 1622, the original data blob 1602, and the ancillary master blobs 2008 and 2018.

However, if the blob transaction component 162 determines that the record blob is not locked ("no" at decision block 2406), the process 2400 may proceed to block 2412. At block 2412, the blob transaction component 162 may lock the record from the additional updates. In various embodiments, the locking may be achieved via the insertion of a special lock value into the record blob. Subsequently, the process 2400 may continue to block 2408 so that the primary master blobs may be updated and a corresponding delegation removal operation carried out.

However, returning to block 2404, if the blob transaction component 162 determines that the time stamp of the record blob is not older than the predefined timeout threshold ("no" at decision block 2404), the process 2400 may proceed to block 2414. At block 2414, the blob transaction component 162 may assume that a data transaction is still in progress and performs no action.

In summary, the blob transaction component 162 may facilitate data transactions across arbitrary data blobs that are stored in different data stores in an optimistically consistent manner. In order to achieve such optimistic concurrency, the blob transaction component 162 may leverage the ability of the data storage layer 110 to implement a data transaction to a single data blob in an optimistically manner and update a single data blob atomically.

Sub-Containment Concurrency Component

The sub-containment concurrency component 164 may ensure optimistic concurrency for transactions on data that are organized according to a sub-containment hierarchical structure. In order to achieve such optimistic concurrency, the sub-containment concurrency component 164 may assign the root container in the sub-containment hierarchical structure a parent version value, and assign the remaining data containers in the sub-containment hierarchical structure both a parent version value and a child version value. As described below, these assigned parent and child version values may be used by the sub-containment concurrency component 164 to guarantee that the data transactions are performed using optimistic concurrency.

Figure 25:
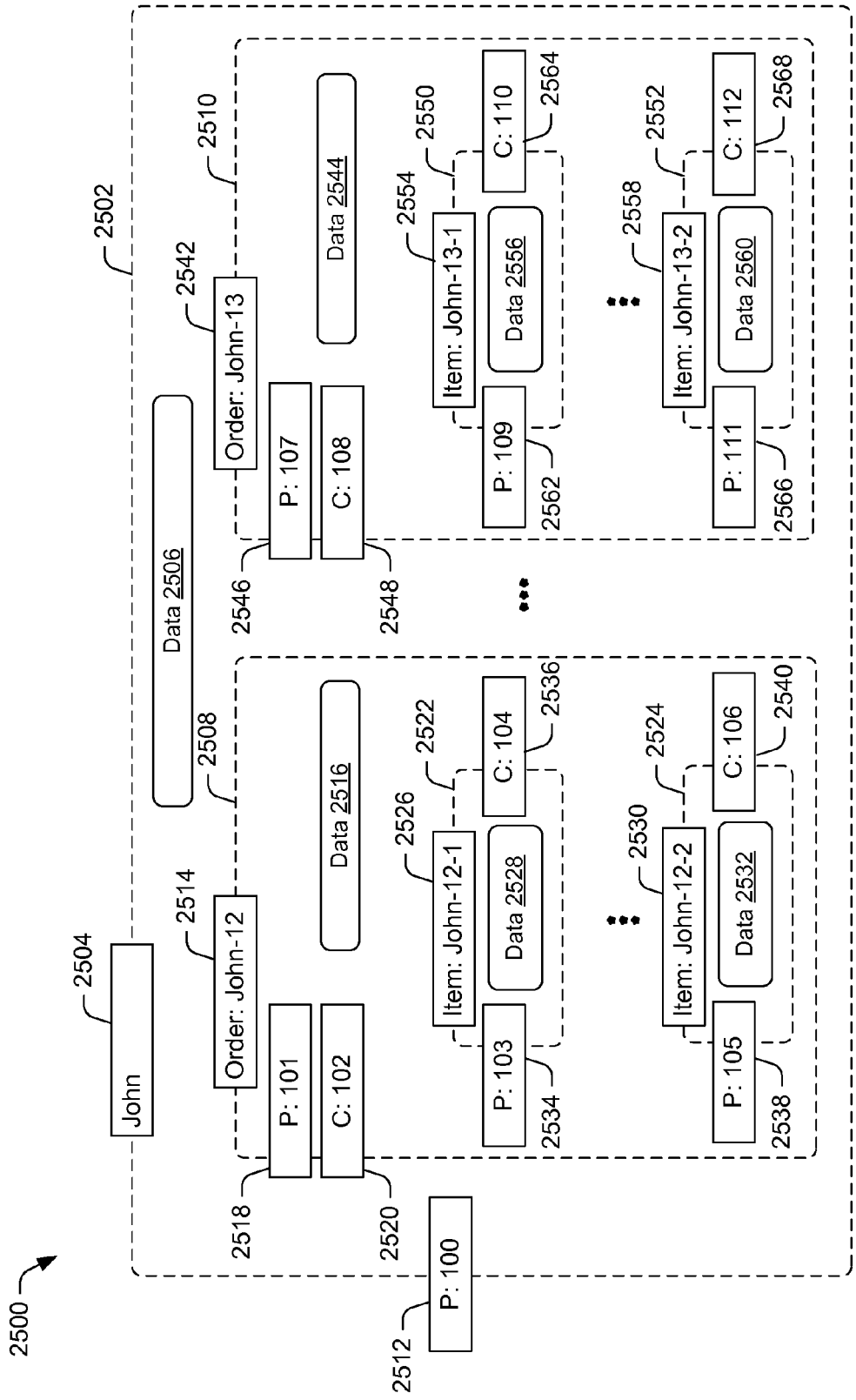
FIG. 25 shows an illustrative block diagram of a sub-containment hierarchical structure having version values that ensures optimistic concurrency.

FIG. 25 shows an illustrative block diagram of an example sub-containment hierarchical structure 2500 having version values that ensure optimistic concurrency. As shown, the sub-containment hierarchical structure 2500 may include a data container 2502 that is labeled with an identifier 2504. The data container 2502 may be a root data container that occupies the root level of the sub-containment hierarchical structure 2500. The root container 2502 may include data 2506 and additional sub-containers 2508 and 2510. For example, the root container 2502 may be a data container for storing online order information for a customer "John", and the data 2506 may be personal information of John, such as account name, password, billing address, and/or the like. Since the root container 2502 is the highest data container, the sub-containment concurrency component 164 may label the root container 2502 with only a parent version value 2512.

The sub-container 2508, labeled with an identifier 2514 by the sub-containment concurrency component 164, may include data 2516. The data 2516 may be related to the data 2506. For example, the data 2516 may be information related to the 12th order placed by "John", as the identifier 2514 is "Order John-12". The data 2516 may include a credit card number and a shipping address John supplied for this particular order. The sub-containment concurrency component 164 may label the sub-container 2508 with a parent version value 2518 and a child version value 2520.

The sub-container 2508 may further contain sub-containers 2522 and 2524. The sub-containers 2522 may be labeled with an identifier 2526 and contains data 2528. The sub-container 2524 may be labeled with an identifier 2530 and contains data 2532. Both the data 2528 and 2532 may be related to the data 2516. For example, the data 2528 may be information regarding a specific item in the 12th order placed by "John", hence the identifier 2526 may be "Item: John-12-1". Likewise, the data 2532 may be information regarding another purchased item in the $12^{th}$ order placed by "John", hence the identifier 2530 may be "Item: John-12-2". The sub-containment concurrency component 164 may assign a parent version value and a child version value to each of the sub-containers 2522 and 2524. As such, the sub-container 2522 may be labeled with a parent version value 2534 and a child version value 2536, and the sub-container 2523 may be labeled with a parent version value 2538 and a child version value 2540.

In a similar manner as described above, the sub-container 2510, labeled with an identifier 2542 by the sub-containment concurrency component 164, may include data 2544. The data 2544 may be related to the data 2506. For example, the data 2544 may be information related to the 13th order placed by "John", as the identifier 2514 is "Order John-13". The data 2544 may include a credit card number and a shipping address John supplied for this particular order. The sub-containment concurrency component 164 may label the sub-container 2510 with a parent version value 2546 and a child version value 2548.

In turn, the sub-container 2510 may further contain sub-containers 2550 and 2552. The sub-containers 2550 may be labeled with an identifier 2554 and contains data 2556. The sub-container 2552 may be labeled with an identifier 2558 and contains data 2560. Both the data 2556 and 2560 may be related to the data 2544. For example, the data 2556 may be information regarding a purchased item in the 13th order placed by "John", hence the identifier 2554 may be "Item: John-13-1" in such an example. Likewise, the data 2560 may be information regarding another purchased item in the $13^{th}$ order placed by "John", hence the identifier 2558 may be "Item: John-13-2" in the example. The sub-containment concurrency component 164 may further assign a parent version value and a child version value to each of the sub-containers 2550 and 2552. As such, the sub-container 2550 may be labeled with a parent version value 2562 and a child version value 2564, and the sub-container 2552 may be labeled with a parent version value 2566 and a child version value 2568. As shown, the naming convention for the data containers is such that the naming of each child data container may be inferable from a data parent container.

It will be further appreciated that the number of sub-containers shown at each level of the sub-containment hierarchical structure 2500 is illustrative rather than limiting. For example, any number of additional "sibling" sub-containers may accompany the sub-containers 2508 and 2510 in other embodiments. Likewise, any number of additional "sibling" sub-containers may accompany the sub-containers 2522 or 2556 in additional embodiments. In some embodiments, the relationship of the data containers in the sub-containment hierarchical structure 2500 may be inferable from the identifiers of the data containers. In other embodiments, the hierarchy of the data containers in the sub-containment hierarchical structure 2500 may be established via the hierarchical linking of the identifiers of the data containers. The data in the data containers may be transacted by different applications, such as application 114(1) of the application layer 102.

In various embodiments, when a data write is performed on any container in the sub-containment hierarchical structure 2500, the sub-containment concurrency component 164 may performed two steps in order to determine whether the data write is allowed to proceed, as well as to update the parent and child version values. The data write may be performed as part of a data transaction requested by the application 114(1) in the application layer 102. First, the sub-containment concurrency component 164 may read the current parent version value and child version value of a container to which data is to be written. The sub-containment concurrency component 164 may then compare the currently read parent version value to a parent version value of the container that was previously read during the initiation of the data transaction. Likewise, the sub-containment concurrency component 164 may also compare the currently read child version value to a child version value of the container that was previously read during the initiation of the data transaction. Thus, the sub-containment concurrency component 164 may only perform the data write to the container when the two parent version values match, and the two child version values match. However, if the container is the root container with only a parent version value, then only the parent version value is read twice and compared.

Second, for each container in the sub-containment hierarchical structure 2500 to which data is written, the sub-containment concurrency component 164 may update both the parent version value and the child version value to new values. However, if the container is the root container with only a parent version value, then only the parent version value is updated. Additionally, the sub-containment concurrency component 164 may also update the parent version value of each ancestor container of the container to which data is written to a new value, and update the child version value of each descendant container to a new value. In such embodiments, the parent and child version values of all the data containers in the sub-containment hierarchical structure 2500 may be non-consecutive GUIDs. Thus, the consecutive parent and child version values shown in FIG. 25 are merely illustrative and non-limiting. In other embodiments, each of the parent and child version values may be a current real time, a current Lamport time, or any other value that may serve the same function as a GUID.

Accordingly, as shown below, the parent and child version values of the data containers in the sub-containment hierarchical structure 2500, as updated during each write to a container, may be used by the sub-containment concurrency component 164 to guarantee that the data transactions are performed using optimistic concurrency.

Figure 26:
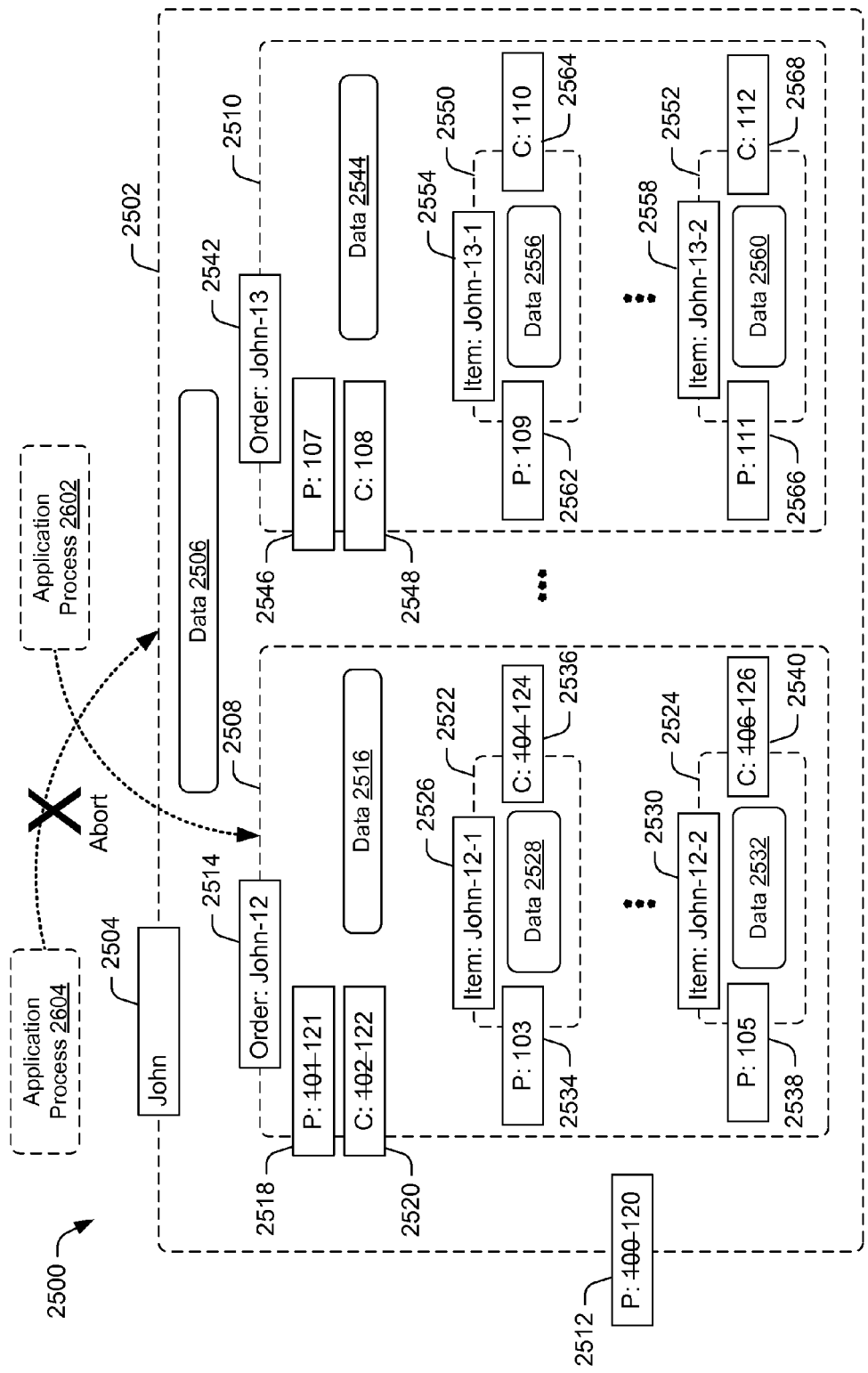
FIG. 26 shows an illustrative block diagram of ensuring optimistic concurrency for data transactions on a root data container and a direct descendant sub-container via the sub-containment concurrency component.

FIG. 26 shows an illustrative block diagram of ensuring optimistic concurrency for data transactions on a root data container and a direct descendant sub-container of the sub-containment hierarchical structure 2500. As shown, an application process 2602 may be initiated to perform a data modification on the data 2516 in the sub-container 2508. The application process 2602 may be initiated by an application, such as the application 114(1) of the application layer 102, in response to a user request. In order to prepare for the data modification, the application process 2602 may read the data 2516 that is in the sub-container 2508. Accordingly, due to the read of the data 2516, the sub-containment concurrency component 164 may conduct a first read of the parent version value 2518 (e.g., 101) and child version value 2520 (e.g., 102) of the sub-container 2508.

As further shown, an application process 2604 may be simultaneously initiated to perform a data modification on the data 2506 of the root container 2502. The application process 2604 may be initiated by the same application 114(1), or a different application of the application layer 102 in response to another user request. In order to prepare for the data modification, the application process 2604 may read the data 2506 that is in the root container 2502. Accordingly, due to the read of the data 2506, the sub-containment concurrency component 164 may conduct a first read of the parent version value 2512 (e.g., 100) of the root container 2502.

As part of performing a write operation of the data modification to the data 2516, the sub-containment concurrency component 164 may conduct a second read of the parent version value 2518 and the child version value 2520 of the sub-container 2508. Thus, assuming that the write to the data 2516 occurs before the write operation of the data modification to the data 2506 of the root container 2502, the sub-containment concurrency component 164 may find that both parent version value 2518 and child version value 2520 are unchanged at the second read. As a result, the application process 2602 may perform the write to the data 2516.

Subsequently, as shown, the sub-containment concurrency component 164 may update the parent version value 2518 and the child version value 2520 to new values (e.g., 121, 122, respectively). Moreover, each of the child version values of the sub-containers within the sub-container 2508 may also be updated to new values. For example, the child version value 2536 of the sub-container 2522 may be updated from "104" to "124". Likewise, the child version value of 2540 of the sub-container 2524 may be updated from "106" to "126". Additionally, the sub-containment concurrency component 164 may further update the parent version value 2512 of the root container 2502. For example, the parent version value 2512 of the root container 2502 may be updated from "100" to "120."

Assuming that the write to the data 2516 occurred before the write operation of the data modification to the data 2506 of the root container 2502, the sub-containment concurrency component 164 may next conduct a second read of the parent version value 2512 of the root container 2502 as part of performing a write operation to the data 2506. This second read may reveal that the parent version value 2514 is no longer "100", but is instead, "120". As a result of this mismatch, the sub-containment concurrency component 164 may cause the application process 2604 to abort. In this way, optimistic concurrency for the data transactions of the application process 2602 and 2604 may be maintained.

On the other hand, in a scenario in which the write to the data 2506 occurred before the write operation of the data modification to the data 2516, the effect may be the reversed. In such as scenario, the write to the data 2506 may be followed by the update of the parent version value 2512 of the root container 2502 from "100" to "120". Additionally, the update of the child version value 2520 of the sub-container 2508 from "102" to "122", the update of the child version value 2536 from "104" to "124", as well as the update of the child version value from "106" to 126" may also follow.

Thus, during a subsequent attempted write to the data 2516 of the sub-container 2508, the sub-containment concurrency component 164 may find upon a second read that while the parent version value 2518 is unchanged, the child version value 2520 has already been updated to "122" for the previous write to the data 2506. As a result of the mismatch of the child version value 2520 between the first read and the second read, the sub-containment concurrency component 164 may cause the application process 2602 to abort.

Figure 27:
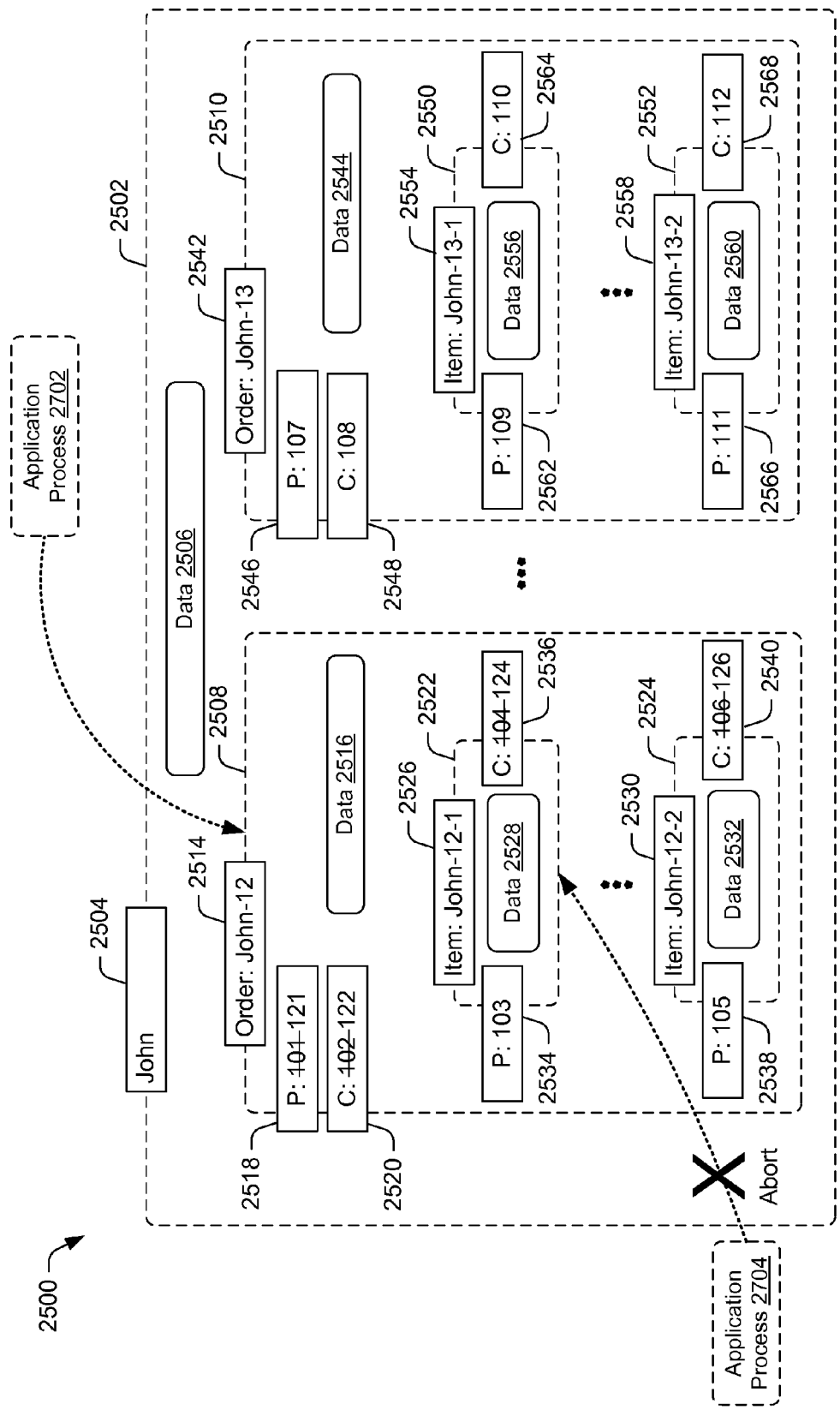
FIG. 27 shows an illustrative block diagram of ensuring optimistic concurrency for data transactions on a parent sub-container and a child sub-container via the sub-containment concurrency component.

FIG. 27 shows an illustrative block diagram of ensuring optimistic concurrency for data transactions on a parent sub-container and a child sub-container of the sub-containment hierarchical structure 2500. As shown, an application process 2702 may be initiated to perform a data modification on the data 2516 in the sub-container 2508. The application process 2602 may be initiated by an application, such as the application 114(1) of the application layer 102, in response to a user request. In order to prepare for the data modification, the application process 2602 may read the data 2516 that is in the sub-container 2508. Accordingly, due to the read of the data 2516, the sub-containment concurrency component 164 may conduct a first read of the parent version value 2518 (e.g., 101) and the child version value 2520 (e.g., 102) of sub-container 2508.

As further shown, an application process 2704 may be simultaneously initiated to perform a data modification on the data 2528 of the sub-container 2522. The application process 2704 may be initiated by the same application 114(1), or a different application of the application layer 102 in response to another user request. In order to prepare for the data modification, the application process 2704 may read the data 2528 that is in the sub-container 2522. Accordingly, due to the read of the data 2528, the sub-containment concurrency component 164 may conduct a first read of the parent version value 2534 (e.g., 103) and the child version value 2536 (e.g., 104) of the sub-container 2522.

As part of performing a write operation of the data modification to the data 2516, the sub-containment concurrency component 164 may conduct a second read of the parent version value and the child version value of the sub-container 2508. Thus, assuming that the write to the data 2516 occurs before the write operation of the data modification to the data 2528 of the sub-container 2522, the sub-containment concurrency component 164 may find that both the parent version value 2518 and the child version value 2520 are unchanged at the second read. Accordingly, the application process 2602 may perform the write to the data 2516.

Subsequently, as shown, the sub-containment concurrency component 164 may update the parent version value 2518 and the child version value 2520 to new values (e.g., 121, 122, respectively). Moreover, each of the child version values of the sub-containers within the sub-container 2508 may be updated to new values. For example, the child version value 2536 of the sub-container 2522 may be updated from "104" to "124". Likewise, the child version value of 2540 of the sub-container 2524 may be updated from "106" to "126". Additionally, the sub-containment concurrency component 164 may further update the parent version value 2512 of the root container 2502. For example, the parent version value 2512 of the root container 2502 may be updated from "100" to "120."

As a result, assuming that the write to the data 2516 occurred before the write operation of the data modification to the data 2528 of the sub-container 2522, the sub-containment concurrency component 164 may next conduct a second read of the parent version value 2534 and the child version value 2536 of the sub-container 2522 as part of performing a write operation to the data 2506. This second read may reveal that while the parent version value 2534 remains unchanged, the child version value 2536 is no longer "104", but is instead, "124". As a result of the mismatch of the child version value, the sub-containment concurrency component 164 may cause the application process 2704 to abort. In this way, optimistic concurrency of the data transactions of the application process 2702 and 2704 may be maintained.

On the other hand, in a scenario in which the write to the data 2528 occurred before the write operation of the data modification of the data 2516, the effect may be reversed. In such as scenario, the write to the data 2528 may be followed by the update of the parent version value 2518 of the sub-container 2508 from "101" to "121", as well as the update of the parent version value 2512 of the root container 2502 from "100" to "120", among other updates.

Thus, during a subsequent attempted write to the data 2516 of the sub-container 2508, the sub-containment concurrency component 164 may find that while the child version value 2520 is unchanged, the parent version value 2518 has already been updated to "122" for the previous write to the data 2516. As a result of the mismatch of the parent version value 2518 between the first read and the second read, the sub-containment concurrency component 164 may cause the application process 2702 to abort.

Figure 28:
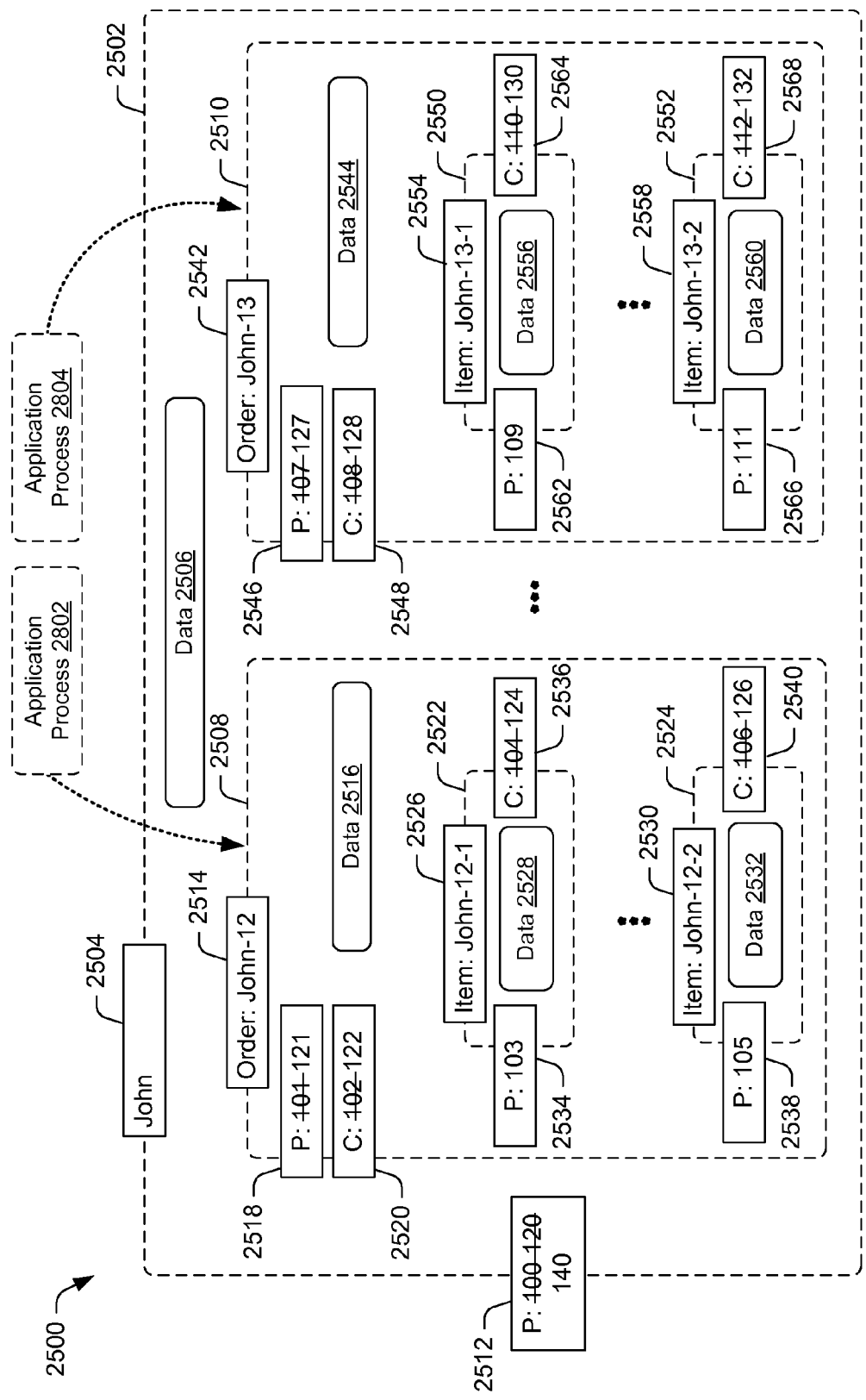
FIG. 28 shows an illustrative block diagram of concurrent data transactions on two sibling data containers via the sub-containment concurrency component that does not trigger optimistic locking.

FIG. 28 shows an illustrative block diagram of concurrent data transactions on two sibling data containers of the sub-containment hierarchical structure 2500 via the sub-containment concurrency component that does not trigger optimistic locking. As shown, an application process 2802 may be initiated to perform a data modification on the data 2516 in the sub-container 2508. The application process 2602 may be initiated by an application, such as the application 114(1) of the application layer 102, in response to a user request. In order to prepare for the data modification, the application process 2602 may read the data 2516 that is in the sub-container 2508. Accordingly, due to the read of the data 2516, the sub-containment concurrency component 164 may conduct a first read of the parent version value 2518 (e.g., 101) and the child version value 2520 (e.g., 102) of the sub-container 2508.

As further shown, an application process 2804 may be simultaneously initiated to perform a data modification on the data 2544 of the "sibling" sub-container 2510. The application process 2804 may be initiated by the same application 114(1), or a different application of the application layer 102 in response to another user request. In order to prepare for the data modification, the application process 2804 may read the data 2544 that is in the sub-container 2522. Accordingly, due to the read of the data 2544, the sub-containment concurrency component 164 may conduct a first read of the parent version value 2546 (e.g., 107) and the child version value 2548 (e.g., 108) of the sub-container 2508.

As part of performing a write operation of the data modification to the data 2516, the sub-containment concurrency component 164 may conduct a second read of the parent version value and the child version value of the sub-container 2508. In some embodiments, the data modification to the data 2516 of the sub-container 2508 may occur before the data modification to the data 2544 of the sub-container 2510. Thus, the sub-containment concurrency component 164 may find that both parent version value 2518 and the child version value 2520 are unchanged at the second read. Accordingly, the application process 2602 may perform the write to the data 2516.

Subsequently, as shown, the sub-containment concurrency component 164 may update the parent version value 2518 and the child version value 2520 to new values (e.g., 121, 122, respectively). Moreover, each of the child version values of the sub-containers within the sub-container 2508 may also be updated to new values. For example, the child version value 2536 of the sub-container 2522 may be updated from "104" to "124". Likewise, the child version value of 2540 of the sub-container 2524 may be updated from "106" to "126". Additionally, the sub-containment concurrency component 164 may further update the parent version value 2512 of the root container 2502. For example, the parent version value 2512 of the root container 2502 may be updated from "100" to "120."

Moreover, as part of performing a write operation of the data modification to the data 2544, the sub-containment concurrency component 164 may conduct a second read of the parent version value and the child version value of the sub-container 2510. Thus, as shown, since the application processes 2802 and 2804 performed separate writes on "sibling" sub-containers, the sub-containment concurrency component 164 may find that both parent version value 2546 and the child version value 2548 are unchanged at the second read. Accordingly, the application process 2602 may perform the write to the data 2544.

Subsequently, as shown, the sub-containment concurrency component 164 may update the parent version value 2546 and the child version value 2548 to new values (e.g., 127, 128, respectively). Moreover, each of the child version values of the sub-containers within the sub-container 2510 may be updated to new values. For example, the child version value 2564 of the sub-container 2550 may be updated from "110" to "130". Likewise, the child version value of 2568 of the sub-container 2552 may be updated from "112" to "132". Further, the sub-containment concurrency component 164 may once again update the parent version value 2512 of the root container 2502. For example, the parent version value 2512 of the root container 2502 may be further updated from "120" to "140."

Therefore, as can be observed from FIG. 28, the simultaneous writes to "sibling" sub-containers (i.e., sub-containers that occupy the same level in the sub-containment hierarchical structure 2500) do not trigger optimistic locking of one of the sub-containers.

In various embodiments, when an application process performs data writes to "nested" data containers, the sub-containment concurrency component 164 may forgo any version value checks for the "descendant" data containers. Rather, the sub-containment concurrency component 164 may rely on the check of the parent and child version values for uppermost "ancestor" container or sub-container to ensure optimistic concurrency.

For example, in the scenario discussed above, the application process 2802 may need to perform data writes to both the data 2516 of the sub-container 2508 and the data 2528 of the sub-container 2522 that is nested inside the sub-container 2522. Thus, while the sub-containment concurrency component 164 may write to both the data 2516 and the data 2528, the sub-containment concurrency component 164 may only perform first and second reads on the parent version value 2518 and the child version 2520 of the sub-container 2508 to check whether the writes are to be performed. The sub-containment concurrency component 164 may forego the check of the parent version value 2534 and the child version value 2536 of the sub-container 2522 in such a scenario, as the check of the parent and child version values of the sub-container 2508 already offers the desired optimistic concurrency protection against any writes performed by the application process 2804. Nevertheless, it will be appreciated that even though they are not checked, the parent version value 2534 and the child version value 2536 of the sub-container 2522 are updated by the sub-containment concurrency component 164 after the write to the data 2528.

So far, the optimistic concurrency checking described above is in the context of a data transaction that reads a single identified container and some or all of the descendent data containers of the single identified container. However, in other embodiments in which the sub-containment hierarchical structure 2500 is implemented on a non-blob storage application layer, multiple data transactions in which each data transaction reads multiple "sibling" data containers may also be performed by the sub-containment concurrency component 164. The performance of optimistic concurrency checking in such a data transaction scenario is described in FIG. 28.

Figure 29:
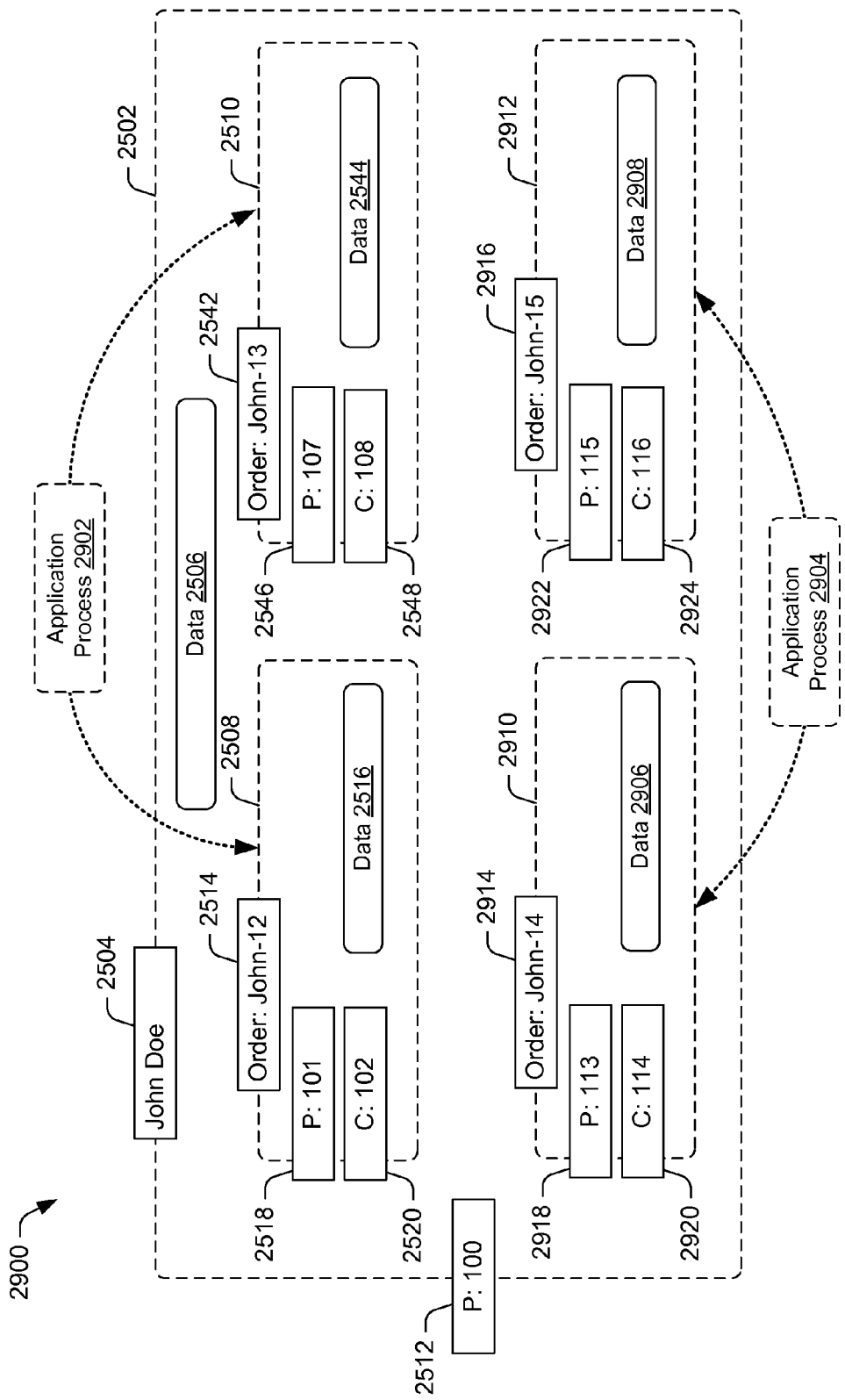
FIG. 29 shows an illustrative block diagram of ensuring optimistic concurrency for data transactions on multiple sets of sibling containers via the sub-containment concurrency component.

FIG. 29 shows an illustrative block diagram of ensuring optimistic concurrency for data transactions on multiple sets of sibling data containers via the sub-containment concurrency component. As shown in FIG. 29, the sub-containment hierarchical structure 2900 may additionally include a sub-container 2910 and a sub-container 2912 that are "siblings" to the sub-containers 2508 and 2510.

As such, an application process 2902 may be initiated to simultaneously perform data modifications on the data 2516 and the data 2544 in the sibling sub-containers 2508 and 2510, respectively. Likewise, an application process 2904 may be initiated to simultaneously perform data modifications on the data 2906 and the data 2908 in the sibling sub-containers 2910 and 2912, respectively. For example, the sub-container 2910 and 2912 may include information regarding additional orders placed by the customer "John", which are identified by the identifier 2914 as "Order: John-14" and identified by the identifier 2916 as "Order: John-15", respectively. The various sub-containers may be stored in data stores of a data storage layer 110 that is a non-blob storage layer.

Initially, the application process 2902 may simultaneously read the data 2516 and the data 2544. As a result, the sub-containment concurrency component 164 may also perform a first read of the parent and child version values for both of the sub-containers 2508 and 2510. In other words, the sub-containment concurrency component 164 may perform a first read of the parent version value 2518 and the child version value 2520 for the sub-container 2508, as well as the parent version value 2546 and the child version value 2548 for the sub-container 2510.

The application process 2904 may further simultaneously read the data 2906 and the data 2908. As a result, the sub-containment concurrency component 164 may also perform a first read the parent and child version values for both of the sub-containers 2910 and 2912. In other words, the sub-containment concurrency component 164 may perform a first read of the parent version value 2918 and the child version value 2920 for the sub-container 2912, as well as the parent version value 2922 and the child version value 2924 for the sub-container 2510.

Thus, assuming that the writes to the data 2516 and/or the data 2544 occurs before writes to the data 2906 and/or the data 2908, the sub-containment concurrency component 164 may perform a second read of the parent version value 2518 and the child version value 2520 for the sub-container 2508, and the parent version value 2546 and the child version value 2548 for the sub-container 2510. Subsequently, the sub-containment concurrency component 164 may only perform the data writes to the data 2516 and/or the data 2544 when each of the parent version value 2518, the child version value 2520, the parent version value 2546, and the child version value 2548 remained unchanged between the first read and the second read. On the other hand, the mismatch of even one of the four version values may cause the sub-containment concurrency component 164 to abort the data writes to the data 2516 and/or data 2544.

In contrast, assuming that the data write to the data 2906 and/or the data 2908 occurs before data write to the data 2516 and/or the data 2544, the sub-containment concurrency component 164 may perform a second read of the parent version value 2918 and the child version value 2920 for the sub-container 2910, and the parent version value 2922 and the child version value 2924 for the sub-container 2912. Subsequently, the sub-containment concurrency component 164 may only perform the data writes to the data 2906 and/or the data 2908 when each of the parent version value 2918, the child version value 2920, the parent version value 2922, and the child version value 2924 remained unchanged between the first read and the second read. On the other hand, the mismatch of even one of the four version values may cause the sub-containment concurrency component 164 to abort the data writes to the data 2906 and/or data 2908.

Thus, as described above, if the sub-containment concurrency component 164 may simultaneously check the parent version values and child versions values of the multiple "sibling" data containers stored in a non-blob data storage layer 110, the sub-containment concurrency component 164 may ensure optimistic concurrency for the multiple "sibling" data containers in a similar manner as for a single data container or "nested" data containers. However, when there are multiple data transactions in which each data transaction acts on multiple "sibling" data containers stored in a data storage layer 110 that is a blob storage layer, the sub-containment concurrency component 164 may not perform such optimistic concurrency as the blob storage layer will not permit simultaneous data transactions on multiple data containers of data blobs. It will be appreciated that the optimistic concurrency checking described in FIG. 29 may also be applied in a similar manner when at least one of the application processes 2902 and 2904 simultaneously acts on more than two "sibling" sub-containers.

While the effect of application processes that act on different containers of the sub-containment hierarchical structure 2500 have been described above, it is also possible for different application processes to act on the same container of the sub-containment hierarchical structure 2500. For instance, in a scenario in which two application processes are writing to the data 2516 in the sub-container 2508, the successful completion of a write by a first application process will result in the update of the parent version value 2518 and the child version value 2520 of the sub-container 2508. As a result, the writing or the modification of data 2516 by the second application process will fail solely due to the change in the parent version value 2518 and the child version value 2520. Of course, by analogy, if the same two application processes are implemented on the root container 2502 rather than the sub-container 2508, the writing or the modification of data 2516 by the second application process will fail due to change in the parent version value 2512.

Figure 30:
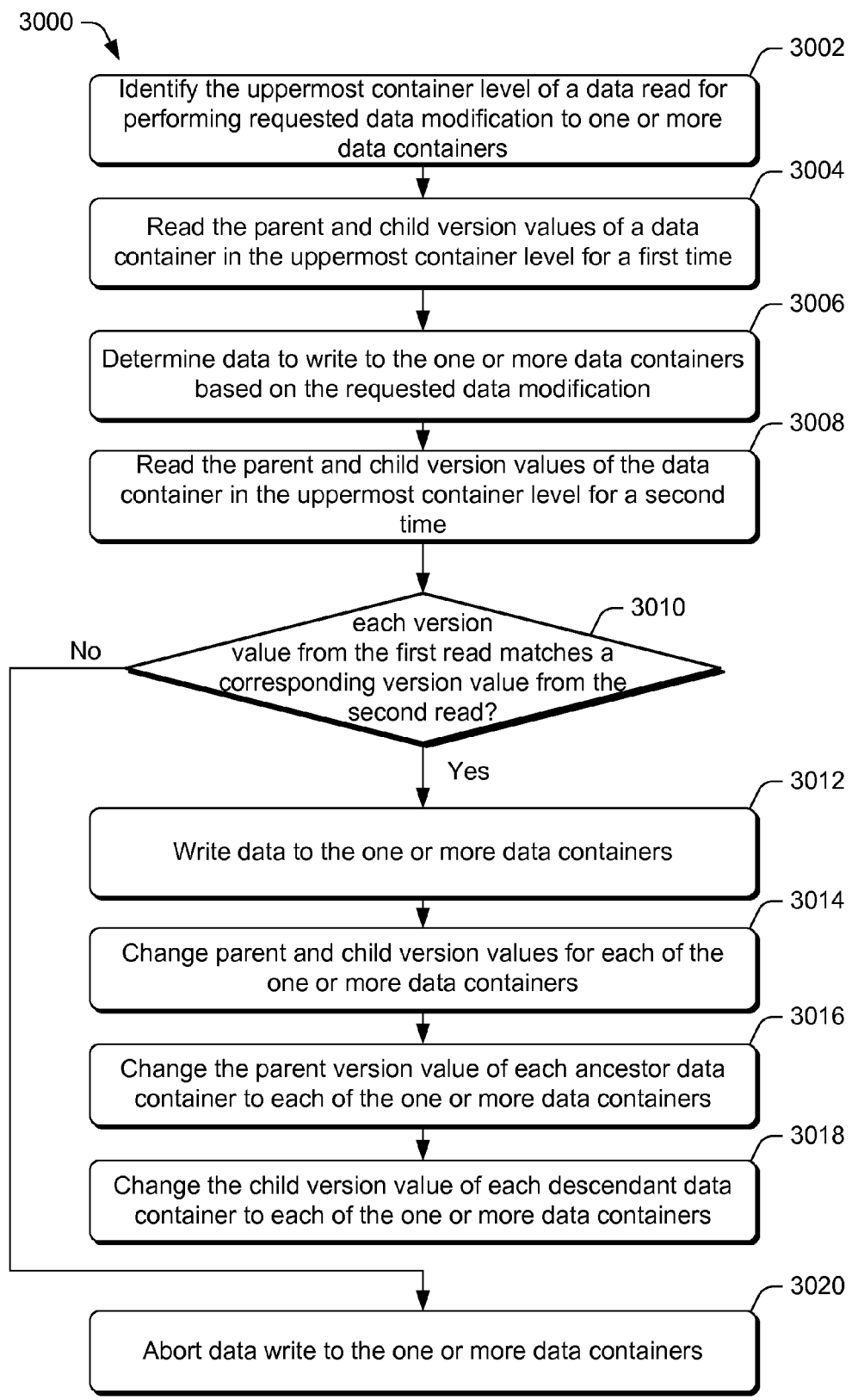
FIG. 30 is a flow diagram of an illustrative process for using a sub-containment concurrency component to ensure optimistic concurrency for data transactions in a sub-containment hierarchical structure.

FIG. 30 is a flow diagram of an illustrative process 3000 for using a sub-containment concurrency component to ensure optimistic concurrency for data transactions in a sub-containment hierarchical structure. The process 3000 is illustrated as a collection of blocks in a logical flow graph, which represents a sequence of operations that can be implemented in hardware, software, or a combination thereof. In the context of software, the blocks represent computer-executable instructions stored on one or more computer-readable memory that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At block 3002, the sub-containment concurrency component 164 may identify the uppermost container level of a data read for performing data modification (i.e., data write) to one or more data container in a sub-containment hierarchical structure, such as the sub-containment hierarchical structure 2500. The data modification may be performed by an application process based on a request from an application, such as the application 114(1) of the application layer 102. In various embodiments, the sub-containment hierarchical structure may be implemented on a non-blob data storage layer 110 or a data storage layer 110 that supports blob storage. The uppermost container level may be determined based on the container level that has the broadest scope. For example, referring back to FIG. 25, when the sub-containment concurrency component 164 reads data from both the sub-container 2508 and the sub-container 2522 that is "nested" inside the sub-container 2508, the uppermost container level of the data read is nevertheless the level at which the sub-container 2508 resides.

At block 3004, the sub-containment concurrency component 164 may read the parent and child version values of a data container in the uppermost container level for a first time. For instance, referring to the same example described with respect to block 3002, the sub-containment concurrency component 164 may read the parent and child version values of the sub-container 2508. Nevertheless, in a non-blob storage database layer in which there are multiple data transactions, with each data transaction acts on multiple "sibling" containers as described in FIG. 29, the sub-containment concurrency component 164 may simultaneously read the parent and child version values of the multiple "sibling" data containers. Each of the parent and child version values may be a GUID, a current real time, or a current Lamport time.

At block 3006, the application 114(1) may determine data to write to the one or more data containers based on the intended data modification. In instances in which there is data to be written to multiple data containers, the multiple data containers may include "nested" data containers or "sibling" data containers.

At block 3008, the sub-containment concurrency component 164 may read the parent and child version values of the data container in the uppermost container level for a second time. If there were no intervening writes by another application process to the data in such a data container since the first read, then the parent and child version values will remain unchanged. However, if there was an intervening write by another application since the first read, then the parent and child version values will be different at the second read. Nevertheless, in a non-blob storage database layer in which there are multiple data transactions, with each data transaction acts on multiple "sibling" containers as described in FIG. 29, the containment concurrency component 164 may simultaneously read the parent and child version values of the multiple "sibling" containers.

At decision block 3010, the sub-containment concurrency component 164 may determine whether each version value from the first read match a corresponding version value from the second read. In some embodiments in which only a parent version value is obtained during a first read, such as for a root container, the sub-containment concurrency component 164 may only determine whether the parent version value of the first read matches the parent version value of the second read. In other embodiments in which both a parent version value and a child version are obtained during the first read, then the sub-containment concurrency component 164 may determine whether the parent version values from the two reads match, and whether the child version values from the two reads match. In additional embodiments in which parent version values and child version values are obtained for multiple "sibling" data containers, the sub-containment concurrency component 164 may determine whether each corresponding pair of parent version values from the two reads match, as well as whether each corresponding pair of child version values from the two reads match.

Thus, if the sub-containment concurrency component 164 determines that each version value from the first read matches a corresponding version value from the second read ("yes" at decision block 3010), the process 3000 may proceed to block 3012. At block 3012, the sub-containment concurrency component 164 may permit the application process to write data to the one or more data containers.

At block 3014, the sub-containment concurrency component 164 may update the parent and child version values for each of the one or more data containers. In other words, the parent and child version values may be changed. However, in an instance in which the data container is a root data container that only has a parent version value, the sub-containment concurrency component 164 may only update the parent version value.

At block 3016, the sub-containment concurrency component 164 may change the parent version value of each ancestor data container to each of the one or more data containers. The updates may be performed for each ancestor data container in each data container level that exists, if any, all the way up to the level that contains the root data container.

At block 3018, the sub-containment concurrency component 164 may change the child version value of each descendant data container to each of the one or more data containers. The updates may be performed for each descendant data container in each data container level that exists, if any, all the way down to the level that contains the lowest descendant data container.

However, returning the decision block 3010, if the sub-containment concurrency component 164 determines that at least one version value from the first read does not match a corresponding version value from the second read ("no" at decision block 3010), the process 3000 may proceed to block 3020. At block 3020, the sub-containment concurrency component 164 may abort the data write to the one or more data containers. In various embodiments, the sub-containment concurrency component 164 may implement blocks 3010-3020 in a single atomic transaction.

Figure 31:
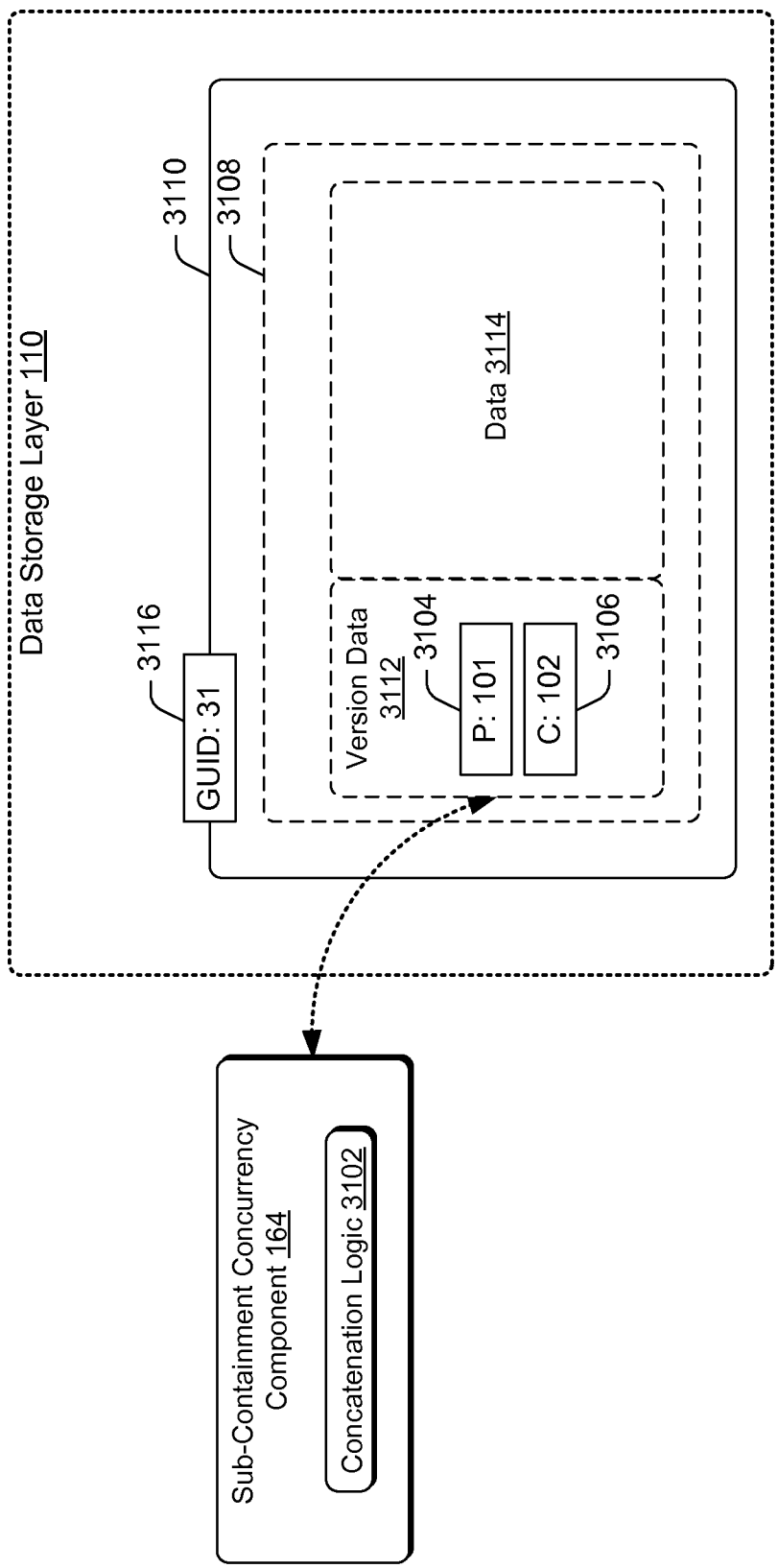
FIG. 31 shows an illustrative block diagram of leveraging the native optimistic concurrency capability of an application storage layer that is a blob store layer to ensure optimistic concurrency for data transactions on data containers in a sub-containment hierarchical structure.

FIG. 31 shows an illustrative block diagram of leveraging the native optimistic concurrency capability of an application storage layer that is a blob store layer to ensure optimistic concurrency for data transactions on data containers in a sub-containment hierarchical structure. As described above, a sub-containment hierarchical structure, such as the sub-containment hierarchical structure 2500, may be implemented on an application storage layer 110 that is a blob store layer. In the various embodiments described above, the sub-containment concurrency component 164 uses two types of version values (i.e., parent version value and child version value) to ensure optimistic concurrency for each container of data (e.g., sub-container 2508) that may be stored in a data blob. However, in some instances, the blob storage layer 110 may be capable of only managing a single value, such as GUID, for each data blob for the purpose of maintaining optimistic concurrency. For example, the single GUID may change each time the data in the data blob is modified by an application request. In other words, the use of two version values for a single data container by the sub-containment concurrency component 164 may be incompatible with the blob storage layer.

In such instances, the sub-containment concurrency component 164 may use the GUID of each blob in conjunction with the parent and child version values to maintain optimistic concurrency of data transactions. In the embodiments shown in FIG. 31, the sub-containment concurrency component 164 may include an additional concatenation logic layer 3102. The concatenation logic layer 3102 may combine the parent version value 3104 and the child version value 3106 of a data container 3108 that is stored in a data blob 3110 into version data 3112. Conversely, the concatenation logic layer 3102 may also extract the parent version value 3104 and the child version value 3106 from the version data 3112. The blob storage layer may provide the data blob 3110 with a GUID 3116 that changes each time the data in the data blob 3110 is modified.

The version data 3112 may be stored as prefix data or suffix data that is appended to the substantive data 3114 of the data container 3108. In such embodiments, the version data 3112 and the substantive data 3114 may be distinguished by special indicator values. For example, a prefix or suffix length value may indicate the location of the version data 3112 versus the location of the substantive data 3114 in the data container 3108. In this way, any modification to the parent version value and/or child version value of the data container 3108 may result in a change of the GUID 3116.

Accordingly, the sub-containment concurrency component 164 may leverage the native optimistic concurrency capability of the blob storage layer (e.g., GUID 3116) to ensure optimistic concurrency for data transactions on data containers in a sub-containment hierarchical structure. Such optimistic concurrency checking may be further described in the context of substituting certain steps in the process 3000 described in FIG. 30. For example, the block 3004 may be replaced with a block in which the sub-containment concurrency component 164 may read a GUID (e.g., GUID 3116) of a data blob (e.g., data blob 3110) that corresponds to a data container in the uppermost container level for a first time. Likewise, the block 3008 may be replaced with a block in which the sub-containment concurrency component 164 may read a GUID (e.g., GUID 3116) of a data blob (e.g., data blob 3110) that corresponds to a data container in the uppermost container level for a second time.

Further, the decision block 3010 may be replaced with a decision block in which the sub-containment concurrency component 164 compares the GUID obtained at the first read with the GUID obtained at the second read. With the substitution of these blocks, the process 3000 may proceed to block 3012 when the GUIDs of the two reads match ("yes" at decision block 3010). Conversely, the process 3000 may proceed to block 3020 when the GUIDs of the two reads do not match ("no" at decision block 3010). It will be appreciated that in other embodiments, the GUIDs discussed in FIG. 31 may be replaced with a current real time, a current Lamport time, and/or the like.

Thus, the sub-containment concurrency component 164 may ensure optimistic concurrency for transactions on data that are organized according to a sub-containment hierarchical structure with the use of parent version values and child version values.

In summary, the modular components of the tiered middleware framework may be arranged and rearranged based on the data storage needs of an application that resides in the application layer based on tradeoffs between criteria such as any two or more of latency, availability, consistency, durability, throughput, operation cost, and/or the like. In this way, the modular nature of the data transaction components in the tiered middleware framework may provide the tiered middleware framework with flexibility to adapt to a variety of data usage cases and performance goals. Accordingly, the tiered middleware framework may be used to guarantee data persistence, enhance data access performance, as well as lower the operating cost associated with supporting blob data transactions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more computer readable non-transitory memories storing computer-executable instructions that, when executed, cause one or more processors to perform acts comprising:
   determining an index entry to be added to a transactional index and an index entry to be removed from the transactional index based at least in part on a received application request, each index entry having a "maybe" consistency state;
   inserting the index entry to be added;
   reading a time stamp of the index entry to be removed;
   updating, based at least in part on the received application request, a data blob in a data store that is associated with the index entry to be added and a data blob in the data store that is associated with the index entry to be removed;

re-reading the time stamp of the index entry to be removed after the updating of a corresponding data blob;

when the time stamp matches the re-read time stamp, deleting the index entry to be removed from the transactional index; and when the time stamp does not match the re-read time stamp, aborting a deletion attempt of the index entry to be removed.

2. The one or more computer readable non-transitory memories of claim 1, further comprising instructions that, when executed, cause the one or more processors to perform acts comprising performing a prefix query from an application on an identifier of each index entry in the transactional index, and returning data from each data blob whose corresponding index entry identifier matches the prefix query.

3. The one or more computer readable non-transitory memories of claim 2, wherein the returning includes verifying that a field in each matching data blob includes the data requested by the prefix query.

4. The one or more computer readable non-transitory memories of claim 1, wherein the determining comprises determining the index entry to be removed by receiving information regarding the index entry to be removed from an application, from reading a corresponding data blob, or from consulting a reverse index.

5. The one or more computer readable non-transitory memories of claim 1, wherein the updating includes one of creating the data blob, deleting the data blob, or modifying the data blob.

6. A computer-implemented method, comprising:
under control of one or more computing systems comprising one or more processors,
determining one or more index entries to be added to or one or more index entries to be removed from a transactional index based at least in part on an application request, wherein individual index entries have associated therewith a corresponding identifier;
performing at least one of inserting the one or more index entries to be added to the transactional index or reading a time stamp or a version number of the one or more index entries to be removed;
updating, in a data store, a data blob associated with one or more index entries to be added or the one or more index entries to be removed based at least in part on the application request; and
checking that an identifier of a particular index entry in the transactional index has a first value that matches a second value of a related data field in a corresponding data blob, and deleting the particular index entry when the first and the second values do not agree and an in-progress data transaction to the data store that corresponds to the index entry is absent.

7. The computer-implemented method of claim 6, further comprising deleting the one or more index entries to be removed from the transactional index using optimistic concurrency based at least in part on the corresponding time stamp or the corresponding version number of each of the one or more index entries.

8. The computer-implemented method of claim 6, wherein the determining comprises determining the one or more index entries to be removed by receiving information regarding an index entry to be removed from an application, from reading a corresponding data blob, or from consulting a reverse index.

9. The computer-implemented method of claim 6, wherein the updating includes one of creating the data blob, deleting the data blob, or modifying the data blob.

10. The computer-implemented method of claim 6, wherein individual index entries include a consistency state indicating that uncertainty exists as to an accuracy of a corresponding index entry, and the identifier included in each index entry further comprises a field name of the respective data field in the corresponding data blob.

11. The computer-implemented method of claim 6, further comprising:
performing a query for data from at least one data blob having a field that is untracked by the transactional index; and
returning the data from the untracked field when the untracked field is verified to include data requested by the query.

12. The computer-implemented method of claim 6, further comprising performing a prefix query from an application on the identifier of each index entry in the transactional index, and returning data from each data blob whose corresponding index entry identifier matches the prefix query.

13. The computer-implemented method of claim 12, wherein the returning includes verifying that a field in each matching data blob includes data requested by the prefix query.

14. The computer-implemented method of claim 6, wherein the corresponding identifier comprises a primary key that enables access to an associated data blob, and a field value in addition to the primary key that is from a respective data field in the associated data blob accessible via the primary key.

15. The computer-implemented method of claim 6, further comprising determining that the in-progress transaction to the data store that corresponds to the index entry is absent via one of:
determining that a data transaction to the data store that corresponds to the index entry is not in-progress when a time stamp of the index entry differs from a current time by a predetermined time amount;
forcing a data transaction corresponding to the index entry that is currently in progress to be aborted by an application via optimistic concurrency by performing a data transaction on the corresponding data blob;
stopping each data transaction to the data store momentarily at a same time for a predetermined time; and
determining that a data transaction to the data store that corresponds to the index entry is not in-progress when a time stamp of the index entry is older than an oldest active data transaction to the data store tracked by a supplemental index.

16. A computer-implemented method, comprising:
under control of one or more computing systems comprising one or more processors,
determining whether a new index entry is to be added to a transactional index based at least in part on an application request;
determining whether an existing index entry is to be removed from a transaction index based at least in part on the application request;
responsive to determining that the new index entry is to be added, inserting the new index entry to be added to the transactional index, wherein the new index entry includes a consistency state indicating that the new index entry is being created to track a respective field property value that is being added to a corresponding data blob, and, responsive to determining that the existing index entry is to be removed, reading a time stamp of the existing index entry to be removed and changing a consistency state of the existing index entry to be removed to a consistency state indicating that the existing index entry is to be deleted;

updating, in a data store, a data blob associated with the new index entry to be added or the existing index entry to be removed based at least in part on the application request; and responsive to determining that the new index entry is to be added, changing, using optimistic concurrency, a consistency state of the new index entry to a consistency state indicating that the new index entry is accurate, and, responsive to determining that the existing index entry is to be removed, deleting, using optimistic concurrency, the existing index entry with the consistency state indicating that the existing index entry is to be deleted.

17. The computer-implemented method of claim 16, wherein if the changing is performed, the changing includes changing a consistency state of the new index entry when the new index entry has a time stamp that is ascertained to be unchanged at time of the changing.

18. The computer-implemented method of claim 16, wherein if the deleting is performed, the deleting includes deleting an existing index entry when the existing index entry has a time stamp that is ascertained to be unchanged at time of the deleting.

19. The computer-implemented method of claim 16, wherein the determining the existing index entry to be removed includes receiving information regarding the existing index entry to be removed from an application, from reading a corresponding data blob, or from consulting a reverse index.

20. The computer-implemented method of claim 16, wherein the updating includes one of creating the data blob, deleting the data blob, or modifying the data blob.

21. The computer-implemented method of claim 16, wherein each index entry includes an identifier that comprises a field property name of a corresponding data blob, a field property value of the corresponding data blob, and a primary key that enables access to the corresponding data blob.

22. The computer-implemented method of claim 16, further comprising performing a prefix query from an application on an identifier of each index entry in the transactional index, and returning data from each data blob whose corresponding identifier matches the prefix query.

23. The computer-implemented method of claim 22, wherein the returning includes at least one of:

returning data from a first matching data blob when its corresponding index entry has the consistency state indicating that the index entry is accurate; or verifying that a field in a second matching data blob includes the data requested by the prefix query prior to the returning when its corresponding index entry has the consistency state indicating that the index entry is creating or the consistency state indicating that the index entry is to be deleted.

24. The computer-implemented method of claim 16, further comprising:

performing a query for data from at least one data blob having a field that is untracked by the transactional index; and returning the data from the untracked field when the untracked field is verified to include data requested by the query.

25. The computer-implemented method of claim 16, wherein if the inserting is performed, the inserting each index entry includes inserting each index entry by updating a time stamp of an existing index entry with an identical identifier using optimistic locking when (1) the existing index entry has the consistency state indicating that the index entry is being created or the consistency state indicating that the index entry is accurate, and (2) a time stamp of the existing index entry differs from a current time by more than a predetermined time amount.

26. The computer-implemented method of claim 16, further comprising aborting an insert of an index entry to be added to the transactional index when (1) an existing index entry with an identical identifier has the consistency state indicating that the index entry is being created or the consistency state indicating that the index entry is accurate, and (2) a time stamp of the existing index entry differs from a current time by less than or a predetermined time amount.

27. The computer-implemented method of claim 16, wherein if the inserting the new index entry is performed, the inserting the new index entry includes updating a time stamp of an additional existing index entry with an identical identifier using optimistic locking when the additional existing index entry has the consistency state indicating that the index entry is to be deleted.

28. The computer-implemented method of claim 16, further comprising performing maintenance on the transactional index, the performing the maintenance including:

checking that an identifier of an index entry in the transactional index has a value that matches a value of a related field in a corresponding data blob;

changing the consistency state of the index entry to indicate that the index entry is accurate when the values do agree, and the index entry initially has the consistency state indicating that the index entry is being created;

deleting the index entry using optimistic concurrency when the values do not agree, the index entry initially having the consistency state indicating that the index entry is being created, and an in-progress data transaction to a data blob that corresponds to the index entry is absent;

changing the consistency state of the index entry to indicate that the index entry is accurate using optimistic concurrency when the values do agree, and the index entry initially has the consistency state indicating that the index entry is to be deleted, and an in-progress data transaction to the data blob that corresponds to the index entry is absent; and deleting the index entry when the values do not agree and the index entry initially has the consistency state indicating that the index entry is to be deleted.

29. The computer-implemented method of claim 28, further comprising determining that the in-progress transaction to the data blob that corresponds to the index entry is absent via at least one of:

determining that a data transaction to the data store that corresponds to the index entry is not in-progress when a time stamp of the index entry differs from a current time by a predetermined time amount;

forcing a data transaction corresponding to the index entry that is currently in progress to be aborted by an application via optimistic concurrency by performing a data transaction on the corresponding data blob;

stopping each data transaction to the data store momentarily at a same time for a predetermined time; or determining that a data transaction to the data store that corresponds to the index entry is not in-progress when a time stamp of the index entry is older than an oldest active data transaction to the data store tracked by a supplemental index.

30. The computer-implemented method of claim 28, wherein the performing maintenance on the transactional index further includes deleting the index entry using optimistic concurrency when the values do not agree, the index entry initially having a consistency state indicating that uncertainty exists as to an accuracy of the index entry, and an in-progress data transaction to the data store that corresponds to the index entry is absent.

* * * * *